(12) United States Patent
Nasiri

(10) Patent No.: US 8,860,236 B2
(45) Date of Patent: Oct. 14, 2014

(54) WIND ENERGY POWER CONVERSION SYSTEM REDUCING GEARBOX STRESS AND IMPROVING POWER STABILITY

(75) Inventor: Adel Nasiri, Milwaukee, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 745 days.

(21) Appl. No.: 12/907,651

(22) Filed: Oct. 19, 2010

(65) Prior Publication Data

US 2011/0089693 A1  Apr. 21, 2011

Related U.S. Application Data

(60) Provisional application No. 61/252,758, filed on Oct. 19, 2009.

(51) Int. Cl.
*F03D 9/00* (2006.01)
*H02P 9/04* (2006.01)

(52) U.S. Cl.
USPC ............................................ 290/44; 290/55

(58) Field of Classification Search
USPC .................................. 290/44, 55; 322/44, 24
See application file for complete search history.

(56) References Cited

U.S. PATENT DOCUMENTS

| | | | | |
|---|---|---|---|---|
| 5,225,712 A * | 7/1993 | Erdman | .......................... | 290/44 |
| 5,705,859 A * | 1/1998 | Karg et al. | ....................... | 290/45 |
| 7,476,987 B2 * | 1/2009 | Chang | ............................ | 290/55 |
| 7,956,584 B2 * | 6/2011 | Peterson et al. | ................. | 322/44 |
| 2004/0008009 A1 * | 1/2004 | Fukaya | ........................... | 322/44 |
| 2004/0145188 A1 * | 7/2004 | Janssen et al. | .................. | 290/44 |
| 2006/0087124 A1 * | 4/2006 | Stahlkopf | ........................ | 290/44 |
| 2006/0192390 A1 * | 8/2006 | Juanarena Saragueta et al. | ............................... | 290/44 |
| 2007/0029802 A1 * | 2/2007 | Moehlenkamp | ................ | 290/44 |
| 2009/0146426 A1 * | 6/2009 | Jones et al. | ..................... | 290/44 |
| 2009/0230689 A1 * | 9/2009 | Burra et al. | ..................... | 290/55 |
| 2010/0060000 A1 * | 3/2010 | Scholte-Wassink | ............ | 290/44 |
| 2010/0327584 A1 * | 12/2010 | Fortmann | ........................ | 290/44 |
| 2012/0049807 A1 * | 3/2012 | Hehenberger | .................. | 322/40 |

FOREIGN PATENT DOCUMENTS

DE  102008034531  *  8/2009

OTHER PUBLICATIONS

J. F. Fuller, E. F. Fuchs and K. J. Roesler, "Influence of Harmonics on Power Distribution System Protection," IEEE Trans. Power Delivery, vol. 3, pp. 549-557, Apr. 1988.

Y. H. Kim and H. D. Ha, "Design of Interface Circuits With Electrical Battery Models," IEEE Transactions on Industrial Electronics, vol. 44, No. 1, pp. 81-86, 1997.

(Continued)

*Primary Examiner* — Julio C. Gonzalez Ramirez
(74) *Attorney, Agent, or Firm* — Michael Best & Friedrich LLP

(57) ABSTRACT

A wind energy power conversion system includes a gearbox, a generator, an AC to DC power converter, a DC link, and a DC to AC power converter, and at least one ultracapacitor module connected in parallel on the DC link. A method of reducing stress on a wind turbine gearbox can be performed by obtaining an unwanted frequency of the wind energy power conversion system gearbox; determining an input torque value on the input shaft of the gearbox as a function of time; determining a frequency of the input torque value; and adjusting a torque on the output shaft of the gearbox based on the unwanted frequency.

12 Claims, 65 Drawing Sheets

(56) References Cited

OTHER PUBLICATIONS

A. Miller, E. Muljadi and D. S. Zinger, "A Variable Speed Wind Turbine Power Control," IEEE Trans. Energy Convers, vol. 12, No. 2, pp. 181-186, Jun. 1997.

P. Sorensen, A. D. Hansen and P. A. C. Rosas, "Wind models for simulation of power fluctuations from wind farms," Journal of Wind Engineering, 90, 2002, pp. 1381-1402.

R. Datta and V. T. Ranganathan, "Variable-Speed Wind Power Generation Using Doubly Fed Wound Rotor Induction Machine—A Comparison With Alternative Schemes," IEEE trans. Energy Conversion, vol. 17, pp. 414-421, No. 3, Sep. 2002.

R. Cardenas, R. Pena, J. Clare and G. Asher, "Power Smoothing in a Variable Speed Wind-Diesel System," in Proc. 34th Annual IEEE Power Electronics Specialist Conference, Jun. 2003, pp. 754-759.

P. Pourbeik, R. J. Koessler, D. L. Dickmander and W. Wong, "Integration of Large Wind Farms into Utility Grids (Part 2—Performance Issues)," in Proc. IEEE Power Engineering Society General Meeting, Jul. 13-17, 2003, Toronto, Canada.

K. E. Johnson, "Adaptive Torque Control of Variable Speed Wind Turbines," Ph.D. thesis, University of Colorado, Boulder, CO, Aug. 2004.

S. Gallardo, J. M. Carrasco, E. Galvan and L. G. Franquelo, "DSP-based doubly fed induction generator test bench using a back-to-back PWM converter." The 30th Annual Conference of the IEEE Industrial Electronics, Nov. 2004.

J. M. Jonkman and M. L. Buhl, Jr., "Fast User's Guide," NREL/EL-500-29798. Golden, CO: National Renewable Energy Laboratory, Aug. 2005.

F. Blaabjerg, R. Iov, R. Teodorescu and Z. Chen, "Power Electronics in Renewable Energy Systems," Power Electronics and Motion Control Conference, pp. 1-17, 2006.

M. Chinchilla, S. Arnaltes and J. C. Burgos, "Control of Permanent-Magnet Generators Applied to Variable-Speed Wind-Energy Systems Connected to the Grid," IEEE Trans. Energy Convers., vol. 21, No. 1, pp. 130-135, Mar. 2006.

E. Koutroulis and K. Kalaitzakis, "Design of a Maximum Power Tracking System for Wind-Energy-Conversion Applications," IEEE Trans. Ind. Electron., vol. 53, No. 2, pp. 486-494, Apr. 2006.

T. Kinjo, T. Senjyu, N. Urasaki and H. Fujita, "Terminal-voltage and output-power regulation of wind-turbine generator by series and parallel compensation using SMES," in Proc. IEEE—Generation, Transmission and Distribution, vol. 153, No. 3, pp. 276-282, May 2006.

B. J. Jonkman and M. L. Buhl, Jr., "TurbSim User's Guide," NREL/EL-500-36970, Golden, CO: National Renewable Energy Laboratory, Sep. 2006.

C. Luo and B. T. Ooi, "Frequency Deviation of Thermal Power Plants Due to Wind Farms," IEEE Trans. Energy Convers., vol. 21, No. 3, pp. 708-716, Sep. 2006.

C. Abbey and G. Joos, "Supercapacitor Energy Storage for Wind Energy Applications," IEEE Trans. Industry Applications, vol. 43, No. 3, pp. 769-776, May-Jun. 2007.

S. Lukic, "Charging Ahead," IEEE Industrial Electronics Magazine, vol. 2, No. 4, pp. 22-31, 2008.

R. Fadaeinedjad, M. Moallem and G. Moschopoulos, "Simulation of a Wind Turbine With Doubly Fed Induction Generator by Fast and Simulink," IEEE Trans. Energy Convers., vol. 23, No. 2, pp. 690-700, Jun. 2008.

T. Luu and A. Nasiri, "Power Smoothing of Doubly Fed Induction Generator for Wind Turbine Using Ultracapacitors," In Proc. 34th IEEE Industrial Electronics Conference, Nov. 2008, Orlando, FL.

F. Oyague, "Gearbox Modeling and Load Simulation of a Baseline 750-kW Wind Turbine Using State-of-the-Art Simulation Codes," NREL, Golden, CO, Tech. Rep. NREL/TP-500-41160, Feb. 2009.

B. Beltran, T. Ahmed-Ali and M. E. H. Benbouzid, "High-Order Sliding-Mode Control of Variable-Speed Wind Turbines," IEEE Trans. Ind. Electron., vol. 56, No. 9, pp. 3314-3321, Sep. 2009.

E. Manla, A. Nasiri, C. H. Rentel and M. Hughes, "Modeling of Zinc Bromide Energy Storage for Vehicular Applications," IEEE Transactions on Industrial Electronics, vol. 57, pp. 624-632, 2010.

D. Neumann, Power Smoothing for Gearbox Stress Reduction, "Modeling a 750 KW Wind Turbine Gearbox," Milwaukee School of Engineering, May 13, 2010, a senior project under guidance of Prof. Christopher Damm.

SolRayo, "Ultracapacitors for Renewable Energy Store," [Online] Available: http://www.solrayo.com/SolRayo/Renewable_Energy_Slides_files/Ultracapacitors_for_Renewable_Energy_Storage_Webinar.pdf.

* cited by examiner (a)

(b)

WIND ENERGY POWER CONVERSION SYSTEM REDUCING GEARBOX STRESS AND IMPROVING POWER STABILITY

CROSS REFERENCE TO RELATED APPLICATION

This application claims the benefit of U.S. Provisional Application No. 61/252,758, filed Oct. 19, 2009, the content of which is incorporated herein by reference in its entirety.

FEDERALLY SPONSORED RESEARCH AND DEVELOPMENT

This invention was made with government support under grant no. 09EE0001386 awarded by the U.S. Department of Energy, and under grant no. 0925709 awarded by the National Science Foundation. The government has certain rights in the invention.

TECHNICAL FIELD

The disclosure relates generally to a wind energy power conversion system, and more particularly to wind turbines with integrated energy storage systems, a stress reduction filter, or both. The disclosure further relates to a method of reducing the gearbox stress, and a method of controlling the power ramp rate in a wind energy power conversion system.

BACKGROUND

The present invention relates to energy storage systems which can reduce the gearbox stress and improve quality of output energy and power. Wind power generation has been growing very aggressively in the recent years. The U.S. Department of Energy has an initiative to further increase wind energy's contribution to 20% of the U.S. electricity supply by 2030. To meet this demand in capacity, variable speed wind turbine generators have been developed. These generators usually employ sizable blades on a tower which is connected to a gearbox. The gearbox is connected by a rotor shaft to a generator, which in turn interfaces with a power converter. The converter exports the output power of the generator to the grid. The American Wind Energy Association's Operation and Maintenance Working Group reported that 25% of wind turbine failures are caused by the gearbox and generator, and 20% are caused by the power converter. Thus, there has developed a need for a wind energy power conversion system with an extended operating life of the gearbox and improved stability of the power converter.

Incumbent wind turbines may suffer from short-term and long-term variations in power output. The short-term variations in power output are mainly due to the variable wind speed. Moreover, the short-term power fluctuations can be directly converted to torque fluctuations on the rotor shaft because of the substantial inertia of sizable blades, thereby creating a substantial stress on the turbine gearbox. Furthermore, conventional wind turbines may produce long-term fluctuations in power, because the power grid load typically peaks in late afternoons when the wind speed is lower. Thus, there has developed a need for a wind energy power conversion system with an improved quality of output energy and power.

SUMMARY

In one embodiment, the invention provides a method of reducing stress on a wind turbine gearbox, the gearbox having an input shaft coupled to a wind turbine rotor and an output shaft coupled to a generator, the generator being coupled to an AC to DC power converter, the AC to DC power converter being coupled via a DC link to a DC to AC power converter, the method including obtaining an unwanted frequency of the wind turbine gearbox; determining an input torque value on the input shaft of the gearbox as a function of time; determining a frequency of the input torque value; and adjusting a torque on the output shaft of the gearbox based on the unwanted frequency.

In another embodiment, the invention provides a wind energy power conversion system, including a gearbox, a generator, an AC to DC power converter, a DC link, and a DC to AC power converter, wherein the gearbox has an input shaft and an output shaft, the input shaft being coupled to a wind turbine rotor; the generator is coupled to the output shaft of the gearbox and to the AC to DC power converter; and the AC to DC power converter is coupled via the DC link to the DC to AC power converter; and at least one ultracapacitor module connected in parallel on the DC link.

In yet another embodiment, the invention provides a method of controlling power output from a wind energy power conversion system, the wind energy power conversion system including a generator coupled to a wind turbine rotor via a gearbox, the generator being coupled to an AC to DC power converter, the AC to DC power converter being coupled via a DC link to a DC to AC power converter, the DC link including at least one ultracapacitor connected in parallel, the method including adjusting a voltage level of the DC link to control the power output of the DC to AC power converter.

Other aspects of the invention will become apparent by consideration of the detailed description and accompanying drawings.

BRIEF DESCRIPTION OF THE DRAWINGS

FIG. 7(a) is a multi stage representation and FIG. 7(b) is an equivalent one stage representation.

FIG. 19(a) is for the new resonant frequency at 0.5 Hz (gearbox and SDC combined), and FIG. 19(b) is for the old resonant frequency at 1.38 Hz (gearbox resonant only).

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The systems and methods disclosed herein provide several improvements in the field of wind energy including, without limitation: gearbox stress reduction; improved power system stability during transient dynamics; and controllable load/generation by combining electric system load, power generation and energy storage. These and other benefits are achieved at higher efficiency and lower cost compared to existing systems.

Figure 1:
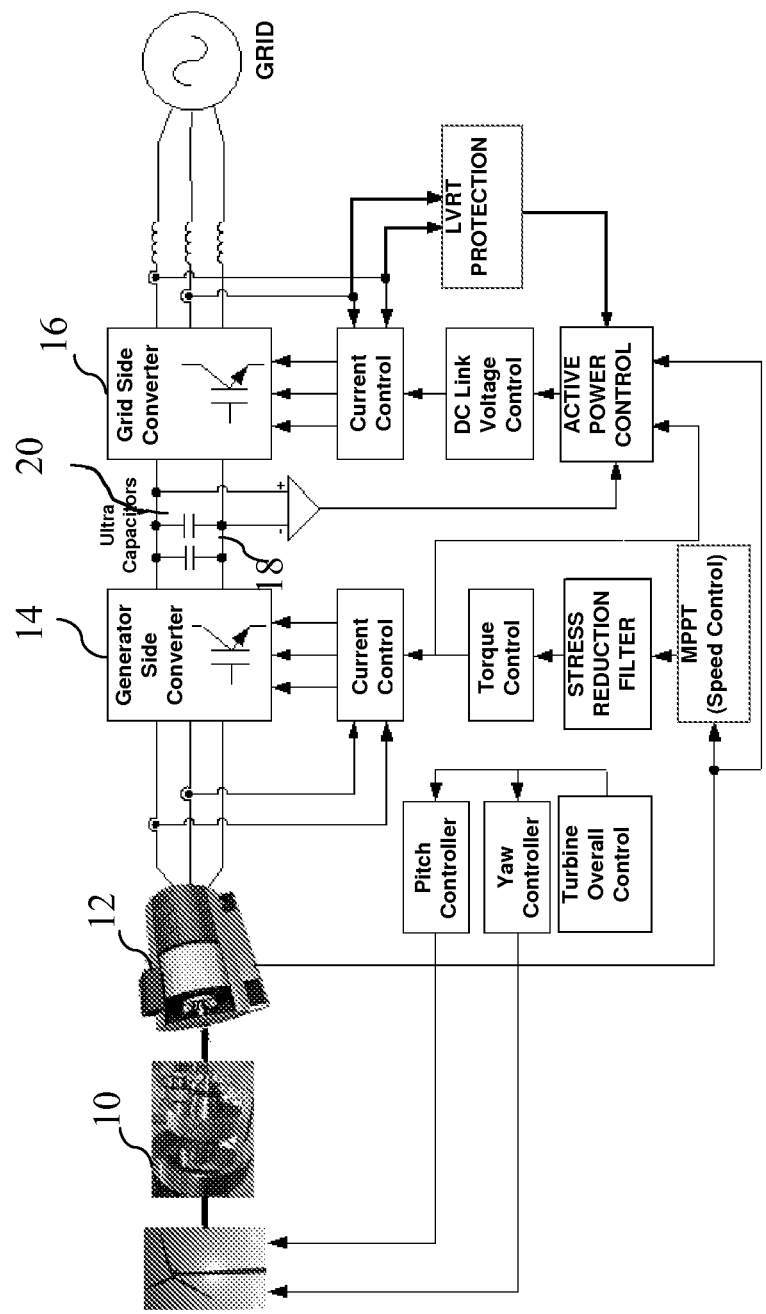
FIG. 1 schematically illustrates the configuration of an embodiment of the subject wind energy power conversion system.

FIG. 1 shows an exemplary embodiment of a system according to the present invention. The system includes a wind turbine coupled to a gearbox 10 which in turn is coupled to an electric generator 12. The generator 12 is electrically coupled to an AC/DC converter 14 (also referred to as a generator side converter), which is coupled to a DC link 18

(also referred to as DC bus), which in turn is coupled to a DC/AC converter 16 (also referred to as a grid side converter). In certain embodiments there are one or more ultracapacitors 20 connected in parallel to the DC link 18. The current of the AC/DC converter 14 ($I_{DCGen}$) and the DC/AC converter 16 ($I_{DCGrid}$) are modulated to control the voltage of the DC link 18, the current flow from the generator 12, and the power to the grid. In those embodiments in which one or more ultracapacitors 20 are included on the DC link 18, the ultracapacitor(s) 20 can be charged and discharged during operation, permitting the voltage of the DC link 18 to vary; in some embodiments the DC link 18 is at 1100 V and may vary from 800-1400 V, although other voltages are also possible. In various embodiments, the ultracapacitors 20 can have a voltage of several volts each, such that several hundred ultracapacitors would be used on the DC link 18 to provide the appropriate voltage range. Although the term 'ultracapacitors' is used herein, this is not meant to be limiting and other suitable capacitors or other devices for dynamically storing charge may also be used.

In various aspects, the system monitors turbine speed and torque on the input shaft of the wind turbine's gearbox 10 and adjusts the torque on the output shaft of the gearbox 10 to reduce or eliminate unwanted torque components across the gearbox 10. The gearbox 10 is subjected to stress insofar as there is a difference in torque between the input shaft and the output shaft of the gearbox 10. Certain frequencies of torque, e.g. those corresponding to natural or resonant frequencies of the gearbox 10, are particularly damaging to the gearbox 10 and thus reducing or removing these torque frequencies can extend the life of the gearbox 10. Thus, in various embodiments, the torque on the output shaft of the gearbox 10 is adjusted by adjusting the current of the AC/DC converter 14, which in turn adjusts the torque of the generator 12 and in turn the torque of the output shaft of the gearbox 10, to which the generator 12 is attached. In one embodiment, the unwanted torque component is a resonant frequency (or natural frequency) of the gearbox 10, which is determined and a band pass filter corresponding to that frequency is established. In various embodiments, the band pass filter includes a center frequency and a shoulder or width, where the shoulder or width may be expressed as a percentage or as a plus-minus value relative to the center frequency. The filter may have various shapes, e.g. square or bell-shaped and may be different on one side of the center frequency compared to the other side. In further embodiments other types of filters (e.g. low pass, high pass) can be constructed and applied to the input shaft torque signals. Input torque values on the input shaft of the gearbox 10 are monitored and filtered through the band pass filter, such that torque frequencies within the range of the filter are compensated for by making appropriate balancing adjustments to the torque of the output shaft of the gearbox 10, i.e. by adjusting the torque of the generator 12.

As the voltage of the DC link 18 is a function of the relative values of $I_{DCGen}$ and $I_{DCGrid}$, adjustments to $I_{DCGen}$ such as those described above to compensate for unwanted torque components can have the effect of varying the voltage of DC link 18. Thus, the presence of one or more ultracapacitors 20 on the DC link 18 can help to buffer changes in voltage and stabilize the power that is output to the grid. In addition to buffering voltage changes on the DC link 18 which result from torque compensation, the ultracapacitors 20 can also be used to implement several other voltage control schemes, including power smoothing, power ramp control, frequency droop compensation, and low voltage ride through protection, which are discussed further below and in the Appendices. In each of these voltage control schemes, power on the DC link 18 is absorbed or released by the ultracapacitors, generally in response to changes in $I_{DCGen}$ and/or $I_{DCGrid}$ which result in changes in the voltage of the DC link 18.

With power smoothing, the ultracapacitors 20 absorb and/or release charge in response to sudden changes in power produced by the generator 12 which may be produced by rapid changes in turbine speed and/or adjustments that are made to compensate for torque. With power ramp control, output power to the grid can be gradually changed in response to sustained changes in input power from the wind turbine (which may be due, e.g., to changes in average wind speed); for example, the ultracapacitors 20 can absorb or release charge resulting from a step change in power from the turbine so that the change in power that is output to the grid can be more gradually changed, resulting in a more even output of power to the grid. With frequency droop compensation, charge on the ultracapacitors 20 can be released to the grid to provide a boost when grid power is low, as evidenced by a frequency droop. With low voltage ride through protection, the ultracapacitors 20 can be used to absorb some or all of the power that is produced by the generator 12 during a period of low voltage, when power cannot be transferred to the grid.

In various embodiments, the components of the system shown in FIG. 1 can be implemented using analog electronics and/or software routines on a computer, where suitable sensors and controls are coupled to the wind turbine, gearbox 10 (including the input and output shafts), the generator 12, AC/DC converter 14, DC link 18, DC/AC converter 16, and various mechanical and electrical connections including those shown in FIG. 1.

Gearbox Stress Reduction

Aspects of the present invention relate to reducing the torque acting on a gearbox in a wind energy power conversion system. A typical gearbox on a variable-speed wind turbine has an input shaft and an output shaft. The input shaft is coupled to the rotor of a wind energy power conversion system, for example a direct coupling, and the output shaft is coupled to an input shaft of an electrical generator. The generator in turn is electrically coupled to an AC to DC power converter, and the AC to DC power converter is coupled via a DC link to a DC to AC power converter.

A torque can act on the gearbox if the torque variation at the rotor (input) side is not substantially matched by the variation in the generator's terminal power. The relationship between torque and power is as follows:

$$P = T \times \omega$$

where P is power, T is torque, and ω is angular speed. A wind energy power conversion system converts this power to electric power, which is calculated as follows:

$$P = V \times I$$

where P is the electric power, V the potential difference, and I the electric current at the output of Grid Side Converter 14. The torque acting on a gearbox can be reduced by substantially matching the mechanical power with the electric power P. At a given rotational speed of the rotor and potential difference of the generator, an increase in torque can then be compensated by a corresponding increase in electric current. The current adjustments will depend on the particulars of the wind turbine system that is being used but are within the ability of one skilled in the art to determine.

Figure 2:
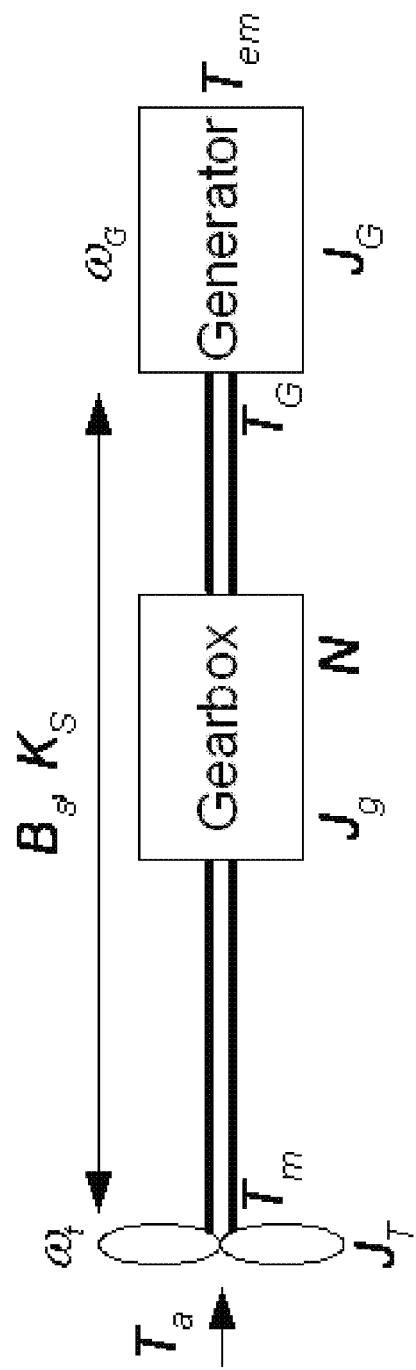
FIG. 2 schematically illustrates the components contributing to the torque acting on the gearbox.

FIG. 2 schematically illustrates the components contributing to the torque acting on the gearbox. The torque acting on the gearbox can be computed by the following equations:

$$T_a = 0.5\pi\rho R^2 V_W^3 c_p(\lambda, \theta) \tag{1}$$

$$T_a - T_m = J_T \frac{d\omega_t}{dt} \tag{2}$$

$$T_G - T_{em} = J_G \frac{d\omega_G}{dt} \tag{3}$$

$$T_m = T'_G + K_S \int (\omega_t - \omega'_G) dt + B_S(\omega_t - \omega'_G) + J_g \frac{d\omega_t}{dt} \tag{4}$$

$$T_m = T'_{em} + K_S \int (\omega_t - \omega'_G) dt + B_S(\omega_t - \omega'_G) + J'_G \frac{d\omega'_G}{dt} + J_g \frac{d\omega_t}{dt} \tag{5}$$

where $T_m$ is the torque acting on the gearbox; $T_a$ is aerodynamic torque; $\rho$ is air density; R is turbine rotor radius; $V_W$ is wind speed; $c_p$ is a nonlinear function (power coefficient) specific to each turbine; $\omega_t$ and $\omega_G$ are rotor and generator speed; $J_T$, $J_G$ and $J_g$ are rotor, generator and gearbox moments of inertia; $K_S$ and $B_S$ are shaft equivalent stiffness and damping; $T_G$ is the torque acting on the generator; and $T_{em}$ is the generator's electromechanical torque. In equation (5), components of generator inertia and generator torque typically dominate over components of shaft damping and stiffness and gear inertia, and as a result, in case of a wind gust, $T_a$ and $T_m$ may increase. This in turn increases the generator speed, and result in a sudden increase in torque during a wind gust that may contribute to the wear and tear of the gearbox.

In one embodiment, the generator's electromechanical torque $T_{em}$ can be reduced during a wind gust to keep the torque acting on the gearbox $T_m$ stable. By so regulating $T_{em}$, the torque acting on the gearbox can be mitigated. When the gust is over and the wind speed stabilizes, $T_{em}$ can be increased so that the generator gradually reaches a steady state again.

In another embodiment, the gearbox stress can be reduced by removing unwanted torque components from the gearbox. Even absent a wind gust, there are undesirable turbulences in the wind power. Unwanted torque components from such turbulences can be substantially removed by a stress reduction filter. The stress-producing torque can then substantially bypass the gearbox, and the gearbox can process the predominantly useful wind power. Without the stress reduction filter, the incoming power signal from the wind turbine rotation may contain unwanted torque components which may contribute to the wear and tear of the gearbox.

Figure 3:
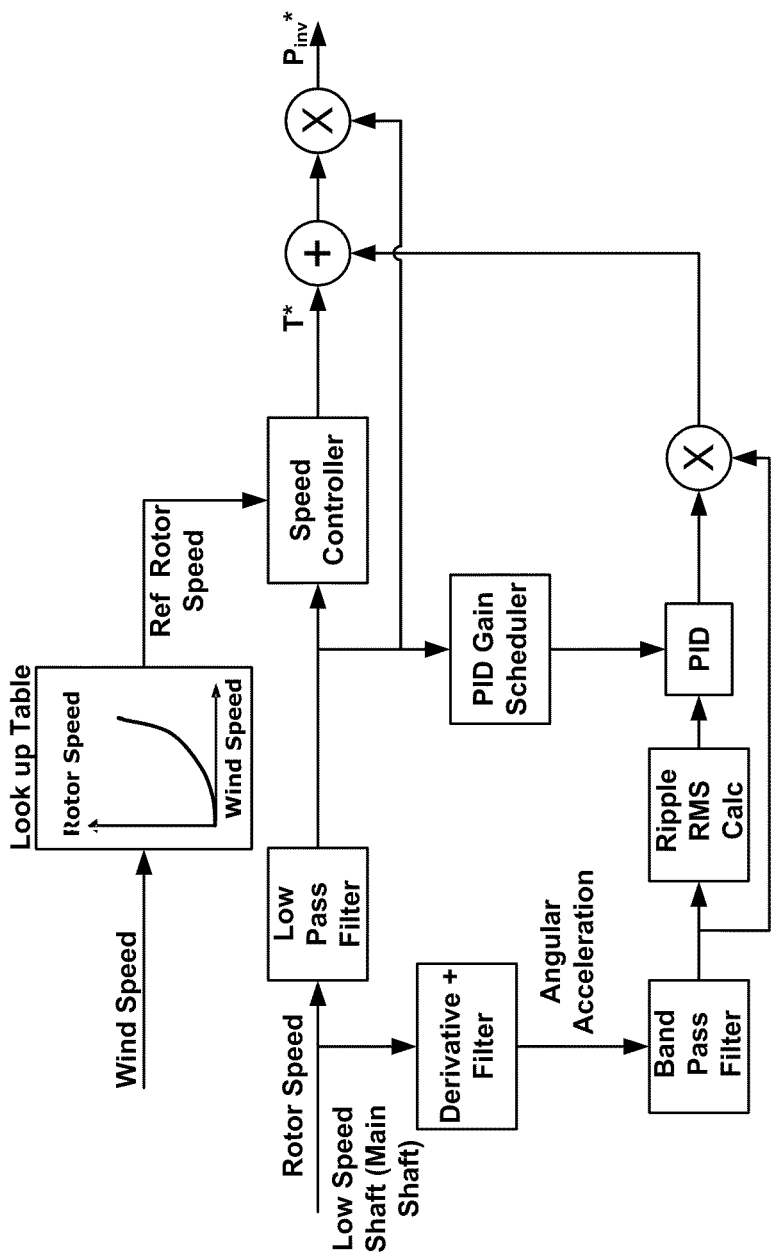
FIG. 3 shows a block diagram of an embodiment of the subject wind energy power conversion system with a stress reduction filter.

According to other aspects, an embodiment of the subject invention can process the incoming mechanic power through a stress reduction filter to substantially bypass a damaging frequency. As discussed above, the mechanical energy has two components, i.e., the torque and the angular speed. While the angular speed in a wind energy power conversion system is more or less constant over time, the torque typically is not. Torque is defined as follows:

$$T_m - T_{em} = J \times \frac{d\omega}{dt}$$

where $\omega$ is the angular velocity, J is the moment of inertia, and t is time. As the angular acceleration of the wind changes with time, torque can be expressed as a function of time, and will show certain frequencies. The mechanical power will therefore also be a function of time, showing certain frequencies. In one embodiment, the frequency of the torque can be obtained by determining the derivative of the rotor speed to obtain the angular acceleration, for example through a 'derivative' block as shown in FIG. 3, over a period of time. As noted above, elements such as the derivative block can be implemented in various ways including analog electronics and/or software routines.

A high-frequency torque, for example which may arise from a sudden wind gust, may stress the gearbox and therefore can be undesirable. In one embodiment, the high-frequency torque component (also referred to as unwanted torque component, UTC) can be compensated for by adjusting the torque of the electric generator. As the speed of the turbine is not subject to sudden changes (due among other factors to inertia of the components), the adjustment is made in the current of the AC/DC converter, which in turn affects the torque of the generator.

In one embodiment of the subject invention, the frequencies of the turbine rotor are processed through a stress reduction filter, such as a band pass filter. The band pass filter can be set up around an unwanted frequency of the gearbox as a center frequency with a certain shoulder or width about the center frequency. For example, if the unwanted frequency is 300 Hz, the band pass filter can be set up to pass frequencies about ±20% from the unwanted frequency, i.e. from about 240 to about 360 Hz, although other center frequencies and shoulder/width values are also possible. In addition, the filter may have various shapes (e.g. square or bell-shaped) depending on the capabilities of the system and the desired results. Thus, if a high-frequency torque occurs, for example, at 280 Hz, the current of the generator will be timely increased by an AC/DC active rectifier to substantially match the high-frequency torque. That is, a particular frequency torque component is applied to the output shaft of the gearbox (by applying the component to the AC/DC converter, which in turn affects the torque of the generator) to match and effectively 'cancel out' the frequency of the unwanted torque component on the input shaft of the gearbox.

In one embodiment, the current of the generator can be increased within about 10 milliseconds, although other response times are possible (and are typically a function of the system components and needs). The band pass filter can attenuate frequencies outside the predetermined band width, and therefore torques with those frequencies may not substantially affect the current of the generator. In one embodiment, the band width is set within ±20% from the unwanted frequency. In other embodiments, the band width can be set within other percentages from the unwanted frequency. FIG. 3 shows a block diagram of an embodiment of the subject wind energy power conversion system with a band pass filter. All embodiments may be used in conjunction with a gain scheduler (e.g. for maximum power point tracking, MPPT) to vary the gain of the incoming power signal at different levels of wind speed and further optimize the operation. By efficiently bypassing unwanted frequencies through a stress reduction filter, the stress on the gearbox can be reduced and therefore the lifetime of the gearbox can be extended.

In one embodiment, a stress reduction filter can be set up around the resonant frequency (also referred to as the natural frequency) of one or more components of the drive train, including the gearbox, the input shaft of the gearbox, the output shaft of the gearbox, and/or the generator. A high-frequency (generally tens to hundreds of Hz, although other frequencies are possible) torque can be particularly damaging if the frequency coincides with the resonant frequency of the gearbox or other components of the drive train. The resonant frequency can be obtained in various ways. For example, the resonant frequency can be obtained from the gearbox manufacturer, experimentally measured, or analytically calculated.

The method to calculate the resonant frequency of some of the elements of the drive train is detailed in Appendix A of the subject application. Once the resonant frequency is obtained, a band pass filter can be set up so that the damaging frequency can substantially bypass the gearbox.

In yet another embodiment, the output power during wind gust is compensated by ultracapacitors. Increasing $T_{em}$ may be accompanied by gradual dissipation of the energy stored in the ultracapacitors during gust or other transient torque event. The number of ultracapacitors required to perform embodiments of the present invention will depend on a variety of factors such as the turbine, the generator, the voltage of the DC link, and the power requirements of the grid, among others. For example, for a 1.65 MW/690 V turbine, the minimum voltage required for the DC link is about 1050 V. Assuming that the minimum voltage of a lithium-ion ultracapacitor is 2.2 V, a total of about 460 ultracapacitors can be placed to meet the DC link minimum voltage requirement. The voltage of each lithium-ion ultracapacitor usually has a range. For example, if the maximum voltage of a lithium-ion capacitor cell is about 3.8 V, the aggregate DC link voltage of 460 ultracapacitors may rise up to about 1750 V, and the power converters would need to be able to tolerate that voltage. These ultracapacitors can provide a stress reduction solution complementary to existing control techniques such as rotor pitch control. In one embodiment, the wind energy power conversion system comprises ultracapacitors without a stress reduction filter. In another embodiment, the wind energy power conversion system comprises ultracapacitors and a stress reduction filter in combination. In still other embodiments, the stress reduction filter is used without the ultracapacitor feature.

Improving Power System Stability

According to one aspect, the invention provides a wind energy power conversion system with energy storage systems for short-term periods. To this end, ultracapacitors can be connected to the power converter. During a wind gust, for example, the ultracapacitors can store the power surge for a short term, and when the gust is over, the ultracapacitors can discharge the stored energy to the generator, which then speeds up and reduces the gearbox stress. The ultracapacitors can be charged by an AC/DC active rectifier and discharged by a DC/AC inverter.

Figure 4:
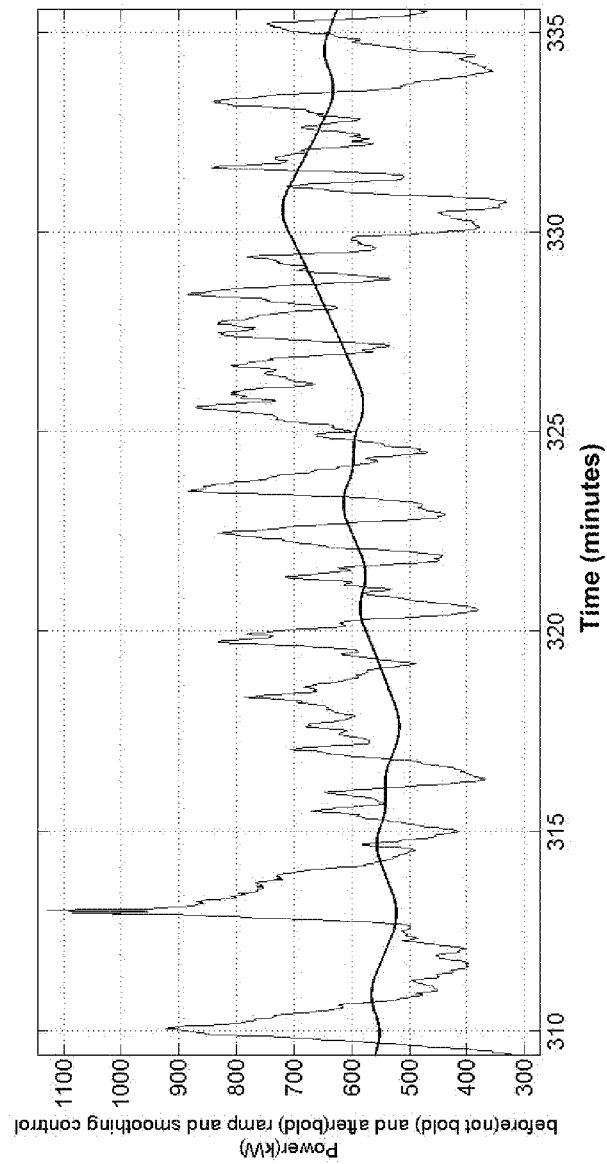
FIG. 4 is a graph plotting the output power of a turbine before and after power ramp control and power smoothing.

In one embodiment, the wind energy power conversion system disclosed here can provide voltage regulation and reactive power support during short circuit, voltage sag, short term frequency droop, and power ramp control. In another embodiment, the wind energy power conversion system can also provide short term power smoothing for the output power due to the presence of the ultracapacitors, as shown in FIG. 4. When the frequency drops at grid side, the ultracapacitors can be discharged to increase the output power. In case of a sudden frequency increase, the AC/DC converter can be utilized to charge the energy storage and lower the output power.

In another embodiment, the invention provides a method of controlling the power ramp rate in a wind energy power conversion system, for example at about 5% per minute for a one-minute average (although other rates are possible), by quickly charging and discharging ultracapacitors. Utility companies may be cognizant of a ramp up and ramp down rate for wind farms due to wind speed change. For example, for a typical system, the ramp up and down rate may be limited at 5% per minute for a one minute average. Charging and discharging of ultracapacitors can be controlled to reach this ramp rate level for each individual turbine (as opposed to an average for the entire wind farm). It should be noted that in systems without a short-term energy storage, frequency droop support and power ramp support are performed by adjusting the incoming electric power from the turbine which decreases the power capturing efficiency of the turbine.

System Control

In one embodiment, the active AC/DC converter is controlled to run the generator at a rotor speed where the wind turbine output power is maximized. This state is called the Maximum Power Point Tracking (MPPT) state. The rotor speed for the MPPT state in turn depends on the wind speed. The correlations among the wind speed, optimal rotor speed, and the active power for the AC/DC converter can be stored in a look-up table. Then, at a given wind speed, the AC/DC converter can refer to the look-up table and adjust the electromechanical torque of the generator so that the rotor operates at an optimal speed. There may be short-term fluctuations where the rotor speed is not exactly at an MPPT optimal but rather in the vicinity. In that case, the kinetic inertia of the rotor can be leveraged to adjust the rotor speed to optimal, thereby smoothing short-term fluctuations in the output power of the wind turbine. But if the rotor speed is substantially away from the MPPT state, for example during a sudden wind gust, the AC/DC converter can adjust the electromechanical torque of the generator and mitigate short-term fluctuations of the torque applied to the gearbox. By holistically controlling the output power and short-term energy storage at a given wind load, the wind energy power conversion system can be maintained near the MPPT state.

A configuration of an embodiment of the subject wind energy power conversion system is shown in FIG. 1. This embodiment includes a gearbox 10, a generator 12, an AC/DC converter 14, a DC/AC converter 16, a DC link 18 between the AC/DC converter 14 and the DC/AC converter 16, and ultracapacitors 20 connected to the DC link 18. The DC link is sometimes also known as DC bus. In one embodiment, the AC/DC converter 14 is a pulse-width modulation rectifier, and the DC/AC converter 16 is a pulse-width modulation inverter. As shown in FIG. 1, the AC/DC converter 14 and DC/AC converter have current control inputs. The current control for the AC/DC converter 14 has inputs that are a function of the maximum power point tracking (MPPT) speed control, the stress reduction/band pass filter, and torque control systems. The MPPT speed control and the stress reduction filters have as inputs the angular velocity and/or acceleration of the input shaft of the gearbox, where the input shaft of the gearbox is generally the same as the turbine drive shaft. The AC/DC converter 14 may have inputs corresponding to the frequency, voltage, and/or current levels of the electrical connections between itself and the generator 12, between itself and the DC/AC converter 16 (i.e. the voltage and current on the DC link 18), and the frequency, voltage, and/or current levels on the grid. Similarly, the DC/AC converter may also include as input the frequency, voltage, and or current levels of the generator-AC/DC converter link, the DC link, and the grid. Finally, the pitch controller, yaw controller, and turbine overall control are also linked into the system to provide suitable control.

The AC/DC converter 14 may be an active rectifier, adjustments to which affect the electromechanical torque of the generator so that the turbine can operate at the MPPT state. The active power for the AC/DC converter 14 for the MPPT state varies as a function of the optimal rotor speed. As explained above, at a given wind speed, the AC/DC converter can refer to a look-up table and adjust the electromechanical torque of the generator so that the rotor operates at an optimal speed. In one embodiment, the AC/DC converter 14 can be controlled so that the torque applied to the gearbox 10 does not fluctuate at particular (typically higher) frequencies.

The DC/AC converter 16 controls export of power to the grid and, in conjunction with the AC/DC converter 14, controls the DC link 18 voltage. Changes in the DC/AC 16 converter current can lead to discharge of the ultracapacitors 20, depending on the state of charge, change in wind speed, and grid side disturbances.

The ultracapacitors 20 provide a high-power-density storage with a suitably rapid response time in the subject wind energy power conversion system. Ultracapacitors are sometimes shortened as ultracaps. One example of an ultracapacitor is a lithium ion capacitor. Lithium ion capacitors have advantages such as being relatively safe to operate and providing a long cyclic life. In another embodiment, ultracapacitors include electric doublelayer capacitors, super capacitors, and electrochemical capacitors. The operating cell voltage of a lithium ion capacitor can be between about 2.2 V and about 3.8 V. The ultracapacitors 20 are coupled to the DC link 18 in a parallel configuration, and absorb transient energy surges during a transient torque events such as wind gusts. When the event subsides (e.g. the wind speed stabilizes), the DC/AC converter 16 can be used to discharge the ultracapacitors 20 and export the output power to the grid at a predetermined, controlled rate. In one embodiment, the DC/AC converter 16 can discharge the energy with a response time of about 10 milliseconds. In various embodiments, the discharge rate of the ultracapacitors 20 is controlled such that the voltage of the DC link 18 is maintained within a suitable range.

Thus, the invention provides, among other things, a wind energy power conversion system with integrated energy storage systems, a band pass filter, or both. Various features and advantages of the invention are set forth in the appended claims.

APPENDIX A

Mechanical Stress Reduction in a Gearbox for Variable Speed Wind Turbine Generator

Phase I. Simple Dual Mass Gearbox System

Abstract

With the advent of power electronics, the size and the cost of power converters have been drastically reduced. The use of variable speed wind power generation has seen a very significant growth. In the past fifteen years, significant improvements have been made on the control algorithms for wind turbine generator (WTG). In the beginning, the investigation was focused on the optimization of energy harvest and grid compliance.

The Direct Drive (DD) wind turbine generator concept has been pursued by several turbine manufacturers. The DD concept allows the generator to be connected directly to the low speed shaft where the blades directly drive the generator without the need for gearbox. Unfortunately, for a wind turbine generator, the rotational speed is limited by the blade tip noise. As the size of the wind turbines increases, the blade length is also increased. However, the tip speed must be kept limited. As a result, the rotational speed must be decreased as the blade length is increased. Large generator ratings with low rotational speed result in large dimensional size and heavy weight. Thus, the tower structure to support the generators must be reinforced to carry the weight and to withstand additional aerodynamic loads.

The use of a gearbox allows for smaller size, lower weight, and higher speed generators. In this paper, we attempt to extend the life and reliability of the gearbox by reducing the mechanical stresses on the gearbox. Several concepts will be investigated and the results will be presented in a table for comparison.

Introduction

Wind power generation has been growing very aggressively in the past five years. By the end of 2009, there was 35 GW of installed capacity in the US. With the goal of 20% wind penetration by 2030, the installed capacity is predicted to grow to more than 300 GW of installed capacity.

In the early development of WTG, a squirrel cage induction generator was used as the generator of choice. This configuration is also known as Type 1 WTG. The induction generator is very simple, rugged, and low cost. It requires reactive compensation, and switched bank capacitors are connected to the induction generator and the level of compensation adjusted with the level of generation to get to unity power factor.

The next type of wind turbines is type 2 WTG, where a wound rotor induction generator is used. This configuration allows access to the rotor winding of the induction generator. The rotor winding is connected to power electronic circuits with external rotor resistors used to regulate the effective rotor resistance. The power electronics and the rotor resistors are rotating and there is no slip rings needed. Thus, by allowing the effective rotor resistance to vary, the torque-speed (or power-speed) of the WTG can be shaped.

The type 3 WTG is the variable speed wind turbine generator with a doubly-fed induction generator (DFIG). The use of DFIG allows a partial size of the power converter to be used instead of the full size power converter. The power converter is connected to the rotor winding via a slip ring and it processes the slip-power of the induction generator. The operation is usually between +0.3 p.u. slip to −0.3 p.u. slip, thus allowing a variation of from rated speed to half of rated speed.

The 4 WTG is a variable speed generator with a full power converter to process the entire output power of the generator. The power converter is installed between the generator and the grid. It can buffer the interaction between the generator and the grid.

In this paper, only the variable speed WTG (type 3 and type 4 WTGs) will be investigated. The basic of mechanical gearbox will be presented in Section II. In section III, different control algorithms will be presented to control generator and power converter unit (GPU) to reduce mechanical stresses. In section IV, other alternative concepts will be presented to achieve a compromise between performance and cost.

Gearbox Modeling

The gearbox is a mechanical device capable of transferring torque loads from a primary mover to a rotary output, typically with a different relation of angular velocity and torque. In the case of wind turbines, the gearbox connects the low-speed shaft and the generator; therefore its gear ratio generally is dictated by the requirement of the generator and the angular velocity of the rotor.

Figure 5:
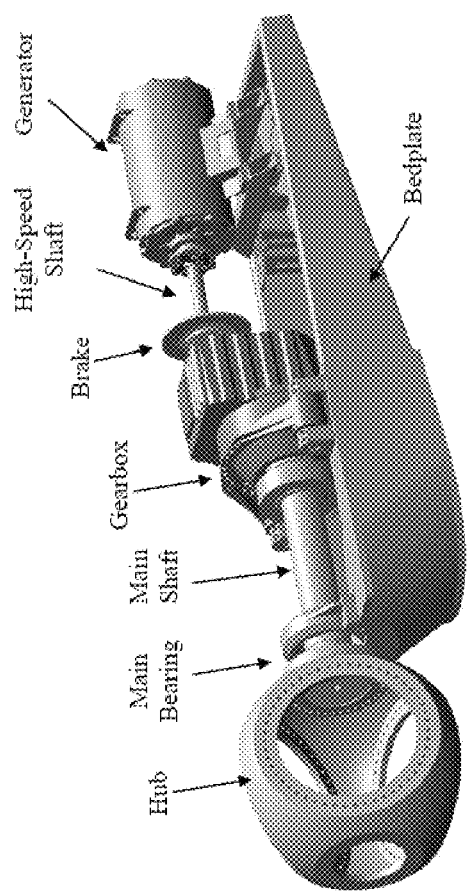
FIG. 5 illustrates a modular drive train configuration.
Figure 6:
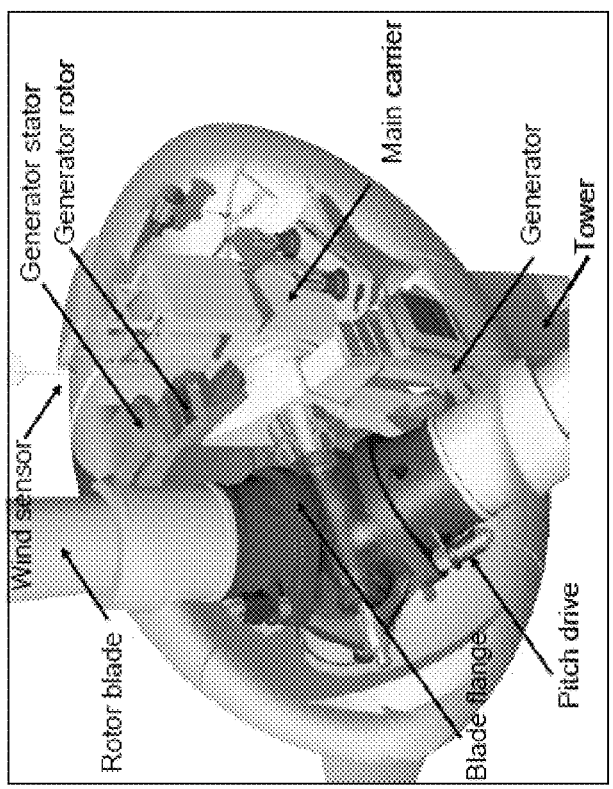
FIG. 6 illustrates an Enercon direct power train configuration.

In this section different aspects of gearbox modeling will be presented. With the use of gearbox, the rotational speed of the main shaft (low speed shaft) can be increased significantly, allowing the use of a high rotational speed generator. A high speed generator has a smaller dimension and lighter weight, thus, the requirement for the supporting structure and the transportation is less stringent than a direct drive generator. A typical modular drive train configuration can be shown in FIG. 5 with the gearbox connected between the blades and the generator. In FIG. 6, a typical Enercon direct drive (no gearbox) configuration is shown.

Figure 7:
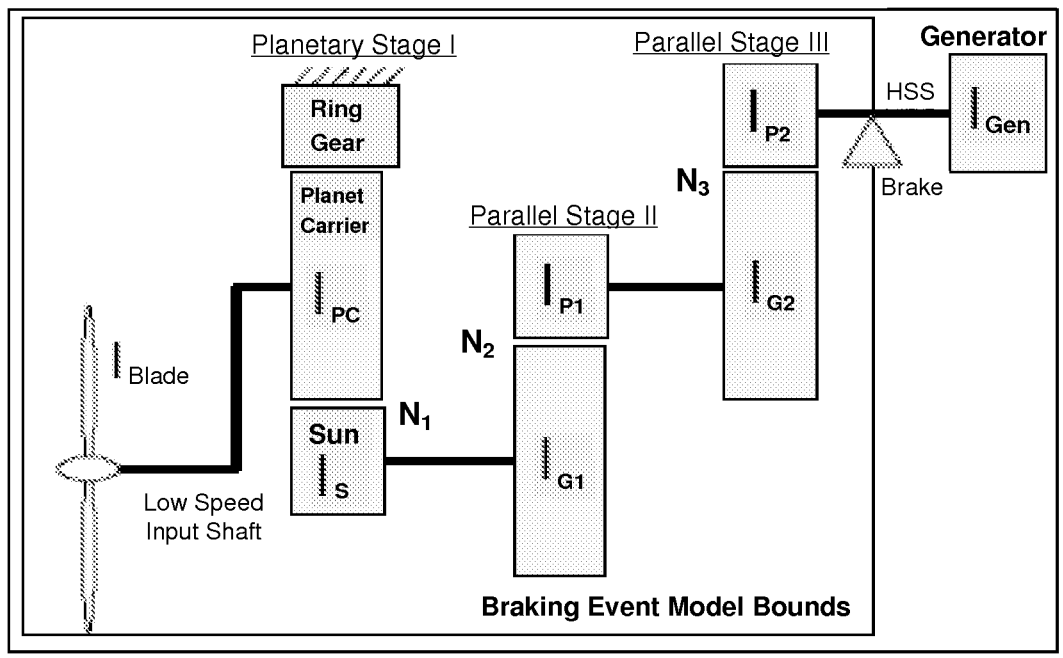
FIG. 7 illustrates an equivalent one stage drive train with a single stiffness and dual mass model.
Figure 7:
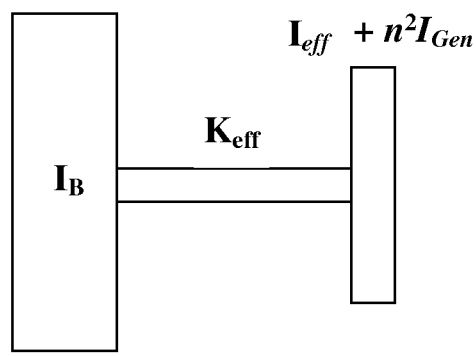

The drive train model can be simplified from multiple stage model (FIG. 7*a*) into a single shaft with dual inertia as shown in FIG. 7b. The equivalent stiffness coefficient $K_{eff}$ and the effective inertia $I_{eff}$ can be found from the following equations.

The effective moment of inertia (The generator not included) can be computed as $I_{eff}=I_{PC}+N_1^2[I_S+I_{G1}+N_2^2[I_{P1}+I_{G2}+N_3^2[I_{P2}]]]$ where $I_{eff}$=Effective inertia
$I_{PC}$=Planetary Carrier inertia
$I_S$=Effective inertia
$I_{G1}$=Stage 1 G1 inertia
$I_{P1}$=Stage 1 P1 inertia
$I_{G2}$=Stage 2 G2 inertia
$I_{P2}$=Stage 2 P2 inertia
$I_{Gen}$=Generator inertia
$N_1, N_2, N_3$=Gear ratio
$n=N_1N_2N_3$ The effective stiffness can be computed as:

$$\frac{1}{K_{eff}} = \frac{1}{K_{SA}} + \frac{1}{(N_1)^2 K_{SB}} + \frac{1}{(N_1)^2(N_2)^2 K_{SC}} + \frac{1}{(N_1)^2(N_2)^2(N_3)^2 K_{SD}}$$

where $K_{eff}$=Effective stiffness
$K_{SA}$=The stiffness for the shaft connecting rotor to gearbox
$K_{SB}$=The stiffness for the shaft connecting stage1 of gearbox to stage 2
$K_{SC}$=The stiffness for the shaft connecting stage2 of gearbox to stage 3
$K_{SD}$=The stiffness for the shaft connecting stage3 of gearbox to generator The effective value of the natural frequency can be calculated as:

$$\omega_n = \sqrt{\frac{k_{eff}(I_{eff} + I_g)}{I_{eff} I_g}}$$

Figure 8:
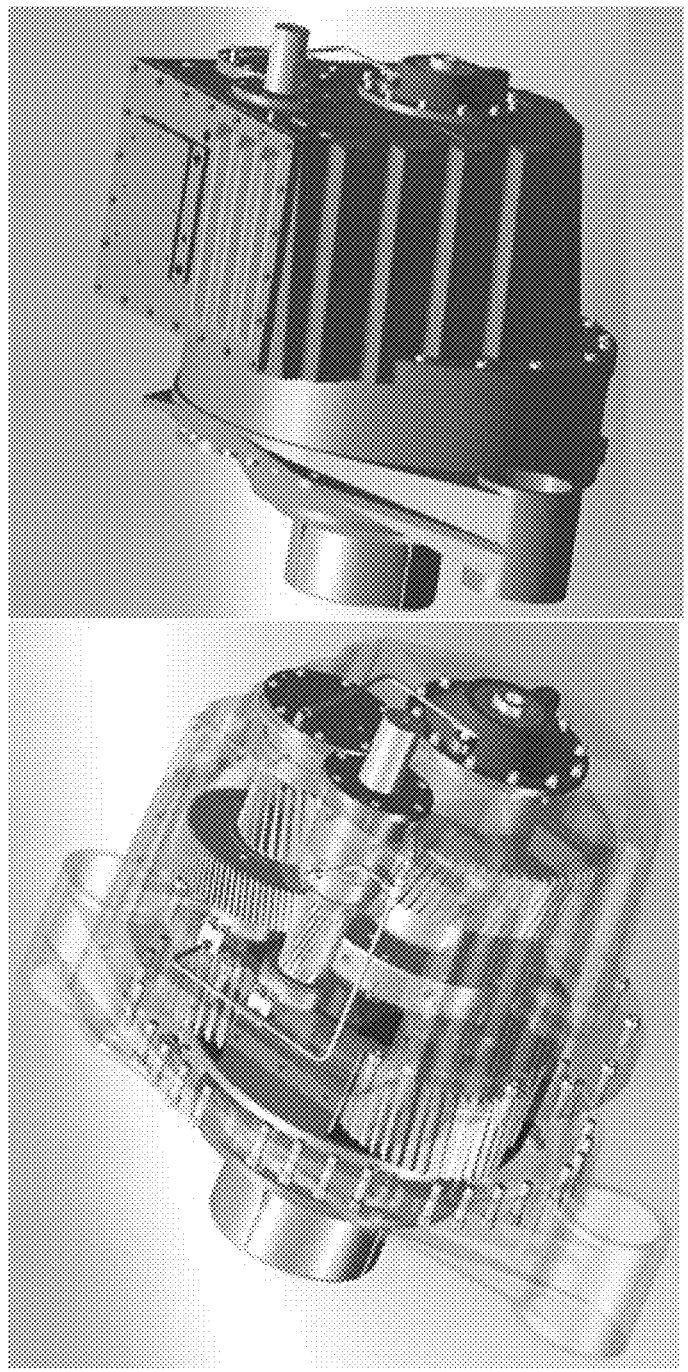
FIG. 8 is a Gearbox CAD model used to find the physical parameters in the dynamic model.

FIG. 8 shows of the configuration of the gearbox studied in this paper. The output of the gearbox (high speed shaft) is connected to the generator. The mechanical brake is connected to the high speed shaft. In this report, the gearbox data is based on a fixed speed turbine. The turbine has a dual-speed property. It is common for a fixed speed wind turbine to have dual speed operation using induction generator. The generator has two sets of stator windings. One set of winding is dedicated to generate at lower rpm and the other set of winding is dedicated to generate at rated rpm. The data of the wind turbine that we have used is a 750 kW, 60 Hz, fixed speed wind turbine with a six-pole stator winding for lower speed (1200 rpm) operation and a four pole stator winding for higher speed (1800 rpm) operation. In the lower wind speeds range, the turbine is operated at lower rpm and in the higher speed range, the wind turbine is operated at higher rpm to optimize the aerodynamic efficiency.

Several tests were conducted to find the parameters of the gearbox. The first data to be used is the braking event where the mechanical brake is applied to stop the WTG. Note the brake is applied at the higher speed (generator) side of the gearbox. In the braking event, the generator dynamic is excluded from the system, thus, the characteristic of the dynamic of the gearbox excluding the generator can be found. Under this condition, the system is considered as a one-degree freedom system.

Figure 9:
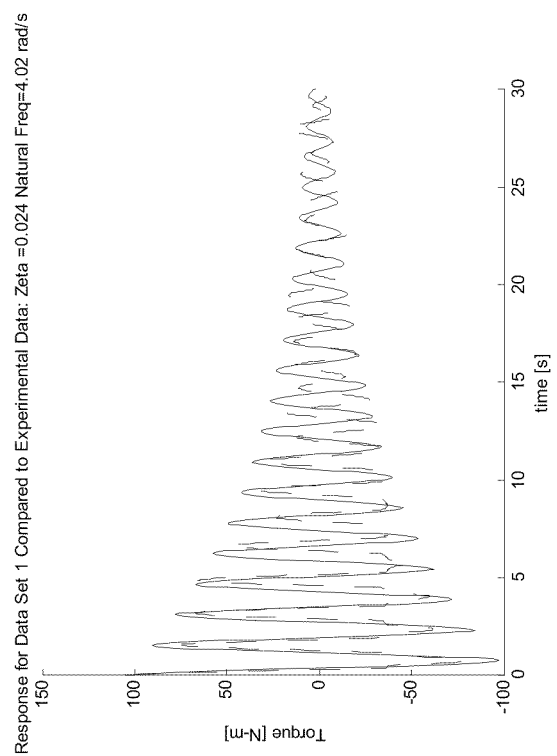
FIG. 9 is a graph plotting traces of the torque from simulation (solid line) and from the recorded data (dashed line).

The simple dynamics during the braking event is shown in FIG. 9. The solid line is the recorded data and the dashed line is the simulation result. Similarly, in FIG. 10, the switching transients are shown to illustrate transition from lower speed operation to rated speed operation.

Figure 10:
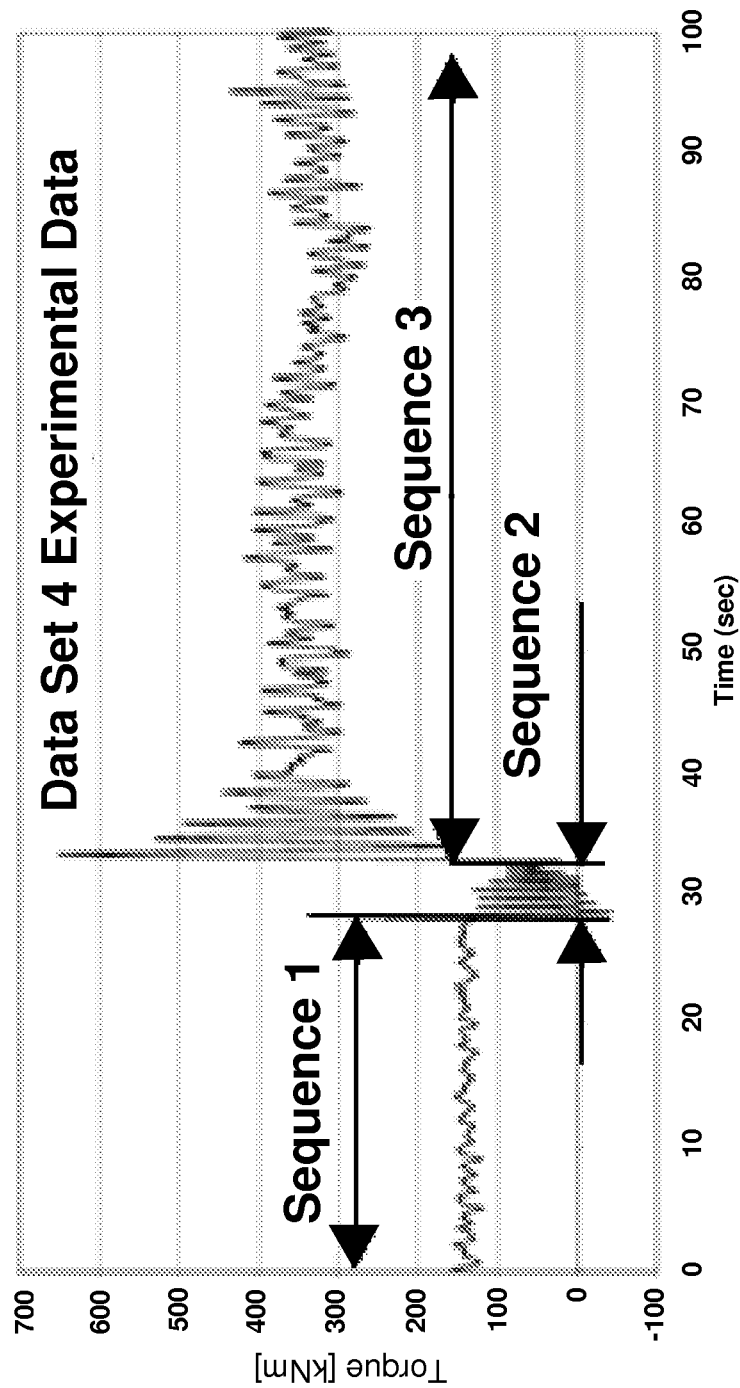
FIG. 10 is a graph plotting the measured torque during transition from low rotational speed (1200 rpm) to a higher rotational speed (1800 rpm).

In FIG. 10, a transient event from low speed operation to high speed operation was tested. There are three different sequences during this event. The first sequence is the steady state operation at lower rpm. In this case, both the generator and the hub are connected to the gearbox $T_{aero}=T_{gen}$ operating at 1200 rpm The next sequence is the operation where a transition is occurred. The generator is disconnected from the grid, the rotor speed increases as the aerodynamic torque drives the rotational speed to a higher rpm. In this case both the hub (blades) inertia and the generator inertia are part of the dynamics.

$T_{aero}>0$ and $T_{gen}=0$

Rotational speed increases from 1200 rpm to 1800 rpm

The next sequence is the operation where the generator is reconnected and it holds the rotational speed at 1800 rpm.

$T_{aero}=T_{gen}$ operating at 1800 rpm

The solid model representation of the gearbox model is analyzed based on the data from a typical wind turbine generator. The following table is the result of calculation based on Solid Modeling information.

TABLE I

CALCULATED SHAFT STIFFNESS FOR DIFFERENT PARTS OF THE GEARBOX
Shaft Stiffness

| Shaft | ksA | ksB | ksC | ksD |
| --- | --- | --- | --- | --- |
| Din [m] | 0.065 | 0.060452 | 0 | 0 |
| Dout [m] | 0.329946 | 0.184912 | 0.171958 | 0.116 |
| J [m⁴] | 0.001162 | 0.000113 | 8.58E−05 | 1.78E−05 |
| G [N/m²] | 8.00E+10 | 8.00E+10 | 8.00E+10 | 8.00E+10 |
| L [m] | 2.515036 | 0.37084 | 0.0254 | 0.685 |
| ks [N − m] | 3.69E+07 | 2.45E+07 | 2.70E+08 | 1.20E+05 |

The inertia computed from the solid modeling is given in the table below:

TABLE II

CALCULATED INERTIA FOR DIFFERENT PARTS OF THE GEARBOX
Individual Inertia Data

| Solidworks | Iblade | 998138.4 |
| --- | --- | --- |
| | IPC | 116.72 |
| | IS | 1.02 |
| | I1G | 31.72 |
| | I1P | 0.4 |
| | I2G | 3.42 |
| | I2P | 0.08 |
| | IGen | 24 |
| Total | | 1000423 |

Comparison of the results obtained from experimental data, braking event for 1 DOF and sequence 2 of data set 4 for 2 DOF, and analytical data can be tabulated below:

TABLE III

COMPARISON BETWEEN ANALYTICAL AND EXPERIMENTAL
DATA EFFECTIVE VALUES OF THE STIFFNESS
AND THE INERTIA (FOR 1 DOF)

| Analytical Global Values | | Experimental Global Values | | |
|---|---|---|---|---|
| Stiffness | Inertia | Stiffness | Inertia | Damping |
| 3.45E+07 | 1000422.988 | 2.27E+07 | 1000423 | 1.69E+05 |

TABLE IV

COMPARISON BETWEEN ANALYTICAL AND EXPERIMENTAL
DATA EFFECTIVE VALUES OF THE STIFFNESS
AND THE INERTIA (FOR 1 DOF)

| Analytical Global Values | | Experimental Global Values | | |
|---|---|---|---|---|
| Stiffness | Inertia | Stiffness | Inertia | Damping |
| 3.23E+07 | 1000422.988 | 2.13E+07 | 1000423 | 2.56E+05 |

The results for the natural frequency obtained using two different methods are tabulated below:

TABLE V

COMPARISON BETWEEN ANALYTICAL AND
EXPERIMENTAL DATA EFFECTIVE VALUE OF
THE NATURAL FREQUENCY (FOR 1 DOF MODEL)
Natural Frequency

| Analytical (rad/sec) | Experimental (rad/sec) |
|---|---|
| 5.8758 | 4.7607 |

TABLE VI

COMPARISON BETWEEN ANALYTICAL AND
EXPERIMENTAL DATA EFFECTIVE VALUE OF
THE NATURAL FREQUENCY (FOR 2 DOF MODEL)
Natural Frequency

| Analytical (rad/sec) | Experimental (rad/sec) |
|---|---|
| 18.0108 | 12.286 |

Generator, Power Converter, and Turbine

Figure 11:
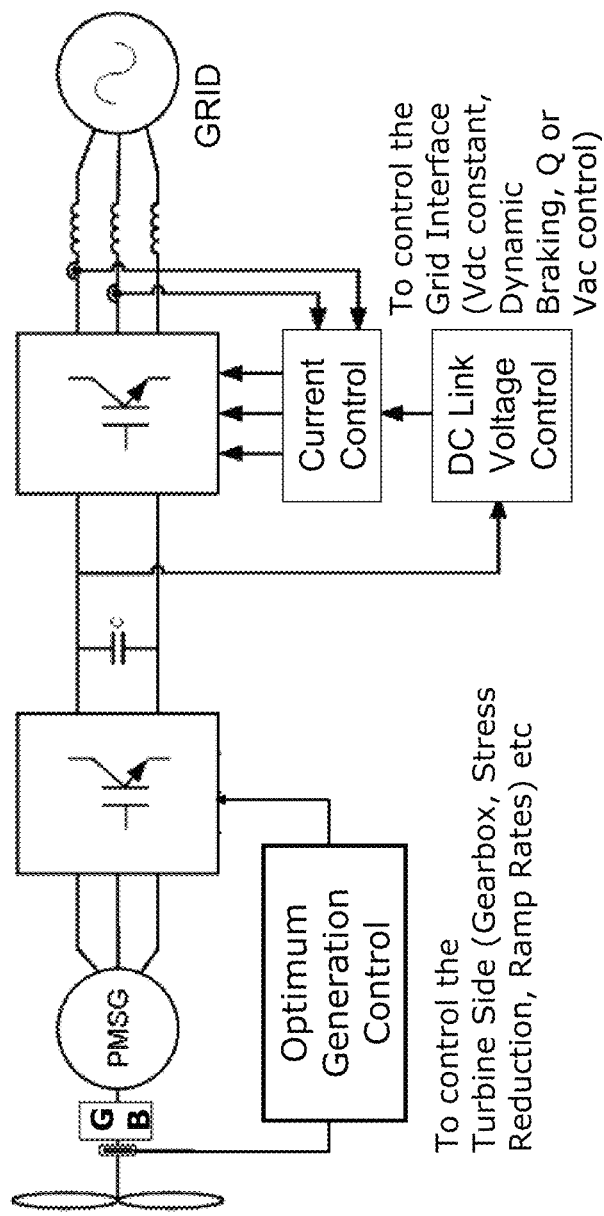
FIG. 11 is simplified control block diagram of wind turbine generator of type 4 (full power processing).

In this phase of the project, the fixed speed wind turbine in section II is assumed to operate in variable speed mode. A full rated power converter is connected to the induction generator to operate the induction generator in variable speed operations. This type of wind turbine is also known as Type 4 wind turbine generator (refer to FIG. 11). The limitation of a generator is the mechanical, thermal, and electrical. The limitation of power converter is on the thermal and electrical. Since the power converter is directly connected to the induction generator, the rating of the power converter is determined by the rating of the generator. In this paper, the generator and power converter unit (GPU) is treated as a single unit.

The size of an AC generator is determined by several parameters. The equation describing the relative size of an Ac generator can be expressed as $$D^2 Ln = \frac{5.48 \times 10^3}{\eta \cos\theta k_w q B_{gav}} \text{ kW}$$

Where:
D=diameter of the air gap (m)
L=length of the core (m)
n=rotational speed (rpm)
$B_{gav}$=average airgap flux density (T)
$\eta$=efficiency
cos θ=power factor
$k_w$=winding factor
q=electrical loading of the generator (ampere conductor/m)

From the equation presented, the left hand side (LHS) of the equation is proportional to the volume times the rotational speed. The right hand side (RHS) of the equation is dependent on the design requirements, once chosen, the RHS is a constant.

For a given set of the design requirements, the generator volume ($D^2L$) is inversely proportional to the rotational speed. Thus, by using gearbox as a speed increaser, the rotational speed of a generator can be made reasonably high and the size and weight can be optimized.

Besides the mechanical design requirements, the generator loading is normally limited by its winding insulation. The insulation of the winding is capable to withstand the voltage stress between conductors and between the conductor and the generator frame. The level of insulation degrades with the temperature. To protect the winding from overheating, the electrical loading (q) and the heat dissipation must be designed properly. With the limited cross-sectional area within a winding slot and the quality of insulation, the present line voltage level of electrical generator is limited to about 20 kV. Fortunately, the thermal time constant of average generator is relatively large and the over-current limit is usually specified in minutes.

While the efficiency of a synchronous generator does not degrade with the number of poles, the efficiency of an induction generator is affected by the number of poles. With the number of poles increases in an induction generator, the magnetizing inductance decreases significantly. As a result, the power factor and the efficiency will also decrease.

Many direct drive WTGs use synchronous generator with multiple poles. As the size of the WTG increases, the rotational speed decreases to maintain tip speed below its maximum noise levels, the size and the weight of the generator increases. At a certain point, the land transport limitation may become an issue for WTGs designed for onshore wind power plant. Offshore WPP may have an advantage on transport limitation over onshore WPP.

Discussions of tradeoff between direct drive WTG and geared WTG will not be the subject of this paper. But rather, different ways of preserving and extending the lifetime of a gearbox will be explored.

The power converter function in a WTG is to provide a good interface between the constant frequency ac (60 Hz) environment and the variable speed environment of the WTG. The power converter allows a variable speed operation of a WTG while generating a constant frequency 60 Hz AC. Thus, the power converter allows an optimum interface between the grid and the WTG, and an optimum energy conversion from aerodynamic power into electrical power.

The power converter has two sides of connections. The generator side is usually used to control the operation of the generator (operated at variable frequency) and the grid side (operated at constant frequency 60 Hz) is usually controlled to interface with the grid. The power converter is controlled to optimize the operation of the generator and wind turbine and to provide the grid compliance (low voltage ride through, voltage or reactive power control or power factor control etc.).

Unlike the generator where the thermal capacity of the electric machine is relatively high, the power semiconductor used in a power converter has a much smaller thermal capacity. Thus, the thermal limit of a power semiconductor is much stricter than the thermal limit of the stator winding in a generator. The hard limits (current carrying capability and voltage blocking capability) in a power converter must be followed very closely.

Wind turbine is operated from cut-in wind speeds (about 2-4 m/s wind speeds) to the cut-out wind speeds (about 25 m/s). The rated wind speeds is usually chosen to be 11-13 m/s. The choice is determined by the technical as well as economical decisions.

Figure 12:
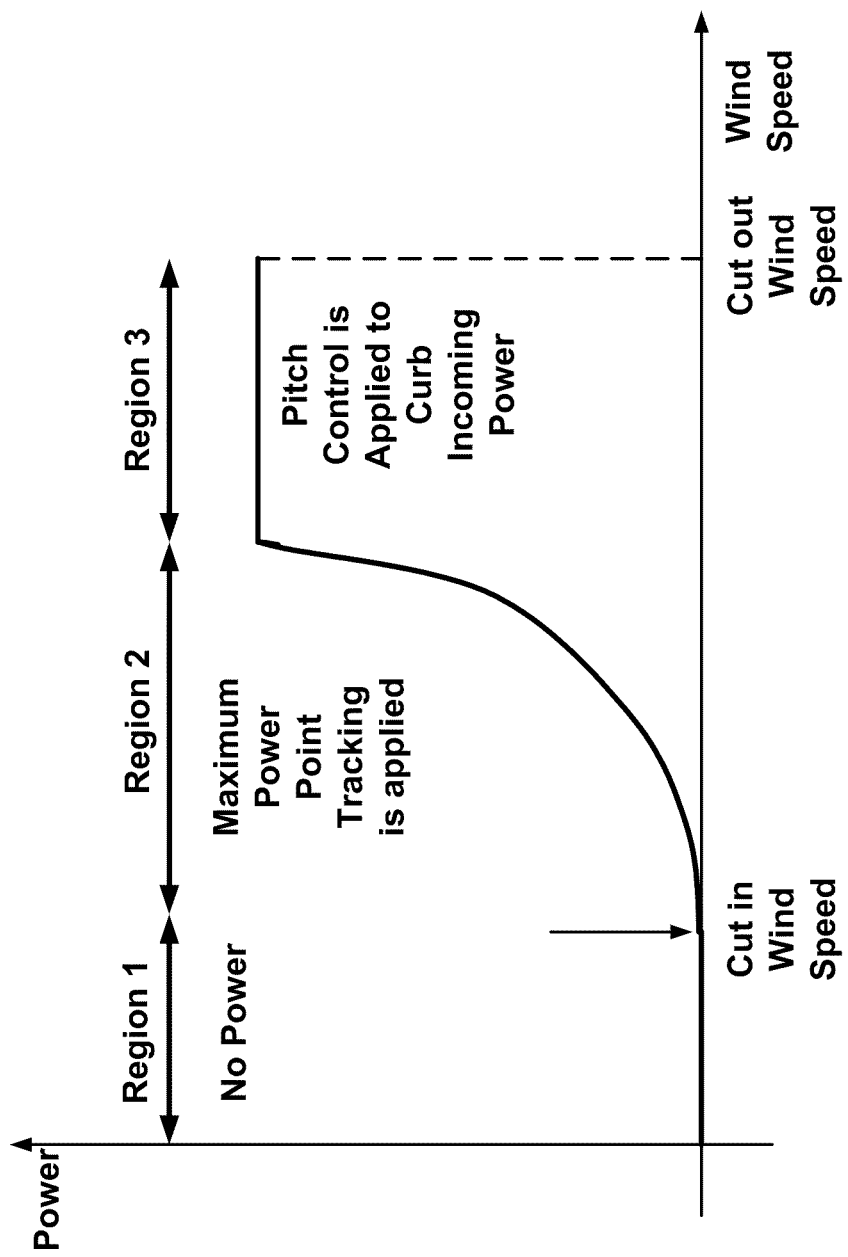
FIG. 12 schematically illustrates a power curve of a typical variable speed WTG.

The operating region of a variable speed WTG can be illustrated by the power curve shown in FIG. 12.

Control Algorithms

Figure 13:
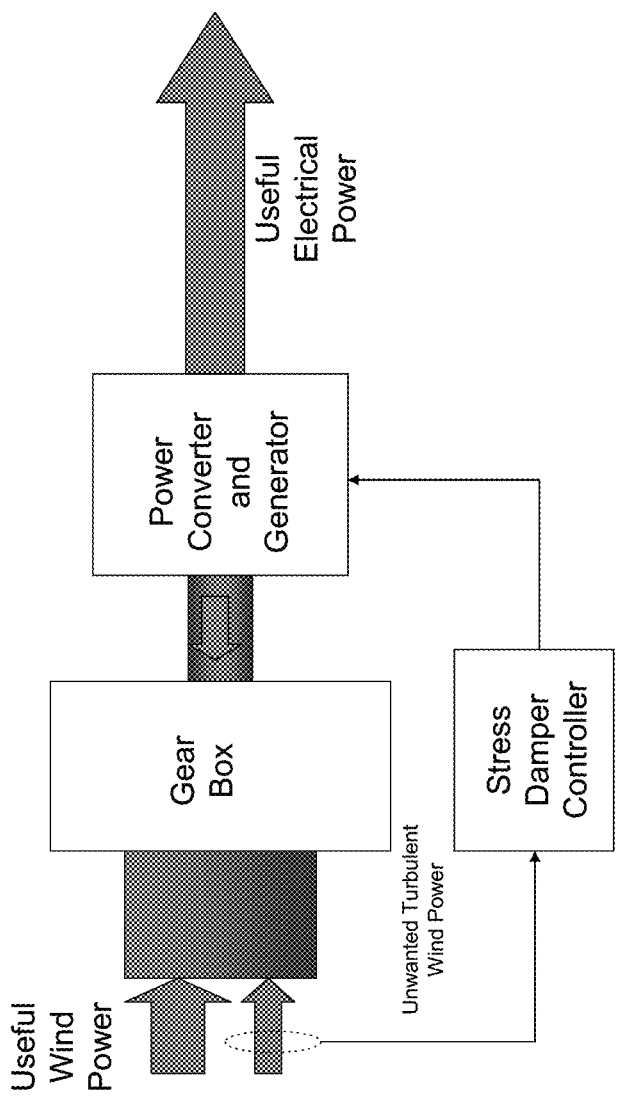
FIG. 13 is a block and power flow diagram illustration of gearbox stress reduction concept.

From section III the operation of the WTG systems was described. Although the use of power converter enables the flexible control of electrical generator, the limits of the power converter and the generator must be honored to operate the system in an optimum operating mode. The operation of a WTG and the sources of power fluctuations are very important factors to guide our control philosophy. The power flow diagram to illustrate the gearbox stress reduction concept is shown in FIG. 13. It is shown here that the power converter controls the generator to remove the unwanted torque components (UTC) from entering the gearbox. To minimize the gearbox wear and tear, the focus of UTC removal is based on removing the natural frequency of the gearbox found analytically or preferably from experimental data. This is accomplished by passing the UTC from energy conversion. It is shown that only the useful wind power will be processed by the gearbox, the unwanted torque components (UTC) will not be processed. Thus all the stress producing torque will be bypassed by the gearbox.

Figure 14:
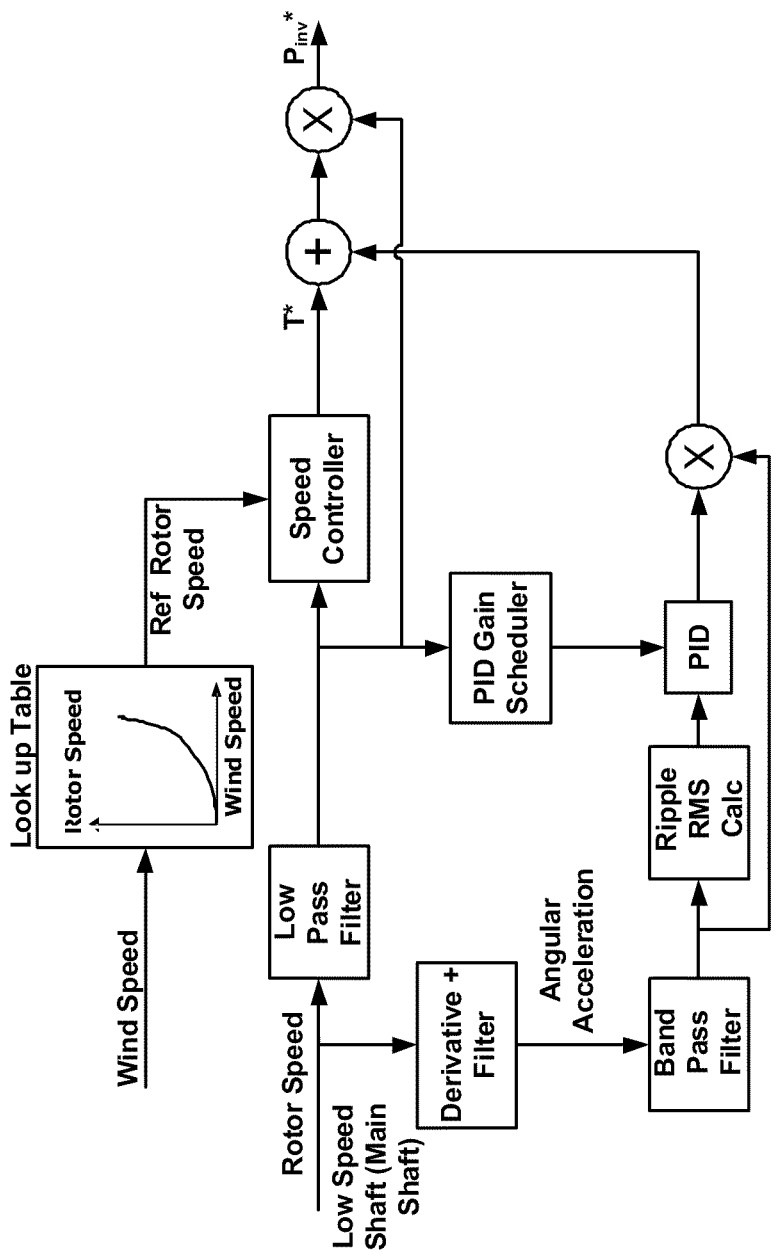
FIG. 14 is a block diagram of a variable speed WTG with a stress damper controller implementation.

The implementation of control block diagram for the proposed system will be called Stress Damper Controller (SDC) and it can be illustrated in FIG. 14. As shown in FIG. 14, the UTC is detected by sensing the rotational speed of the wind turbine. Since the instantaneous torque is proportional to the acceleration (J dω/dt), the rotor speed is passed through a 'derivative' block (to get the derivative of the acceleration) and the output signal is filtered through a band pass filter tuned to the natural frequency of the gearbox. The gain scheduler might be necessary to vary the gain at different level of wind generation.

The output power measured at the generator output contains the input aerodynamic power driving the main shaft. Without the SDC, all the input power from the main shaft is processed through the gearbox including the power oscillations that may create stresses in the gearbox. While it is difficult to keep all of the unwanted torque components from passing through the gearbox, it is possible to select the most damaging frequency from entering the gearbox.

The concept proposed a feedback control utilizing the angular acceleration measured at the main shaft. Since accelerometer is not installed, the acceleration is derived from the rotor speed. The average rotor speed is used to control the commanded output torque and the rotor acceleration is used to reduce the mechanical stress in the gearbox. Note that only the selected damaging frequency (SDF) is prevented from entering the gearbox. The absence of the SDF components from acceleration indicates that the SDF does not excite the gearbox. The gain scheduler is intended to change the gain of the controller. By programming the gain, the operation of the controller can be optimized.

Figure 15:
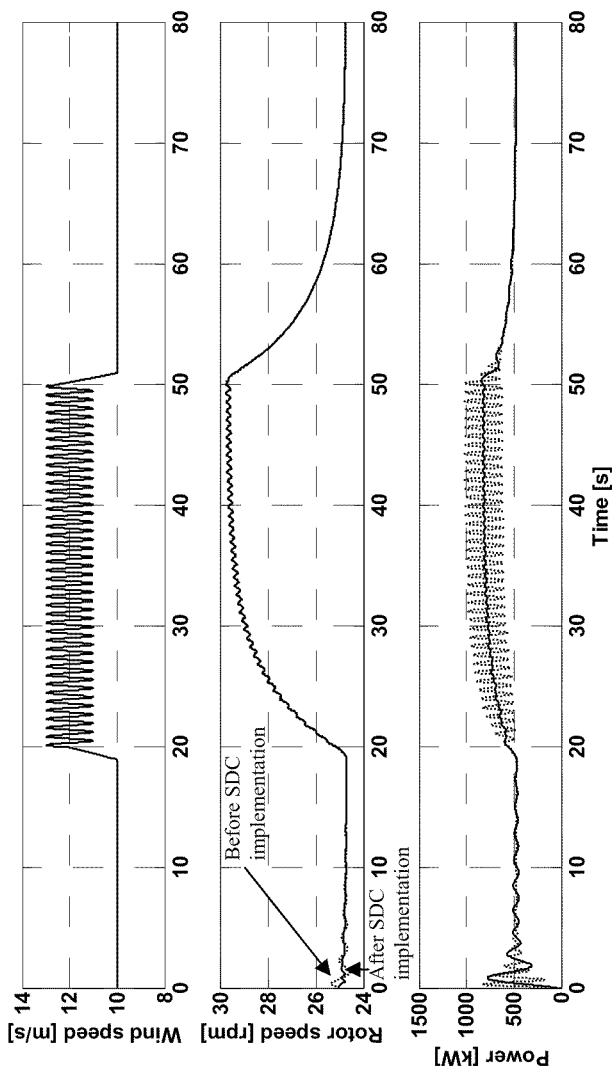
FIG. 15 shows graphs plotting wind speed, rotor speed, and output power before and after SDC implementation.

As an input to the wind turbine, the wind speed was fed with additional sinusoidal perturbation as shown in FIG. 15. The average wind speed was originally set to 10 m/s constant. At t=19 sec, the wind speed is increased to 12 m/s superimposed by a sinusoidal oscillation at the natural frequency of the gearbox (1.38 Hz) with an amplitude of 1 m/s. The wind speed is returned to 10 m/s at approximately t=50 sec. The corresponding rotor speed increases as the wind speed increases. The rotor speed increase is affected by the inertia of the system (blades, gearbox, generator, and other rotating masses). It reaches the final speed of about 30 rpm. Note, that below rated wind speeds, the output power is proportional to the cube of the rotor speed to optimize the aerodynamic power conversion (refer to FIGS. 12 and 14), and the output power increases to its final value. The output power contains not only the average power generated by average wind speed but also the oscillation component. As shown in FIG. 15, the trace before SDC implementation shows a worse output power oscillation than the one shown by the trace after SDC implementation, indicating that the SDC works properly as designed for. To remove the dynamics of the pitch control, in this stage, the pitch angle of the wind turbine has not been deployed yet, thus the generated oscillations will not be mixed with the pitch action response.

Results and Discussions

To observe the effectiveness of the SDC, the torque difference between input torque driving the main shaft and the output torque of the gearbox is measured. The input torque driving the main shaft is modulated by modulating the input wind speed to the wind turbine. The main shaft torque is also called the low speed shaft torque (LSS torque) and the output torque of the gearbox is also called high speed shaft torque (HSS torque). The HSS torque is the torque driving the generator shaft. This "torque difference" or ΔTorque is the torque that creates the twist angles on the gearbox multiple shafts. As of the difference in the rotational speed between the main shaft and the generator shaft, the torque must be scaled by its gear ratio to get the referred quantities. This torque difference is considered to be the torque observer. The signal output of the torque observer can be used as a measure of the effectiveness of the SDC.

Figure 16:
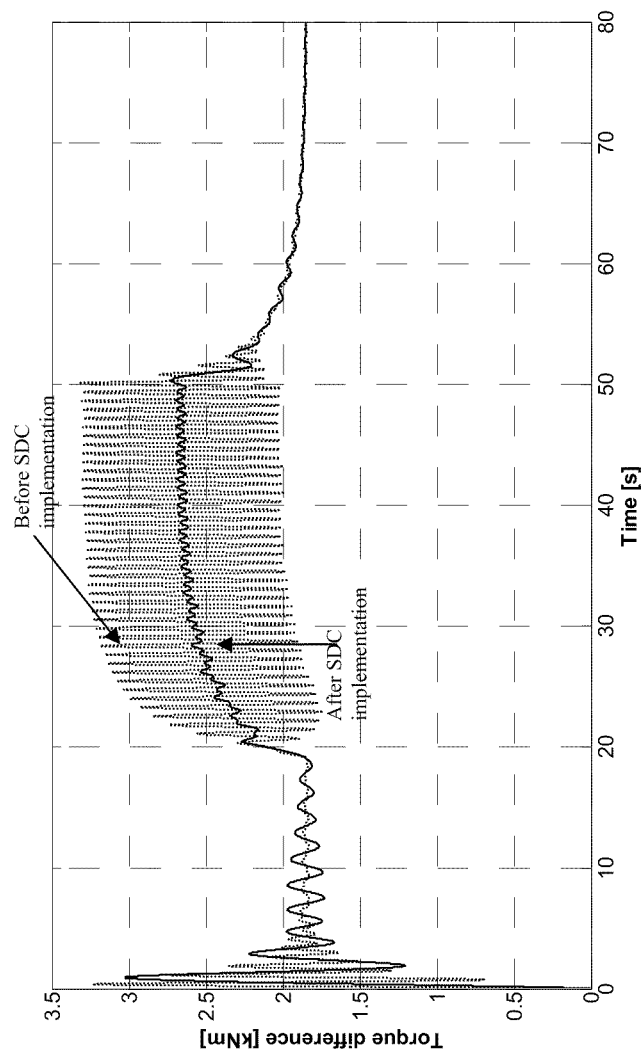
FIG. 16 is a graph plotting the impact of the step change and wind perturbation on the torque difference (ΔTorque) before and after SDC implementation.

In FIG. 15, the LSS rotational speed both before SDC implementation and after SDC implementation is shown to be very close because of the large inertia of the blades and gearbox helps to smooth out the rotational speeds. Note, that the UTC is removed from output when SDC is activated as shown in the output power. The effectiveness of the SDC is very clearly displayed if we compare the ΔTorque shown in FIG. 16 for the system before and after the SDC is activated.

Figure 17:
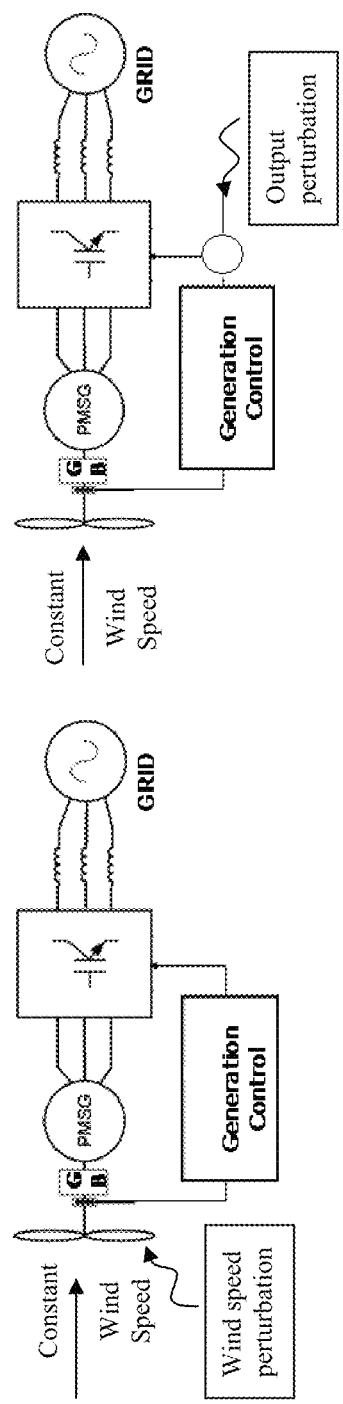
FIG. 17 schematically illustrates two types of perturbations to excite the gearbox modes.

From the analysis, the parameters of the gearbox and find the natural frequency can be derived. In a simulation this is done by perturbation of the output wind speed as shown by FIG. 17a or the perturbation of the output power as shown in FIG. 17b. The method shown in FIG. 17b is more suitable for a real wind turbine, the natural frequency of the gearbox can be found by using a test signal output perturbation. One way to test the natural frequency or UTC is to load the generator output by a test signal containing the UTC and measure the corresponding rotor speed response.

Figure 18:
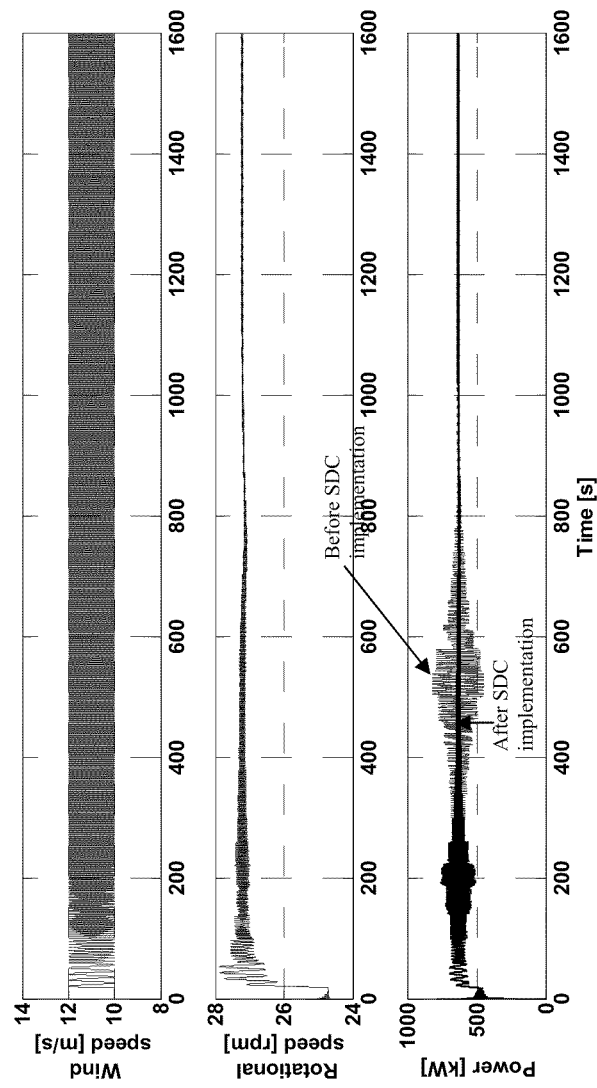
FIG. 18 shows graphs plotting wind speed, rotational speed and power before and after SDC implementation.
Figure 19:
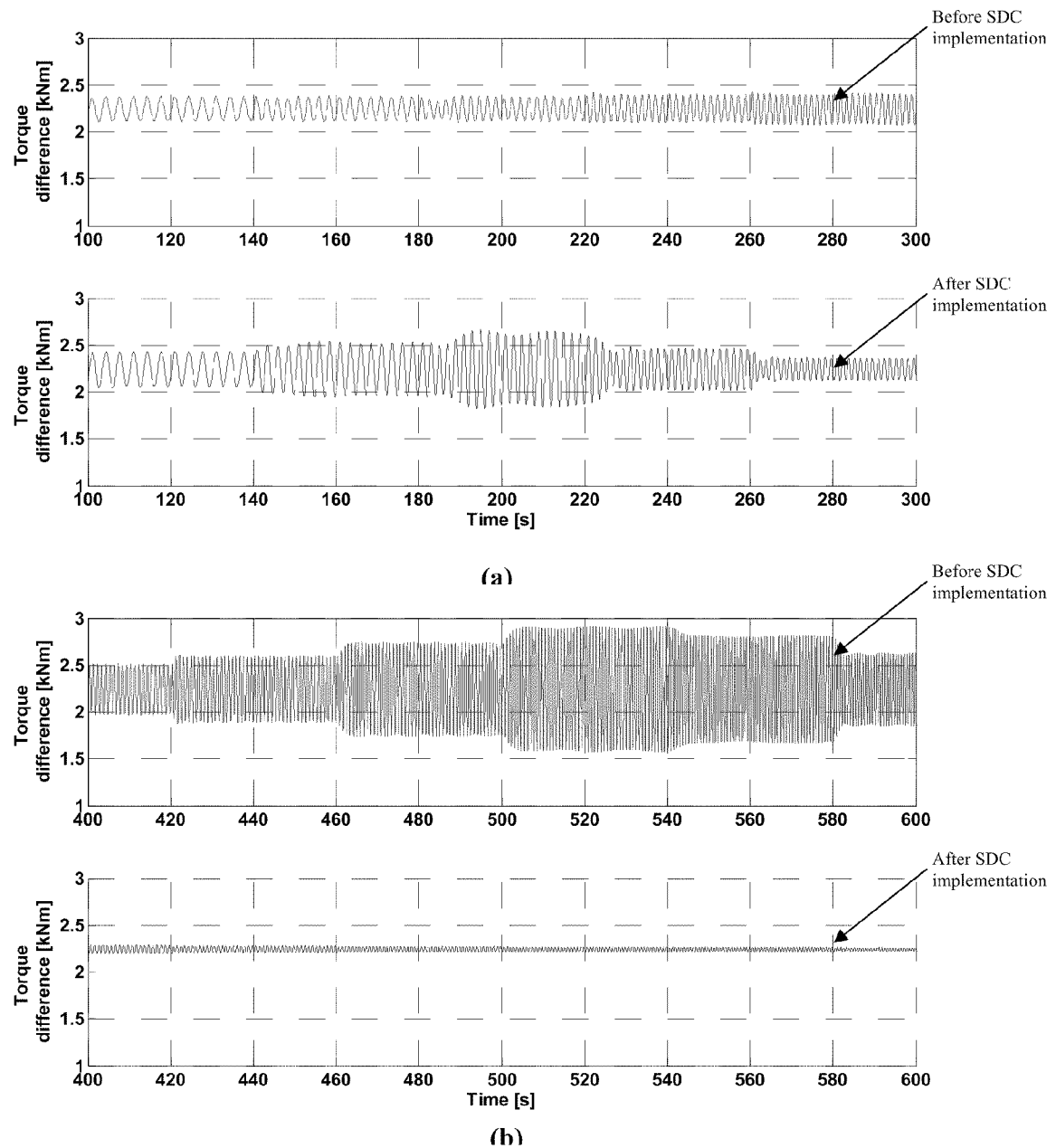
FIG. 19 shows a comparison of the torque difference (ΔTorque) before and after SDC implementation.

The response observable from the torque difference ΔTorque and rotor speed can be used as the indication that the gearbox mechanical resonance has been reached as illustrated in FIG. 18. To check the resonant frequency of the gearbox, in the simulation, the wind speed oscillation was varied from 0.1 Hz to 5 Hz. Frequency changed in 0.1 Hz increments, and stayed constant for next 40 seconds, until the frequency reaches 3 Hz. After that, increments were 0.2 Hz. As shown in the power response the amplitude of the power response increases around the resonant frequency of the gearbox calculated previously (around 1.38 Hz). After the SDC is activated, the resonant observed previously around 1.38 Hz disappears completely, instead, there is another resonant at around 0.5 Hz at a lower amplitude. The new resonant is at 0.5 Hz is the resonant of the system consisting the gearbox and the SDC. It is important to note, that the amplitude of the peak power due to oscillation at 0.5 Hz is much smaller than the one when the SDC is not activated. FIG. 19 is shown to compare the torque difference between the system with and without the SDC being activated.

Conclusions

A simulated variable speed wind turbine generator (wind turbine type 4) was studied. The actual wind turbine is a 750 kW fixed speed wind turbine, and the parameters of the gearbox is derived from both experimental data and the analytical data. In the simulation the parameters computed from analytical data is used. The wind turbine is controlled to suppress the unwanted torque components from entering the gearbox. The selected unwanted torque component is chosen based on the natural frequency of the gearbox computed from the gearbox parameters.

The control algorithm implemented has been shown to perform very well by eliminating the 1.38 Hz component from being processed by the gearbox. It is noted that another resonant frequency was detected around 0.5 Hz indicating that the controller implemented and the gearbox has a system resonant at 0.5 Hz. It is very important to check if this new resonant frequency corresponds to the resonant frequency of other parts of the turbine (e.g. blades, tower etc.). Otherwise, it may not be a valuable effort to save the gearbox, but it sacrifices the integrity of the whole turbine.

In the next phase of the project, the more complex representation of the gearbox will be investigated and modeled. Multiple modes (resonant frequencies) will be identified and multiple resonant frequencies will be mitigated. A gain scheduler may be implemented for different levels of wind generation and rotor speeds. Torque observers may be needed to activate different parts of the controllers.

APPENDIX B

Energy Storage for Short-Term and Long-Term Wind Energy Support

Abstract

Wind farm output power fluctuations both in short-term and long-term, create adverse effects on the voltage, frequency, and transient stability of the utility grid. In this paper, integration of wind energy with long-term energy storage devices to support the long-term and short-term shortcomings is discussed. Specifically, the energy storage is used for power ramp rate control, power smoothing, and power shifting. The utilized energy storage is zinc-bromide flow battery. The actual model of the battery is used in this study. Portions of the battery are allocated to short-term and long-term support. Actual load and wind farm power generation data are used in this study. The analysis shows that significant improvement can be made to shape the output power of the farm using the energy storage system.

I. Introduction

The global electrical energy consumption is rising, and this demand is going to increase the power capacity. Within 20 years, it is expected that this demand will be doubled. Therefore, the use, distribution, and production of electrical energy should be as technologically efficient as possible. Since deregulation of energy has been lowering the investment in large power plants, the need for new electrical power sources could be very high in the near future. Solving the future problems of electrical system requires focusing on two major technologies. One is changing the electrical power production sources from the conventional, fossil-based energy resources and the second one is to use high-efficient and intelligent programmed power electronics in the power generation, power transmission/distribution, and end-user application. This paper focuses on the second part and specifically an algorithm to control the wind turbine output. Using a storage system can highly enhance achieving both aforementioned goals. The extra cost of the battery and power electronics can be recovered within a reasonable period of time depending on the cost of electricity.

Although wind speed and direction follows a probabilistic function, it changes a lot during day and night time. Therefore, a storage system could play an important role in shifting the power to high demand periods. This paper proposes an algorithm, using a battery as a storage system to form the output of wind farm and make it more dispatchable. The analysis for power shifting will be conducted and illustrated. In addition to power shifting, there are more issues with renewable energy sources, such as power ramp control, power smoothing, frequency droop, and active/reactive power control. Using a proper storage system and proper controls the farm is able to control the output power ramp. The difference between the desired and actual ramp can be either injected or drawn from the storage system. A set of batteries with a total capacity of 50 MWh have been used in this study for power ramp control.

Another issue with wind power is the need for power smoothing. Wind turbine output power fluctuates a lot due to the varying nature of wind speed. Highly fluctuated output is not a proper power to be injected into the grid. Utilization of batteries to mitigate this problem is also discussed in this paper. A smooth and ramp controlled output is the final result of this analysis. Moreover, the same set of batteries is used to shift the power when needed. Since the wind profile changes each day, the injected power to the grid is different daily. However, the injected power is smooth and ramp controlled and shifted properly. The study has been performed based on the available local wind farm and load data. The utilized battery is also manufactured by a local company.

II. System Description

Figure 20:
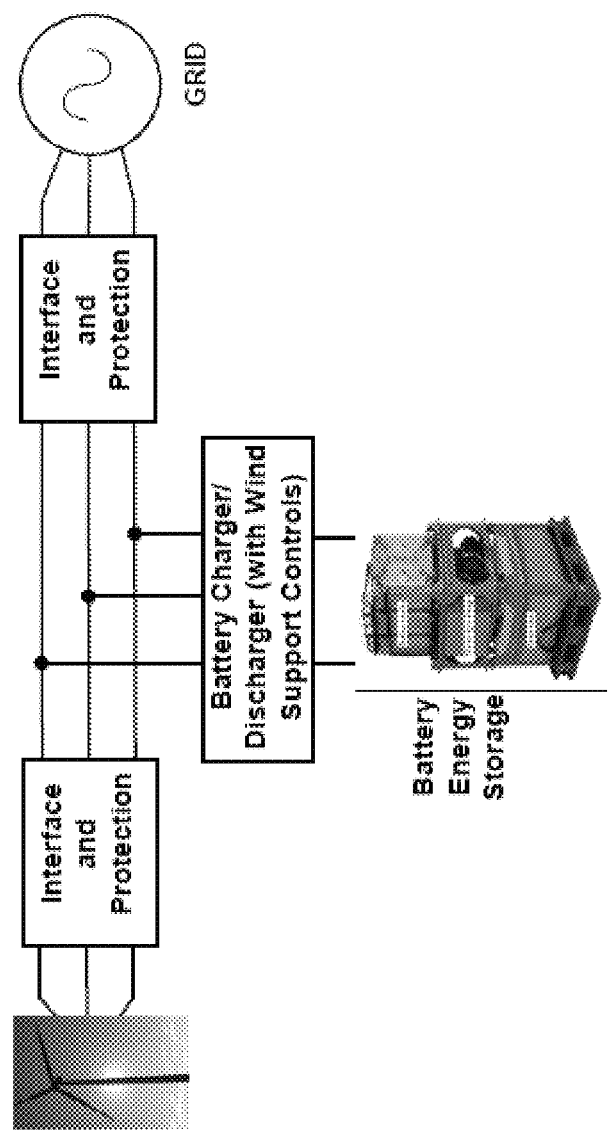
FIG. 20 schematically illustrates the configuration of a system with wind farm and energy storage connected to the grid.

FIG. 20 shows the configuration of the system under study. As illustrated, the system includes the following components:

Wind farm directly connected to power substation.

The storage system connected to the DC bus.

Inverter connected between the DC bus and grid.

The wind turbines are directly connected to the grid. They could be of any type including fixed-speed or variable speed. The controls on the wind turbines will operate them as planned by the operators, most commonly on maximum power tracking.

The second component of the system is the storage system. Depending on the situation of the system, the battery could be charged or discharged. Therefore, the power direction could be from the battery to the grid or vice versa. A bidirectional converter adjusts the charging/discharging current of the battery as requested.

There are currently several types of energy storage technologies which provide different characteristics, e.g. energy and power density, efficiency, cost, lifetime, and response time. Examples of energy storage systems are ultra-capacitors, superconducting magnetic energy storage systems (SMES), flywheels, batteries, compressed air, pumped hydro, fuel cells, and flow batteries. Some of these devices have a quick response time with high power density such as ultra capacitors and SMES, which are proper technologies to deal with transient and short-term issues. Compressed air and hydro systems are appropriate for high energy long term applications.

In this paper, zinc-bromide flow batteries are used. Zinc Bromide Battery energy storage devices with pumped electrolyte batteries are generally suitable for large scale power utility, vehicular and industrial applications with energy storage requirements of 50 kWh and above. This type of battery utilizes continuous circulation of electrolytes to feed reactants to the battery stacks. Zinc metal is chemically plated onto the electrodes during charging and is re-dissolved into the electrolytes on discharging. The reaction is reversible and non-destructive. Zinc Bromide Batteries can exceed 2000 full charge and discharge cycles during their operating lifetime compared with 750 cycles for conventional lead acid batteries. They are capable of full discharge (100% of stored energy) without any damage to the battery. Their energy density is in the range of 65-84 Wh/Kg and they can operate at a wide range of temperatures without degradation. The materials of the components can be made entirely with plastic to reduce costs and provide readily for recycling or disposal. In addition, they use a low toxicity electrolyte and recyclable plastic battery stacks compared with more toxic lead and sulphuric acid.

Portions of the ZESS capacity are allocated to different functionalities: A portion of the capacity is dedicated to power shifting. Charging/discharging time for this case would be two to five hours continuously. Another portion is dedicated to short term wind energy support, which provides support for power ramp control and power smoothing. In this case, the battery is charged/discharged in segments of 20 seconds to 120 seconds.

The ZESS 500 consists of ten 50 kWh modules electrically configured in two series strings to achieve 500 kWh of energy storage, a Power Conversion System (PCS) and an overall system control package. A hundred ZESS 500 are connected together to increase the capacity to 50 MWH. 80% of the battery capacity is used for power shifting (40 MWH), and 20% (10 MWH) is dedicated to power ramp control and power smoothing.

Figure 21:
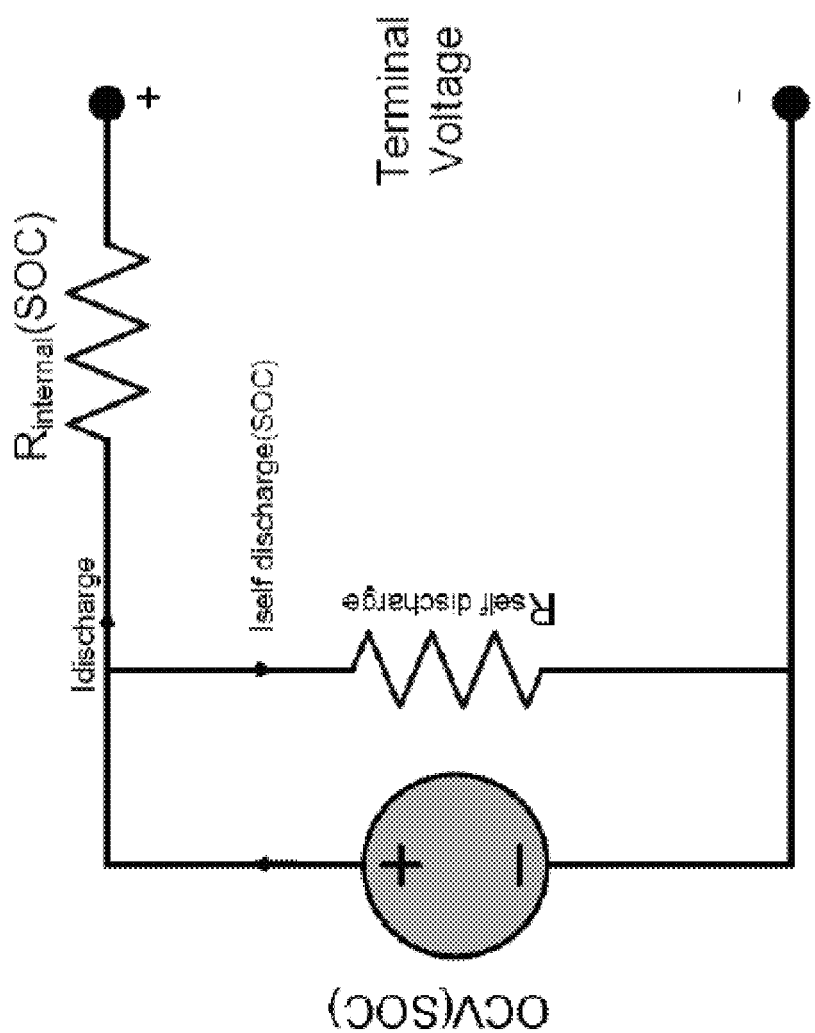
FIG. 21 schematically illustrates an equivalent circuit of the ZESS system.

The ZESS battery has been modeled as shown in FIG. 21. It is composed of three elements, Open Circuit Voltage (OCV), self discharge resistance, and internal resistance. All these elements are function of the State of Charge (SOC). The self discharge resistance, however, does not vary significantly, so that it could be considered as a constant value. The measured value of the self discharge resistance is 12 ohms. Internal resistance is a function of many variables, but it mainly depends on the cell and ambient temperatures and the SOC. The internal resistance is also a function of the materials and the geometrical construction of the plates. It can be described as follows.

$$R_{internal} = 5.942 \times e^{-0.0134 \times SOC} + 0.0625 \times e^{-0.005771 \times SOC} \quad (1)$$

OCV is a fourth-degree polynomial of the SOC and can be described as follows.

$$OCV = -1.878E{-}6 \times SOC^4 + 5.285E{-}4 \times SOC^3 - 0.053 \times SOC^2 + 2.388 \times SOC + 63.0935 \quad (2)$$

Note that operating the ZESS below an SOC of 20% is not healthy for the battery. Therefore, it is safe to stop utilizing the battery when it reaches this point. In this case, the controller should give an order to stop discharging. The power flows through the battery is limited at 25 MW for both charging and discharging.

The studied load for the proposed system is the local load in Milwaukee area, Wisconsin, and includes four days of four different months (January, April, July, and October). Each month is representative of a season (for instance, July is representative of summer). Therefore, the study covers the entire year. The data for load and generation are provided from the US Energy Information Administration (EIA). The July load profile is provided in FIG. 22.

Figure 22:
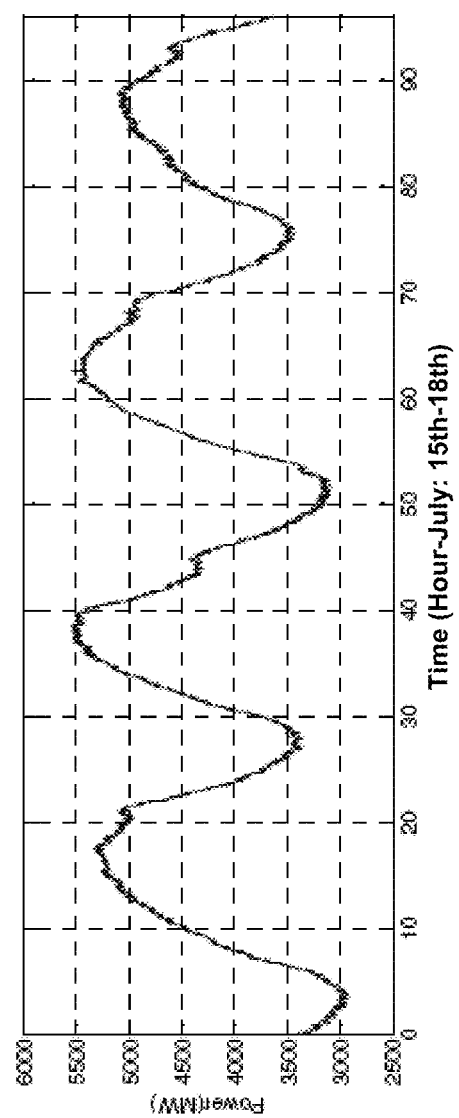
FIG. 22 is a graph plotting the load profile for Milwaukee area from July 15th to 18th.

As seen in FIG. 22, the peak demand typically happens between 3 PM and 7 PM. This maximum load is at 5521 MW in the afternoon of July 16th or at 5058 MW on July 18th. Conversely, the minimum load usually occurs, between 2 AM and 5 AM. The minimum demand is at 2935 MW at 4 AM on July 15th. These minimum and maximum points play a very important role in the power shifting algorithm due to charging and discharging time of the battery.

Figure 23:
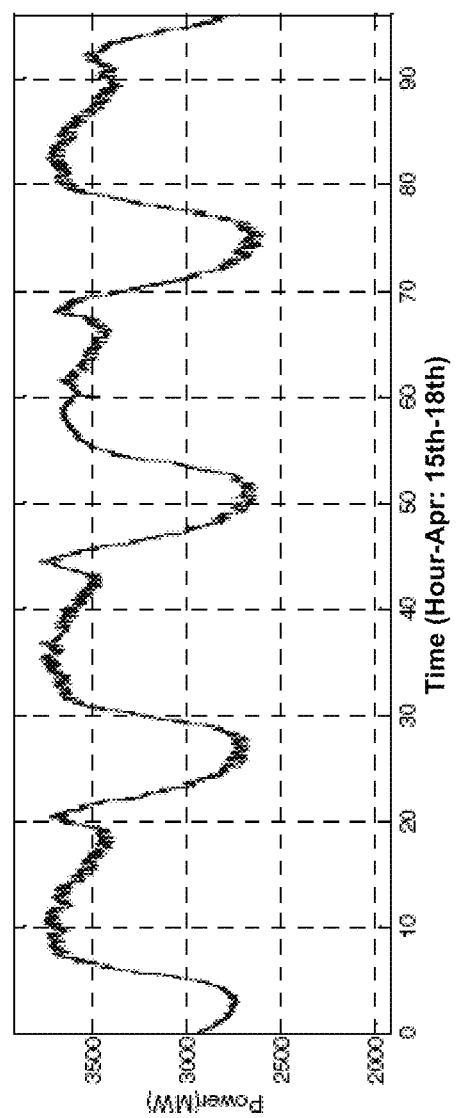
FIG. 23 is a graph plotting the load profile for Milwaukee area from April 15th to 18th.

Many parameters are involved in peak demand time such as environment, energy price, and culture of the consumers. Power shifting would be much harder if the load profile has more than one peak. This phenomenon can be seen in April load profile, as shown in FIG. 23.

For instance, on April 15th the peak load occurs between 9 AM and 11 AM around the value of 3700 MW, and the second peak appears at 8:30 PM at the value of 3716 MW. The minimum demand happens at the same time period as in July, which is typically at 2 AM-5 AM. The minimum demand on April 15th is 2734 MW around 3 AM. Since April has two peaks, the entering/exiting time of the battery is totally different from July.

Figure 24:
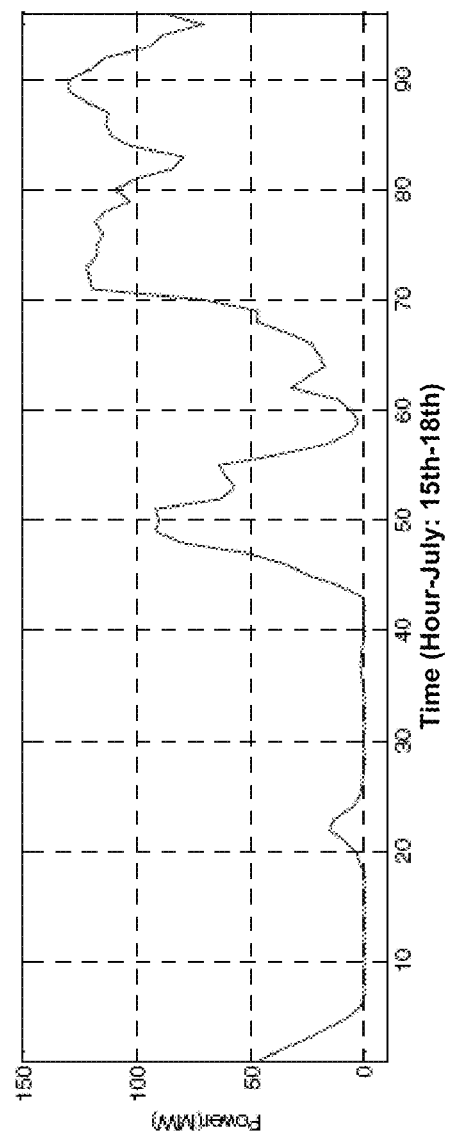
FIG. 24 is a graph plotting the wind farm output power profile from July 15th to 18th.
Figure 25:
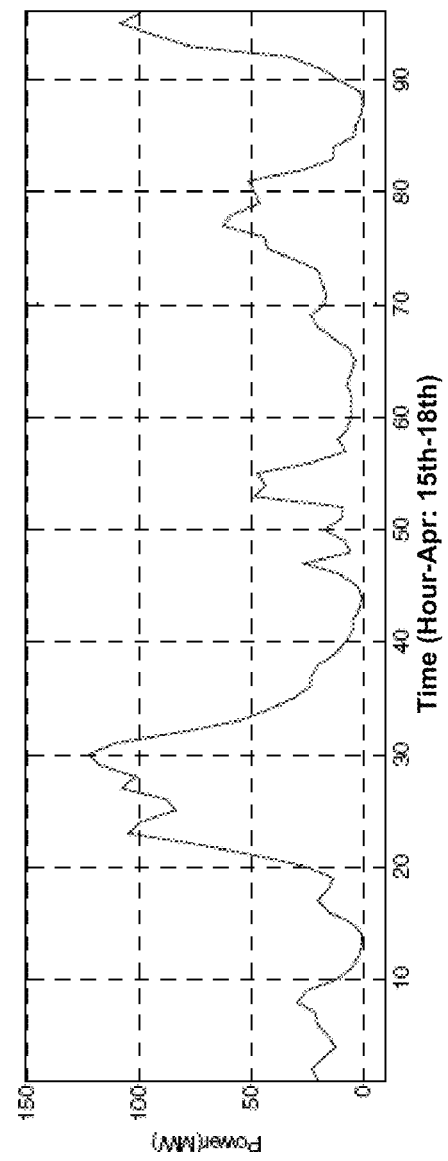
FIG. 25 is a graph plotting the wind farm output power profile from April 15th to 18th.

The wind power profile data is provided from a local wind farm. The whole wind farm is designed to generate 150 MW of electricity. This amount of power production is capable of powering approximately 360,000 average residential homes. The same dates in January, April, July and October were chosen for this study. The July and April output power profiles are illustrated in FIGS. 24 and 25, respectively.

As it can be seen, the output power of the wind farm is randomly changing. It is calm at noon on the first day, while it is around 30 MW at the same time on the next day. The variation in output is further demonstrated by looking at the maximum power profile of the 2nd and 5th day (12 AM). Conversely, the output is less than 10 MW at 12 am on the 3rd day. This variation makes the wind power shifting more challenging than solar PV systems. Due to the randomness of the wind output, it is more difficult to find an algorithm for power shifting.

III. Power Ramp Control

Utility companies consider a ramp up and ramp down rate for wind farms due to wind speed change. For the proposed system, the ramp up and down rate is limited at 5% per minute for a one minute average. It means that the farm power can ramp up or down for more than 2.4 MW per minute (or 40 kW per second), if the average power for the last minute is at 48 MW. Charging/discharging of individual batteries will be controlled to reach at this ramp rate level for the wind farm. It should be noted that in the systems without storage, the power ramp is controlled by adjusting the incoming electric power from the turbine, consequently decreasing the power capturing efficiency of the turbine. For power ramp control, there are three possible situations as the following:

A. Case 1: Wind power slope is more than 5%

Figure 26:
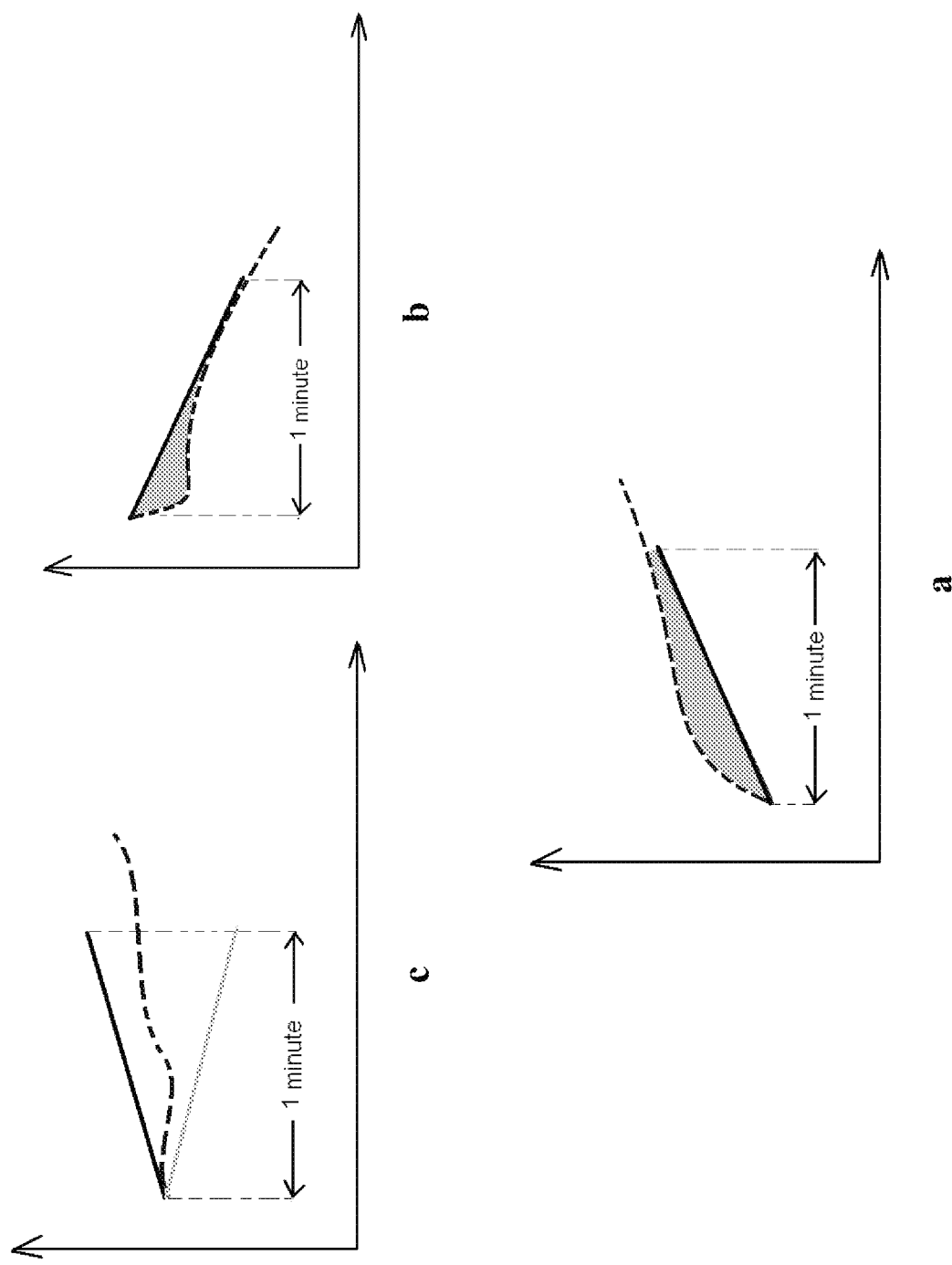
FIG. 26 schematically illustrates three possible cases for wind turbine power output from left to right: power ramp rate greater than 5%, power ramp rate less than −5%, power ramp rate between −5% and 5%.

FIG. 26a shows this case, when the rate of the wind power profile exceeds 5%. To force the output to the desired value, the extra power should not be injected to the grid. The one minute difference is shown as shaded area in FIG. 26a. This amount of energy could be saved in the battery; therefore, output profile is as desired profile and the energy will be saved to be discharged later into the grid. This case happens frequently due to fluctuating wind power profile.

B. Case 2: Wind power slope is less than −5%

FIG. 26b illustrates this case, when the ramp of generated power by the wind turbine is lower than the −5%. Since the battery is partially charged, the power difference could be drawn from the battery and be added to the wind power profile. The output will be set to limit the ramp at −5%. The shaded area is the amount of the energy that should be compensated by the battery. This case also occurs very frequently due to fluctuating wind power profile.

C. Case 3: Wind Power Ramp within −5% and 5%

FIG. 26c shows the desired operating case. The wind power profile is between the upper and lower limits. Consequently, the output can be directly injected into the grid. Since the wind power profile fluctuates very often, this case does not occur too often. The battery plays no role in this case on the entire 60 seconds of operation; however, the battery may charge or discharge at the same time for another purpose such as power smoothing or power shifting.

Figure 27:
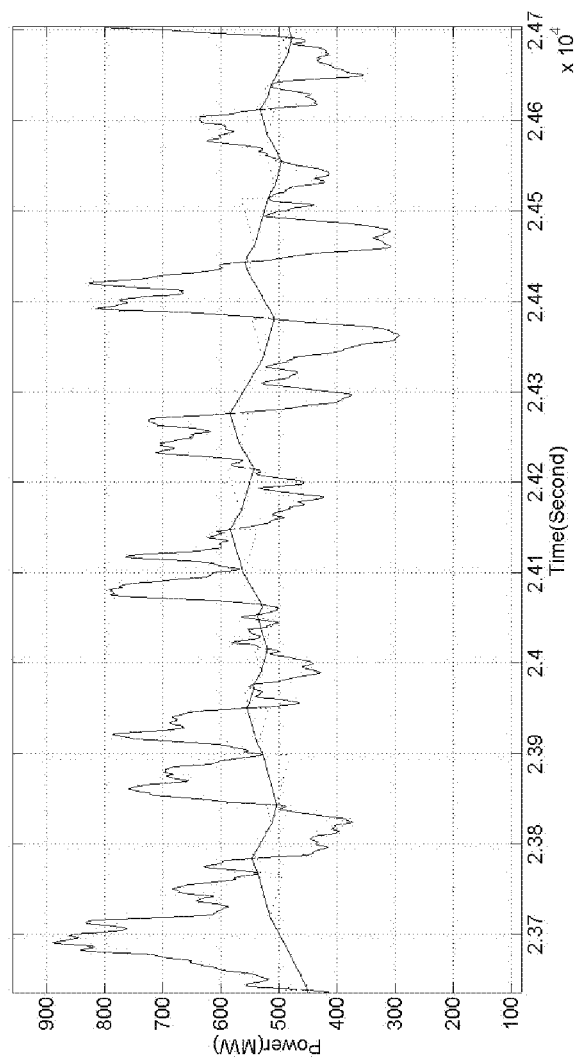
FIG. 27 is a graph plotting the upper and lower limit of the desired output power and the actual power profile.

In FIG. 27, the output power of the wind farm and the upper and lower limits are indicated. The output power profile is rarely in the acceptable range. Based on the aforementioned algorithm, the output power falls on either the upper limit (if generated power ramp is more than 5%) or the lower limit (if generated power ramp is less than −5%). The third case (desired condition) does not happen much. In other word, the power ramp is almost never desired in this case. This issue shows the importance of power ramp control, which can be easily done with a proper battery and algorithm. Although adding a storage system would cost and increase the power plant expenditure, it is very useful applicable device due to the randomness of wind speed.

Figure 28:
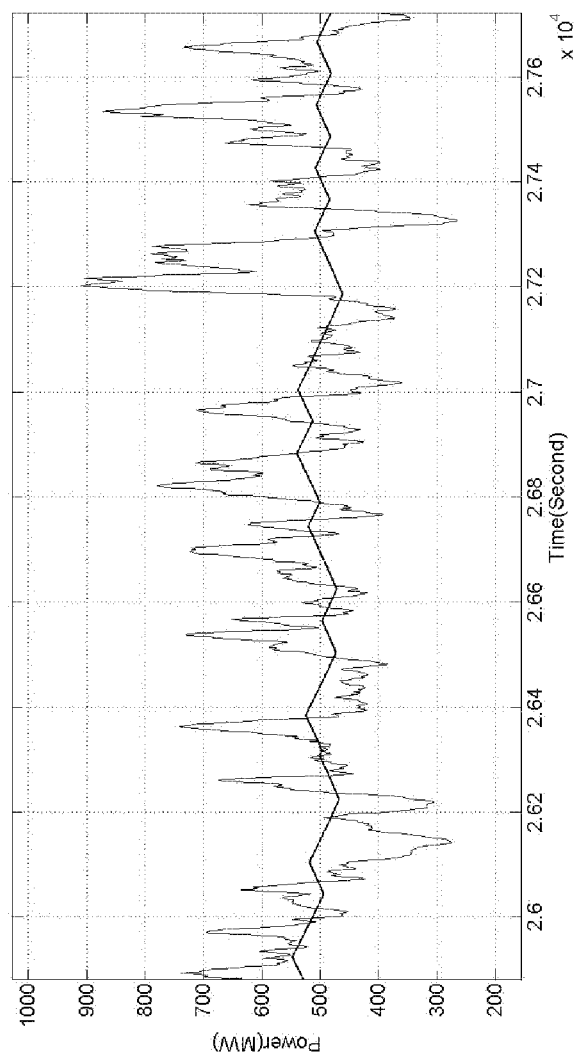
FIG. 28 is a graph plotting the desired and actual power profile due to power ramp control.

The output power profile and the generator power profiles are shown in FIG. 28. 20% of the battery capacity is used for this control, which is equal to 10 MWH.

IV. Power Smoothing

The power captured by a wind turbine is proportional to the cube of the wind speed. Therefore, small variations in the wind velocity may produce relatively large changes in the captured power and unacceptable variations on the frequency and voltage supplied to a stand alone load or weak utility unless power smoothing is used.

The control system for power smoothing, described in this paper, can be applied to any storage integrated power converter topology.

Figure 29:
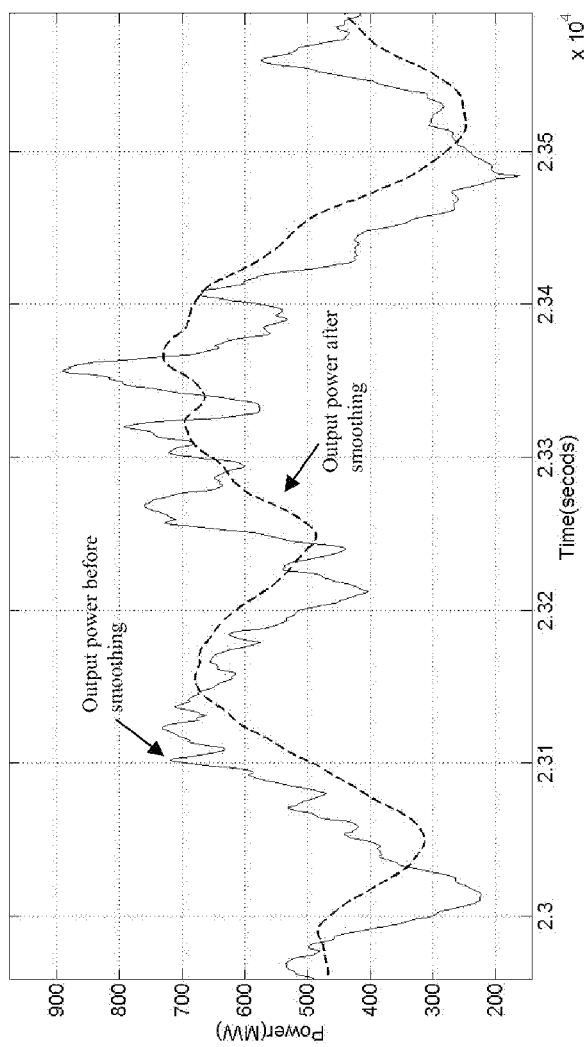
FIG. 29 is a graph plotting the output power profile before and after smoothing.

FIG. 29 shows the total power of the wind farm before and after power smoothing technique is applied.

In order to smooth the output power, the output is forced to the average of the last minute for each single second. The battery is being charged while the generation power profile is higher than the average. The battery is being discharged while the generation power profile is lower than average. The figure represents a very short period of time. 20% of the battery capacity is used for this control, which is equal to 10 MWH.

Figure 30:
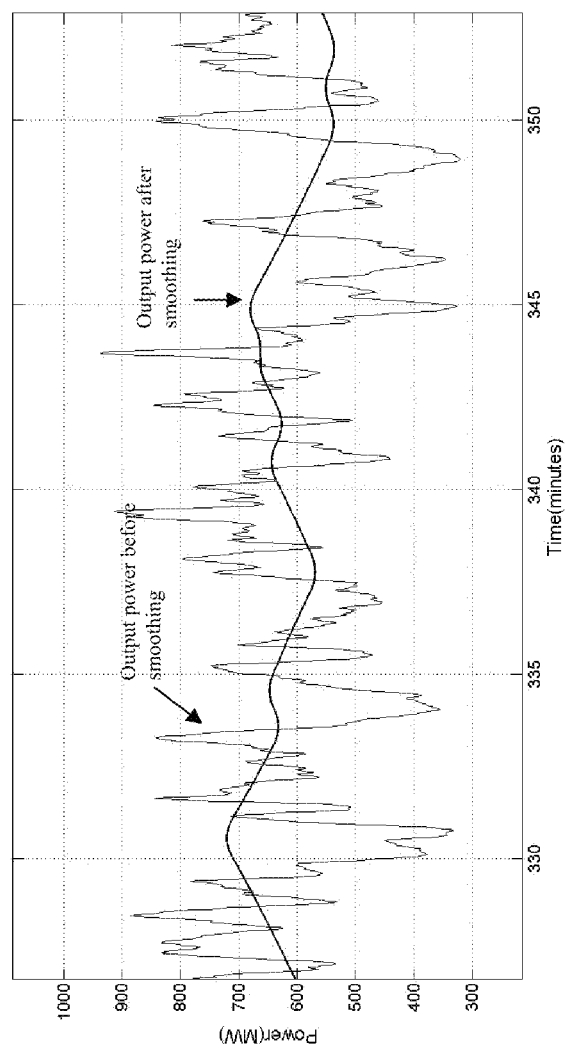
FIG. 30 is a graph plotting the output power before and after smoothing and ramp control technique is applied.

While the average method smoothes output power, there are still problems with the ramp. Thus, the best way to reduce the slope is to combine both ramp control and smoothing. 20% of the battery capacity is dedicated to this purpose. As seen in FIG. 30, the bold line is the smoothed power. The final output after smoothing does not have any ramp up and down more than 5%.

V. Power Shifting

Peak demand has been always an issue in power system distribution and production. The capacities of power plants are not always able to meet peak demands. Adding new power plants is certainly a solution. The additional power plants would be useful just for 1-3 hours in peak demand periods and then would be taken offline. Establishing and taking some power plants in and out every single day costs a lot. Conversely, demand is very low during some periods of time, such as 2 AM-5 AM. Therefore, a better solution is power shifting.

Figure 31:
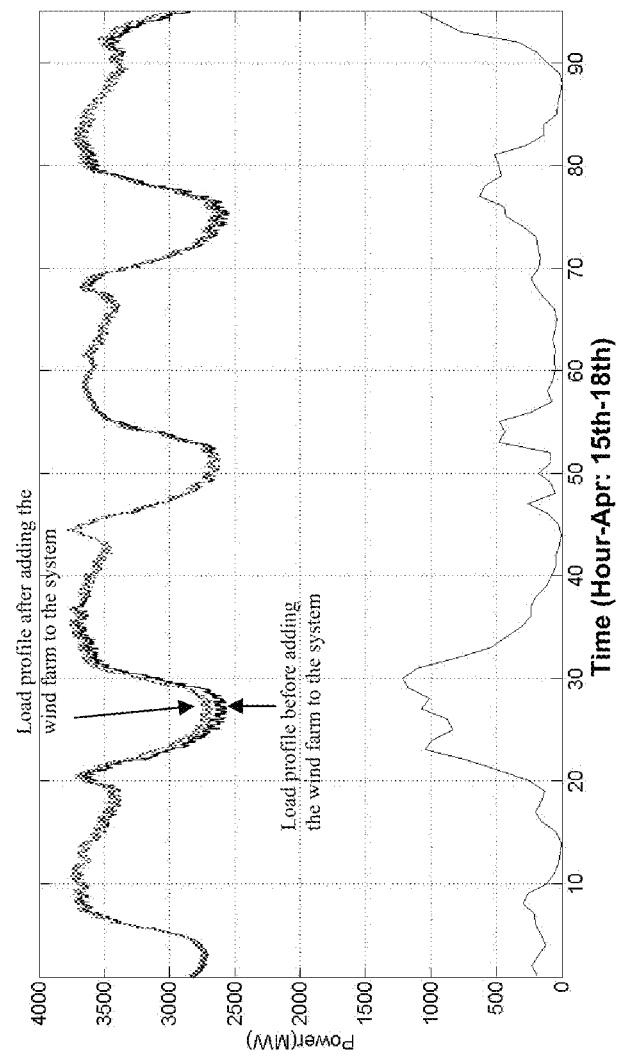
FIG. 31 is a graph plotting the load profile before and after adding the wind farm generation as negative load. Wind farm output profile (lower waveform) is scaled by a factor of 10 to be visible.

The wind power output is added to the load profile as a negative load. FIG. 31 shows the load profile before and after adding the wind farm to the system. The wind power profile is multiplied by 10 so it would be visible in the figure.

Any kind of storage system is able to save the energy during low demand period and release the energy in high demand period. These storage systems are much more economical. Batteries are one kind of these storage systems; they can be charged and discharged several times while the efficiency is high enough.

Different days have different peak demand times and peak values; nonetheless, the power profile is somehow predictable based on the data history from the previous years. This peak value plays an important role because the best time for discharging the battery depends on this peak time. The optimal time for charging the battery is when the summation of the wind and load is at the lowest. In addition, the wind power profile should be considered; otherwise, the battery is not as efficient as it can be when the wind is calm. The wind is also predictable based on the weather forecasting of that location.

Figure 32:
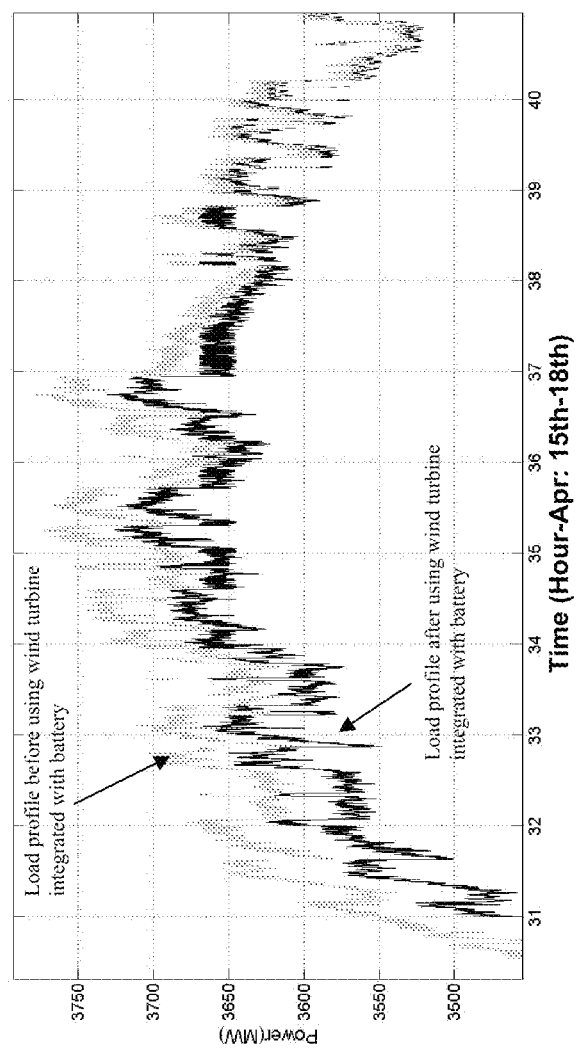
FIG. 32 is a graph plotting a zoomed-in load profile before and after using wind turbine integrated with battery in peak demand.

FIG. 32 illustrates two load profiles; the original load profile and the final power after the wind turbine integration with battery is applied.

80% of the battery capacity is dedicated for this purpose which is equal to 40 MWh. In April, the battery starts charging around 2:20 AM and is up to 80% charged around 5:30. It discharges approximately between 11 am and 2 pm. Since there are two peaks in April, the battery discharges in two different periods of time. The second discharging time is around 6 pm. Notice that the battery could be charged due to power ramp or power smoothing control. In other words, if the charging rate due to power ramp and smoothing control is more than the discharging rate, the battery is being charged. The amount of energy which is needed for power shifting is fed from the wind turbine. This energy comes from the difference between desired value and actual outputs. Consequently, the peak demand decreases while the output is smooth, although the battery is being charged.

VI. Discussion

Two parameters of the storage system are very important: one is the capacity and second is the limitation on injecting and drawing current, which limits power transferring. The capacity plays an important role in power shifting rather than power smoothing and ramp control. On the other hand, the current limitation is important for power smoothing and ramp control. As mentioned earlier, power smoothing and ramp control make a desire value for the output power based on the last minute data. The difference between desired value and actual value deals with the battery. If the difference is larger than battery power limitation, the output can not follow and it will cause problem.

Power shifting does not deal with current limitation as much as other controls. The current limitation would extend the charging time, which does not affect the result. On the other hand, the more capacity, the more load profile decreases on peak demand.

Nonetheless, power shifting depends on weather and load profile forecasting, which are not always true. Other controls, however, are more predictable due to their calculation. Their calculation is based on the last minute data. Hence, power smoothing and ramp control are more applicable than power shifting. Consequently, current limitation is more important than capacity limitation.

VII. Conclusion

An energy storage system was used to control the power ramp rate and to smooth the output power of wind farm. The wind power data indicates the need for a mechanism to reduce the uncertainty of wind power. The power data for the wind farm and load are actual data from a local power system. Effectiveness of the energy storage to provide power shifting has also been investigated. The analysis shows that wind power variations and fluctuations can be mitigated using a storage system with a proper control algorithm. Portions of the energy storage capacity are allocated to short and long term support for wind energy.

APPENDIX C

Power Smoothing of Doubly Fed Induction Generator for Wind Turbine Using Ultracapacitors Abstract Wind energy is an unpredictable and fluctuating energy source. A nearly random wind speed and blade rotational turbulence can produce fluctuations in the output power and consequently voltage of the system. The output power of wind turbines fluctuates due to wind speed variations. This fluctuating power makes the wind power undispatchable, causing frequency deviations when wind power penetration is significant. The fluctuating power has an impact on power balance and voltage at the point of common coupling (PCC). Energy storage devices such as batteries, ultracapacitors, magnetic storage systems and flywheels can be utilized in a hybrid system to mitigate the effects of this problem. This paper uses Ultracapacitors in doubly-fed induction generators (DFIG) to support wind energy in shortterm and mitigate high frequency power fluctuations.

I. Introduction

Renewable energy resources are considered the future power generation sources due to advanced technology, lower production cost and environmental friendly nature. Wind power is one of the most promising sources of renewable energy. With high rating power generation up to multi megawatt level such as DFIG, wind power can increase the contribution of renewable energy into the power grid more than any other renewable energy sources.

Figure 33:
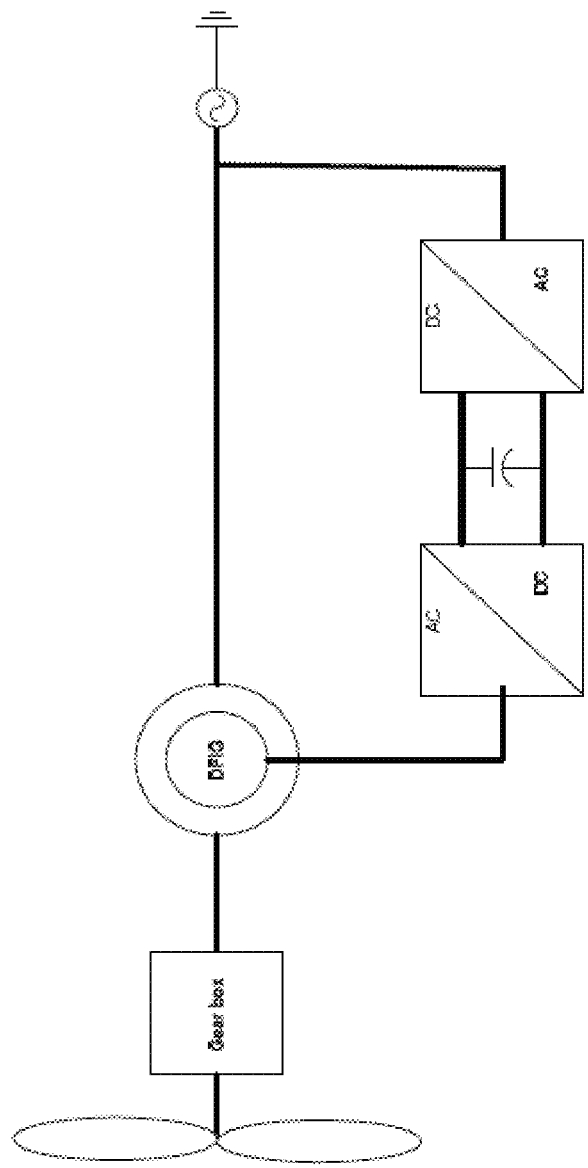
FIG. 33 schematically illustrates a doubly fed induction generator wind turbine.
Figure 34:
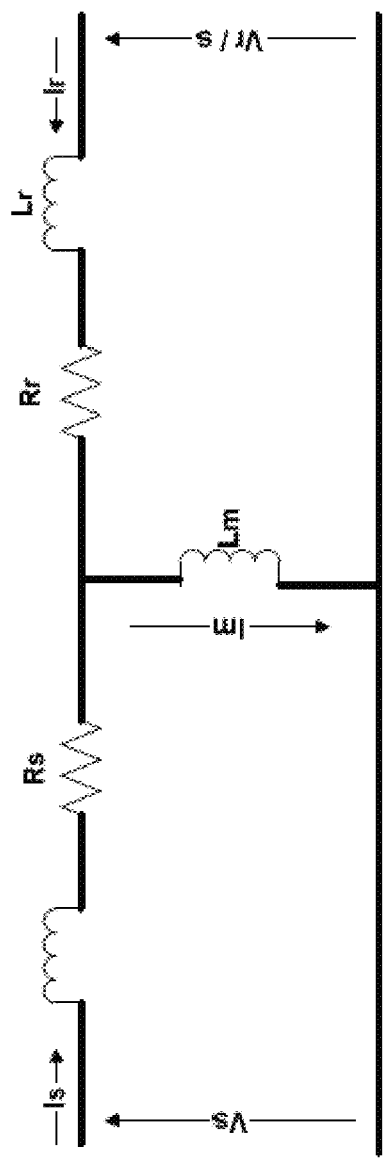
FIG. 34 schematically illustrates a doubly fed induction generator per-phase model.

The variable speed wind turbines with doubly fed induction generator (DFIG) are becoming the most common type of wind turbine. Due to low power converter rating and ability to supply power at constant voltage and frequency while the rotor speed varies, the number of DFIGs connected to the networks are increasing compared with other types machine. The DFIG also provides a possibility to control the overall system power factor. The configuration of a variable speed wind turbine DFIG is shown in FIG. 33 and per-phase equivalent circuit of DFIG is shown in FIG. 34.

With the penetration of wind energy increasing, the integrating of wind turbines into the grid causes a new concern about security and reliability of the power system. One of the problems associated with wind energy is power oscillations due to wind turbulences. Power fluctuations cause frequency deviations in the grid. If the frequency deviation exceeds a limit, the protection relays will trip and that may cause a power outage for a part of the power system.

There are several methods to smooth the power oscillation in the power system such as the rotor inertia or using energy storage like batteries, super inductors, fly wheels and Ultra Capacitor. For short term storage for wind power support, batteries and ultracapacitor are the most popular choices. For DFIG wind turbines, a back-to-back power converter with a DC link is a very common system. Some papers proposed the method of combine both batteries and ultra capacitor as energy storage for wind power system. Both batteries and Ultracapacitor need DC/DC converter before connecting to the DC link of the back-to-back converter of DFIG.

This paper introduces a method to smooth the output power of the wind turbine using Ultracapacitor without using DC/DC converter. The model of DFIG wind turbine is developed using Matlab Simulink and simulation results verifies the method that is proposed in this paper.

II. DFIG Model

DFIG for wind turbine in this paper is modeled using Matlab Simulink. The mathematical model of the DFIG presented in this paper uses the d-q synchronous reference frame. The equations for the stator and rotor windings can be written as:

$$v_{ds} = r_s i_{ds} + \frac{d}{dt}\lambda_{ds} - \omega_s \lambda_{qs} \tag{1}$$

$$v_{qs} = r_s i_{qs} + \frac{d}{dt}\lambda_{qs} + \omega_s \lambda_{ds} \tag{2}$$

$$v_{dr} = r_r i_{dr} + \frac{d}{dt}\lambda_{dr} - (\omega_s - \omega)\lambda_{qr} \tag{3}$$

$$v_{qr} = r_r i_{qr} + \frac{d}{dt}\lambda_{qr} + (\omega_s - \omega)\lambda_{dr} \tag{4}$$

The d-q synchronous reference frame equations of the stator and rotor flux are also written as:

$$\lambda_{ds} = L_s \cdot i_{ds} + L_m \cdot i_{dr} \tag{5}$$

$$\lambda_{qs} = L_s \cdot i_{qs} + L_m \cdot i_{qr} \tag{6}$$

$$\lambda_{dr} = L_r \cdot i_{dr} + L_m \cdot i_{ds} \tag{7}$$

$$\lambda_{qr} = L_r \cdot i_{qr} + L_m \cdot i_{qs} \tag{8}$$

The active and reactive power equations at the stator and rotor windings are written as:

$$P_s = v_{ds} \cdot i_{ds} + v_{qs} \cdot i_{qs} \tag{9}$$

$$Q_s = v_{qs} \cdot i_{ds} - v_{ds} \cdot i_{qs} \tag{10}$$

$$P_r = v_{dr} \cdot i_{dr} + v_{qr} \cdot i_{qr} \tag{11}$$

$$Q_r = v_{qr} \cdot i_{dr} - v_{dr} \cdot i_{qr} \tag{12}$$

Since P is the number of poles, the electromagnetic torque is expressed as:

$$T_{em} = \frac{3}{2} \cdot \frac{P}{2} \cdot (\lambda_{ds} \cdot i_{qs} - \lambda_{qs} \cdot i_{ds}) \tag{13}$$

DFIG wind turbine employs a series voltage source converter to feed the wound rotor of the machine. By operating the rotor circuit at a variable AC frequency one is able to control the mechanical speed of the machine. The net power out of the machine is a combination of the power coming out of the machine's stator and that from the rotor and through the converter into the system. The advantages of DFIG are due to low power converter rating, ability to supply power at constant voltage and frequency while the rotor speed varies. For a variable speed wind turbine DFIG, it is possible to control the load torque at the generator directly, so that the speed of the turbine rotor can be varied within certain limits. Another advantage of the variable speed wind turbine is that the rotor speed can be adjusted in proportion to the wind speed in low to moderate wind speeds so that the optimal tip speed ratio is maintained. At this tip speed ratio the aerodynamic efficiency, Cp, is a maximum, which means that the energy conversion is maximized. In general, variable speed wind turbines may have two different control goals, depending on the wind speed. In low to moderate wind speeds, the control goal is maintaining a constant optimum tip speed ratio for maximum aerodynamic efficiency. In the high wind speeds, the control goal is the maintenance of the rated output power. The operation of DFIG wind turbine is as following.

Assuming that the positive power flow means the power flows from the grid to the rotor converter and from the stator to the grid. Generally, the absolute value of the slip is very small therefore the rotor power is very small compared with the stator power. Since mechanical torque is positive for power generation and since synchronous speed is positive and constant for a constant frequency grid voltage, the sign of rotor power is a function of the slip sign. Rotor power is positive for negative slip (speed greater than synchronous speed) and it is negative for positive slip (speed lower than synchronous speed). For super-synchronous speed mode, the rotor power is transmitted to DC bus capacitor and tends to raise the DC voltage. For sub-synchronous speed mode, the rotor power is taken out of DC bus capacitor and tends to decrease the DC voltage. The grid side converter is used to generate or absorbed the power in order to keep the DC voltage constant.

III. Rotor Side Converter Control

Figure 35:
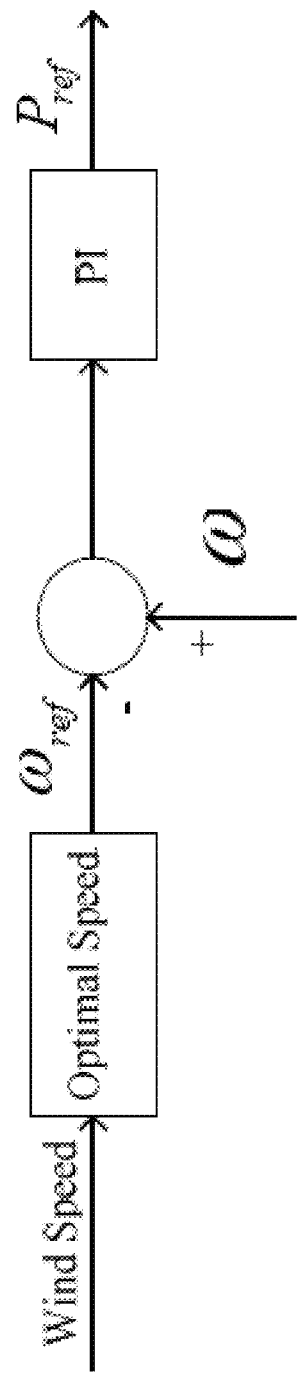
FIG. 35 is a block diagram for the power reference control signal.
Figure 36:
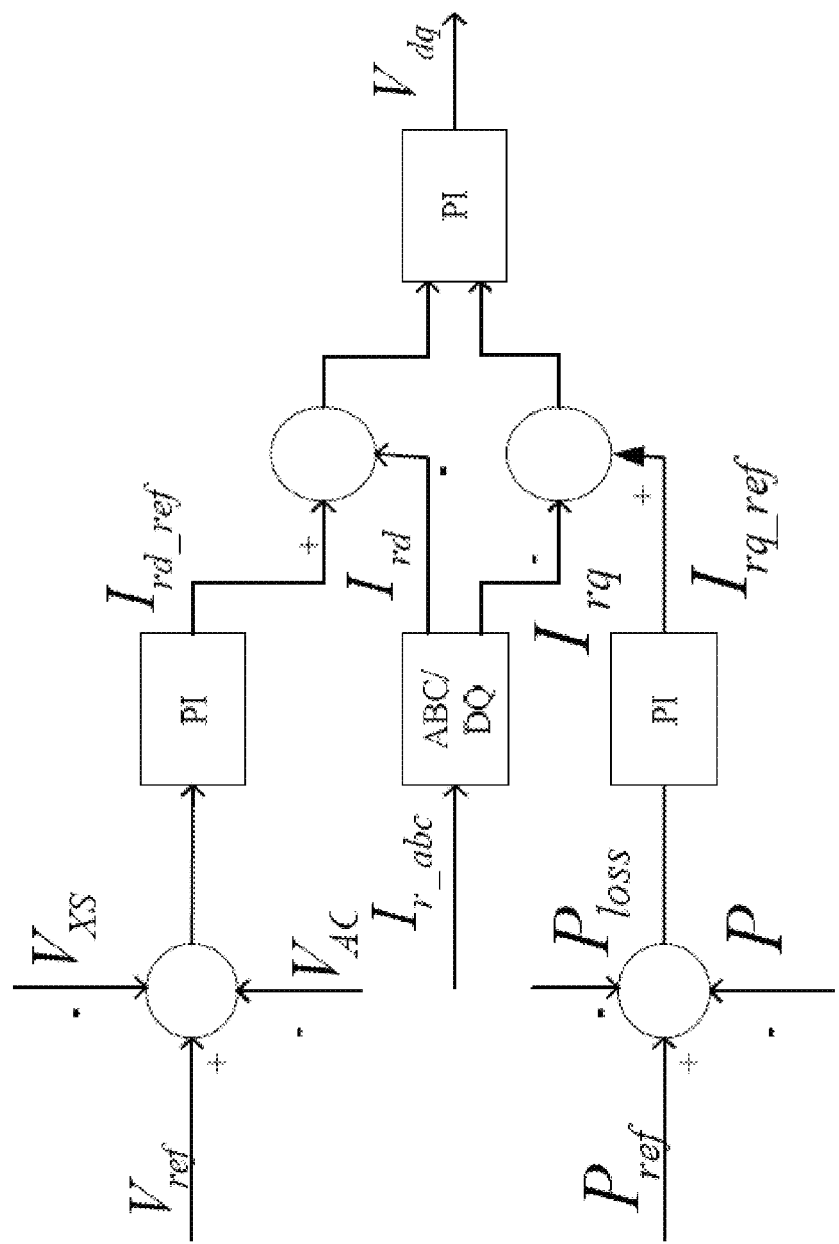
FIG. 36 is a block diagram for rotor side control.

In normal operation, the active power for the rotor side converter is defined by the maximum power point tracking (MPPT) look-up table as function of the optimal generator speed. As illustrated in FIG. 35, the PI controller produces the active power reference signal for the rotor side converter. The speed reference is defined by optimal speed curve at the incoming wind speed. The rotor side converter controls the active and reactive power of the DFIG independently. The operation in either stator flux or stator voltage oriented reference frame and hence the q-axis current component represents active power and the d-axis component represents reactive power. FIG. 36 shows the two controllers in the machine side controller determine d and q currents by comparing the voltage reference with the voltage drops and the measured voltages of DFIG. Since d and q currents are known, using PI control to determine d and q voltages. Now using Park transformation converts d and q voltages to a-b-c phase voltage for either vector control or sinusoidal PWM control. Usually the voltage at the grid terminals is controlled by the reactive power generated or absorbed by the rotor converter. The reactive power is exchanged between rotor converter and the grid through the generator. In the exchange process the generator absorbs reactive power to supply its mutual and leakage inductances. The excess of the reactive power is sent to the grid or to the rotor converter.

IV. Grid Side PWM Converter Control

Figure 37:
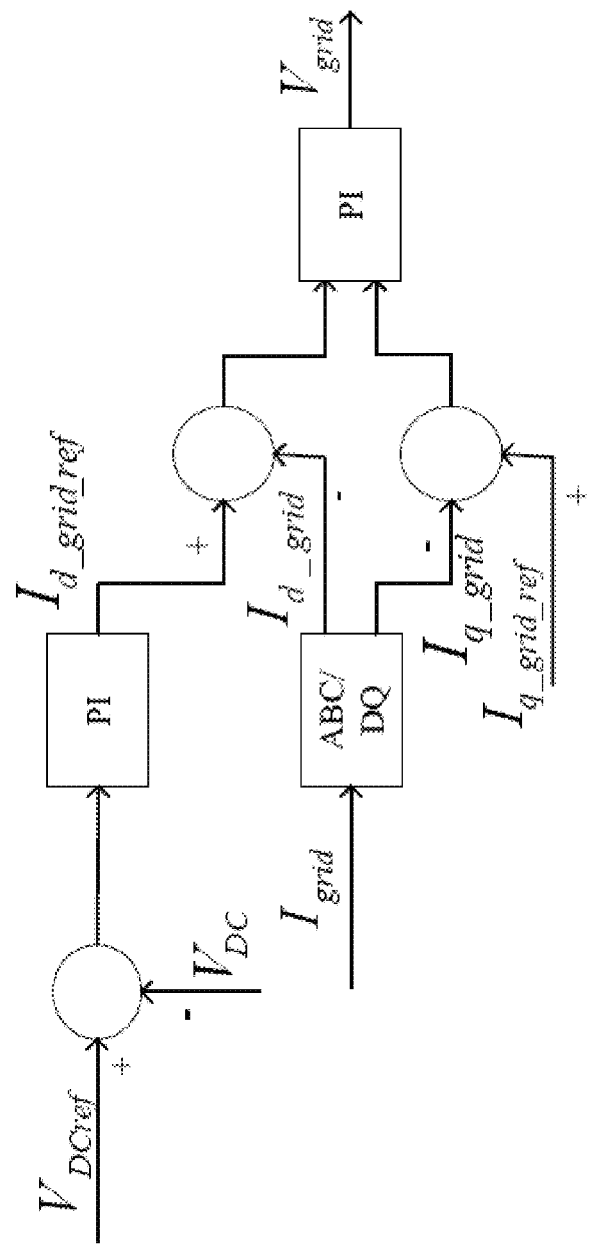
FIG. 37 is a block diagram for the grid side converter control.

The main purpose of the vector control for the grid side PWM converter is used to regulate the DC link voltage. The control system is shown in FIG. 37. This controller consists of: A measurement system measures the d and q components of AC currents to be controlled as well as the DC voltage. An outer regulation loop consists of a DC voltage regulator. The output of the DC voltage regulator is the reference current for the current regulator that is in phase with the grid voltage. An inner current regulation loop consists of a current regulator. The current regulator controls the magnitude and phase of the voltage generated by the grid side converter from the reference current produced by the DC voltage regulator and specified q-axis current reference. The current regulator is assisted by feed forward terms which predict the grid side converter output voltage. The DC link voltage can be expressed as in (14).

$$C\frac{dv_{dc}}{dt} = \frac{3}{4}mi_{gdc} - i_{rdc} \tag{14}$$

Where $i_{gdc}$ is the d-axis current flowing between the grid and the grid side converter, $i_{rdc}$ is the rotor side DC current, C is the DC link capacitance, m is the PWM modulation index of the grid side converter. The reactive power flow into the grid $Q_g$ is calculated in (15).

$$Q_g = \frac{3}{2}v_g i_{gq} \tag{15}$$

Where $v_g$ is the magnitude of the grid phase voltage, $i_{gq}$ is the q-axis current flowing between the grid and the grid side converter. From (14) and (15), the DC link voltage and the reactive power flow into the grid can be controlled.

V. Wind Energy Variation

Figure 38:
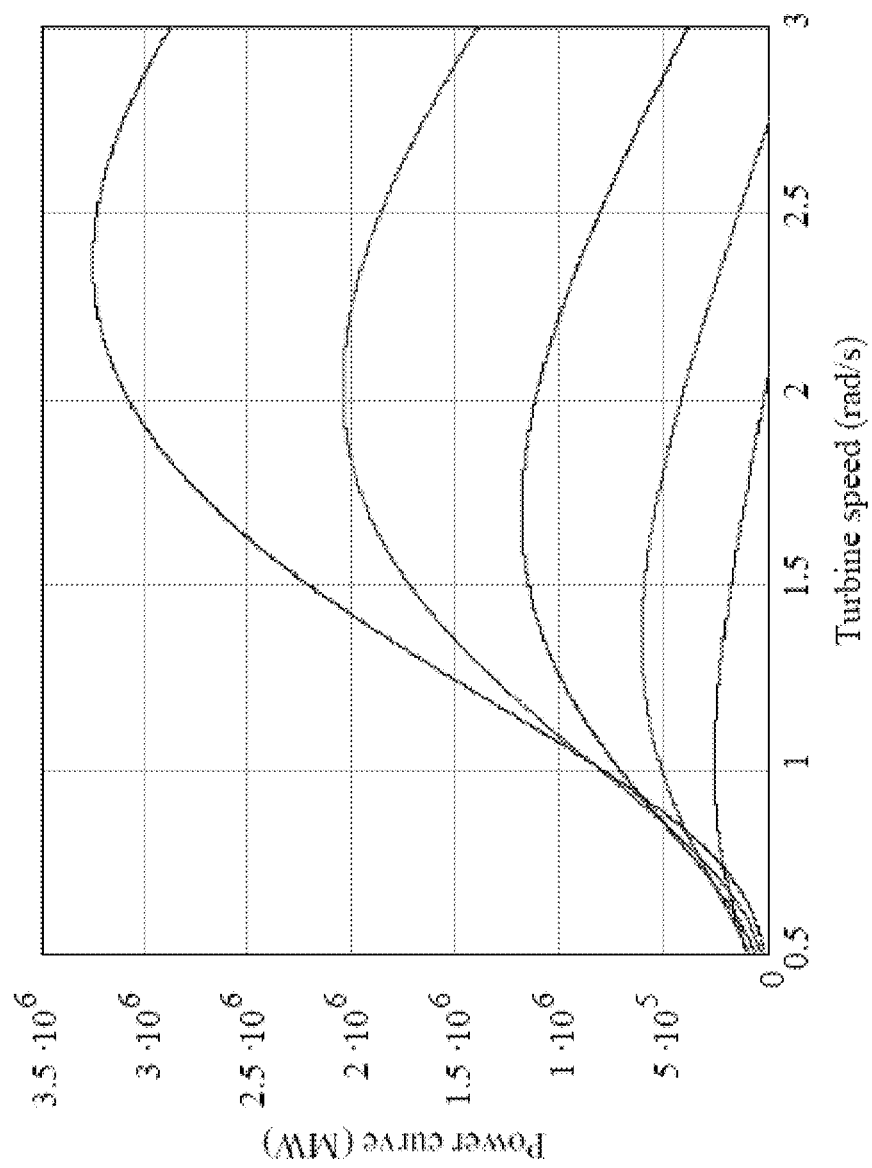
FIG. 38 is a graph plotting the turbine power versus rotor speed at different wind speeds.

In order to smooth the wind power fluctuation, it is required to know the amount of wind energy variation. The relationship between power and wind speed is given as (16).

$$P_w = \frac{\rho}{2}C_p(\lambda, \beta)Av_w^3 \tag{16}$$

$$c_p(\lambda, \theta) = 0.22\left(\frac{116}{\lambda_i} - 0.4\beta - 5\right)e^{-12.5/\lambda_i} \tag{17}$$

$$\frac{1}{\lambda_i} = \frac{1}{\lambda + 0.08\beta} - \frac{0.035}{\beta^3 + 1} \tag{18}$$

$$\lambda = \frac{R\omega_t}{v_w} \tag{19}$$

Where ρ=1.229 kg/m³ is the air density, A is the area swept by the turbine blades, λ is the Tip-Speed-Ratio (TSR) that is given by (19), β is the pitch angle, and R is the radius of the turbine blades. In this application, β is assumed to be zero. $\omega_t$ is the rotor speed. The characteristic of wind turbine power and rotor speed is shown in FIG. 38.

VI. Ultra Capacitor for Power Smoothing

Figure 39:
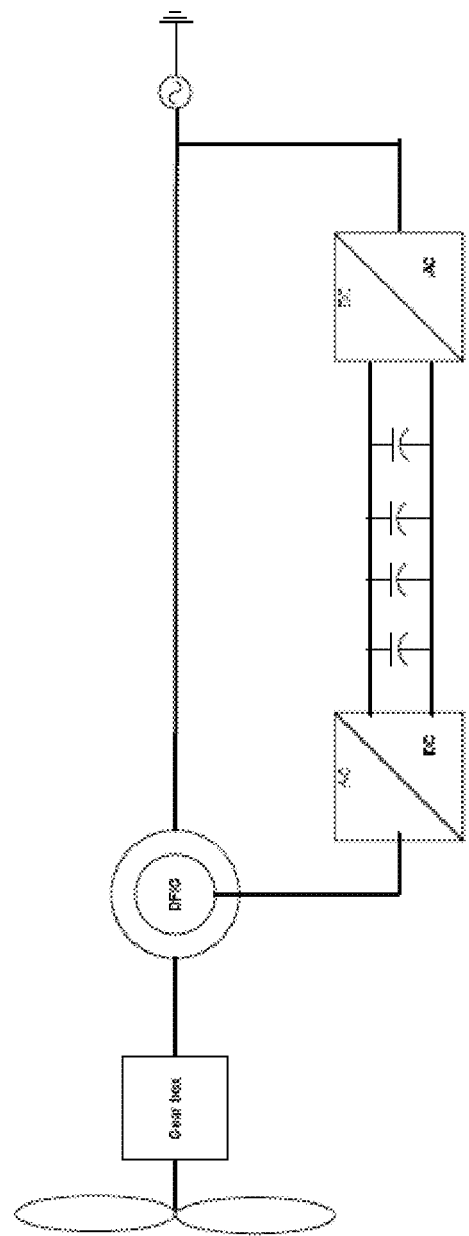
FIG. 39 schematically illustrates a DFIG wind turbine with ultra capacitor storage system.

To reduce the cost for power electronic components, instead of connecting the storage such as Ultracapacitor via DC/DC converter, the short-term storage energy is placed on the DC bus as shown in FIG. 39. Ultracapacitor is selected for this short-term energy storage method due to its characteristics such as:

High efficiency (99% with so little is lost during charge and discharge)

Low equivalent series resistance (less heating and cooling)

The temperature operates at wide range from −40 C to 65 C (not rely on chemical reaction like battery)

Deliver or observe high current

Quickly charge and release

Voltage range (cells connect in series to get the maximum voltage)

Long life (since there is no chemical reaction like the battery, the energy storage of Ultra Capacitor is highly stable process Like other energy storage components, the purpose of using Ultra Capacitor in this project is to smooth the stochastic wind variations in order to obtain firm power output to DFIG. The state of charge of Ultra Capacitor can be explained as: If the wind power output exceeds the desired level, the excess power is used to charge the storage through the stator side converter. The store energy can be used when wind power output is less than the desired level.

Figure 40:
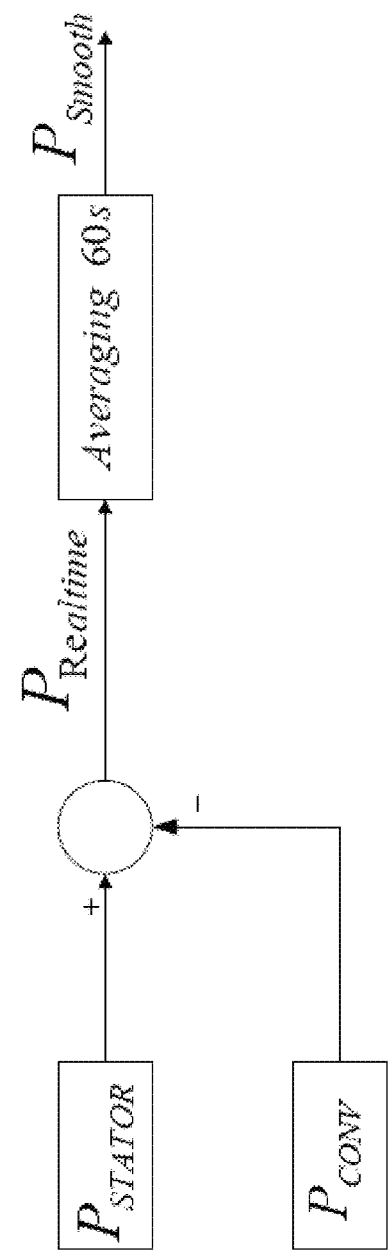
FIG. 40 is a block diagram for calculating $P_{smooth}$.

Smoothing the output power, the storage energy must compensate the wind energy variations. The method starting with calculating the power goes through the grid via the grid side converter as in (20) and then using moving average method for $P_{Real\text{-}time}$ in every 60 seconds time frame to get $P_{smooth}$ as in FIG. 40.

$$P_{STATOR} - P_{CONV} = P_{Real\text{-}time} \quad (20)$$

Figure 41:
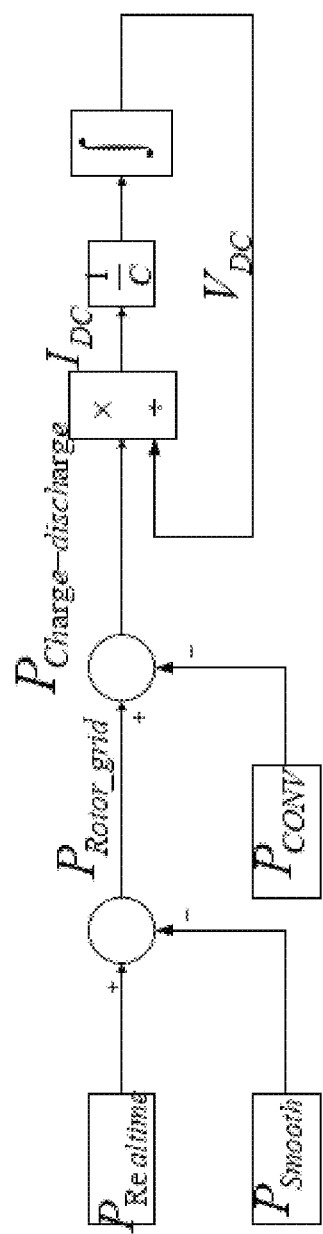
FIG. 41 is a block diagram for calculating the DC voltage and current of Ultracap.

Note $P_{CONV}$ is power of converter. The difference between $P_{Real\text{-}time}$ and $P_{Smooth}$ is called $P_{Rotor\text{-}grid}$. The DC current and voltage of Ultra Capacitor are calculated as in (21) and FIG. 41. The limits of DC voltage are in the range of 850V-1470V. If the DC voltage is out of the limit, some conditions will need to satisfy the control algorithm as (22):

$$(P_{Rotor-grid} - P_{CONV})\frac{1}{V_{DC}} = I_{DC} \quad (21)$$

$$\frac{1}{C}\int I_{DC}dt = V_{DC} \quad (21)$$

Figure 42:
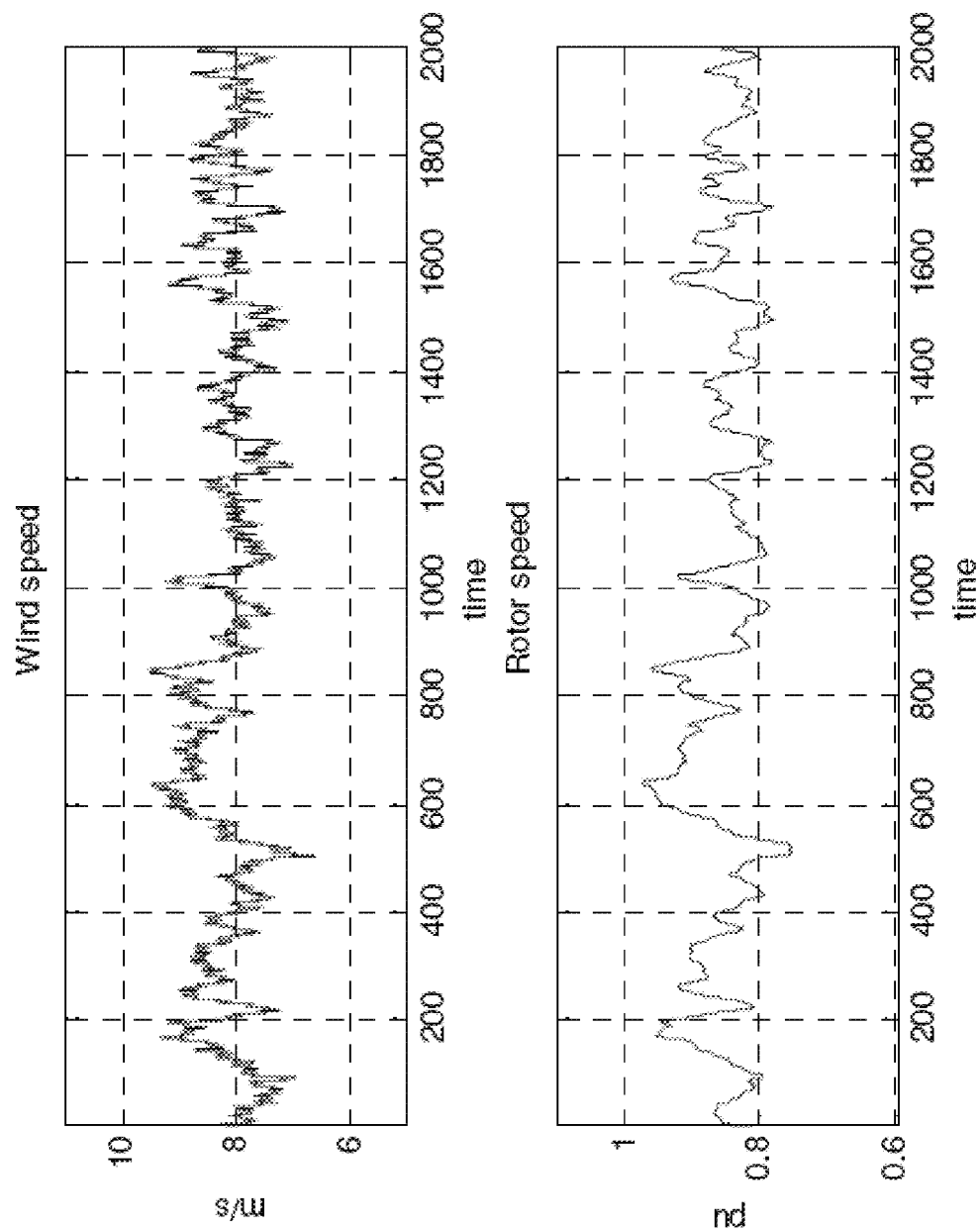
FIG. 42 shows graphs plotting the wind speed and the rotor speed of a DFIG.
Figure 43:
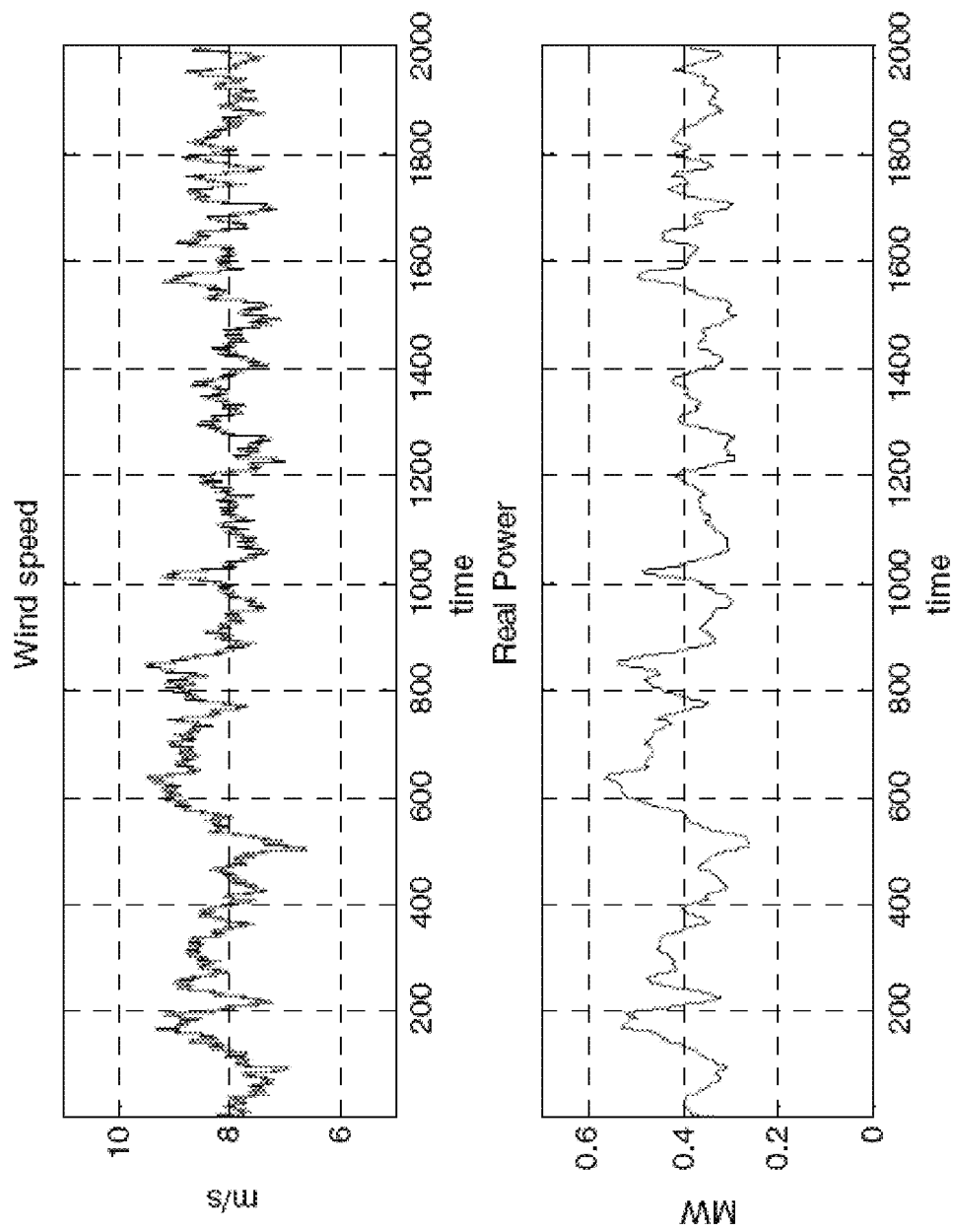
FIG. 43 shows graphs plotting the wind speed and rotor speed of DFIG before using the smoothing method.
Figure 44:
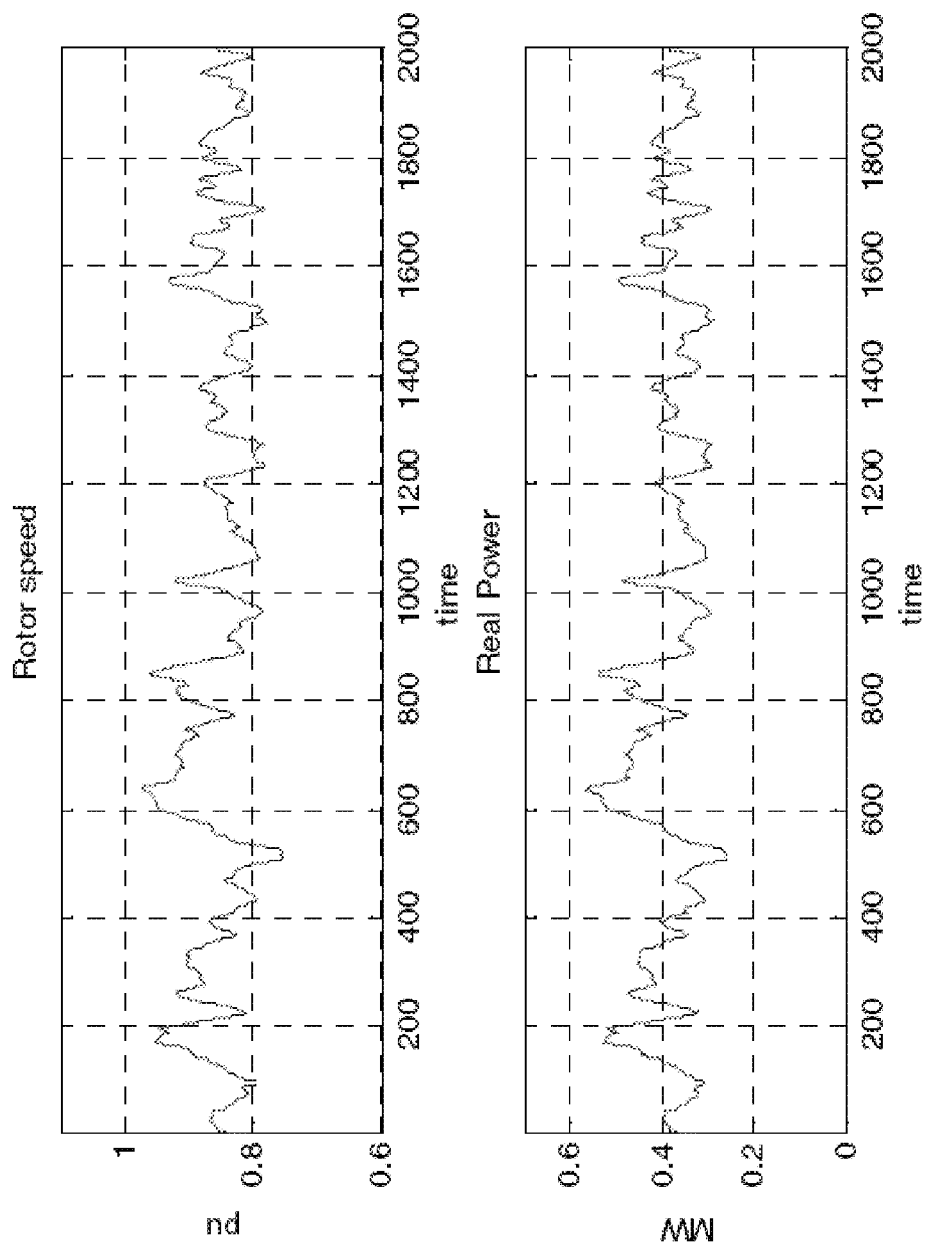
FIG. 44 shows graphs plotting the rotor speed and the active power of a DFIG before using the smoothing method.
Figure 45:
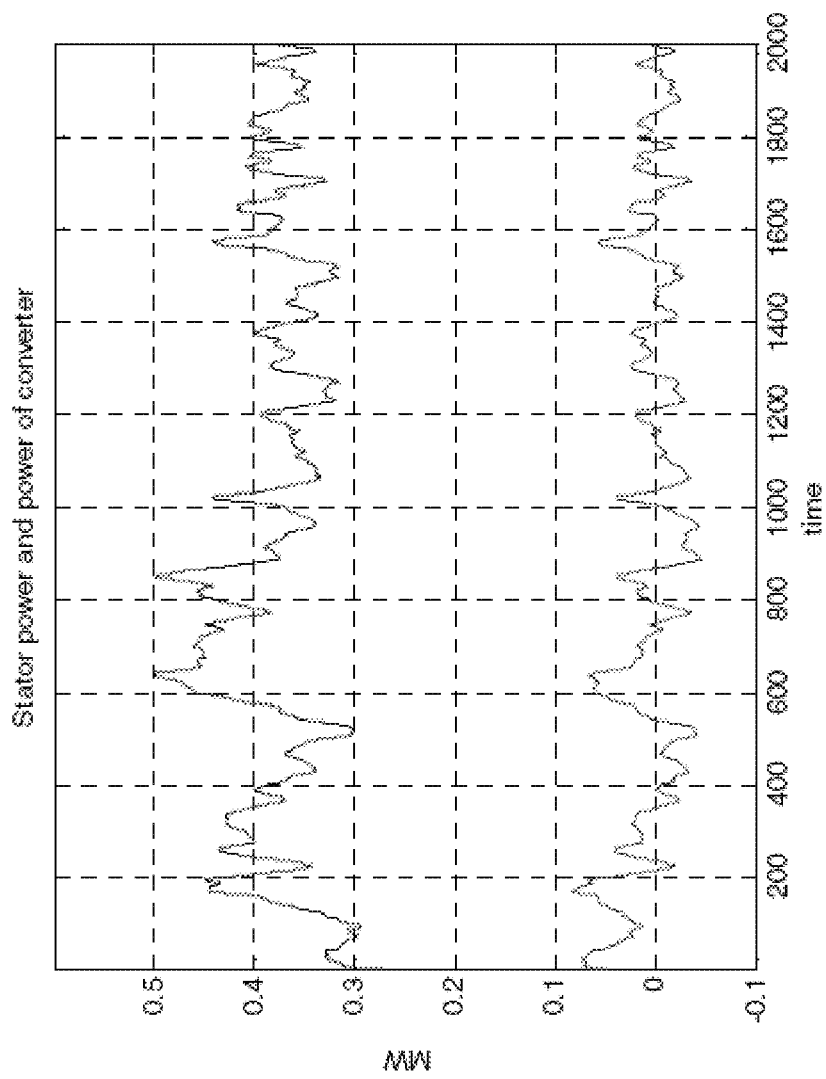
FIG. 45 is a graph plotting the stator power and power of converter.
Figure 46:
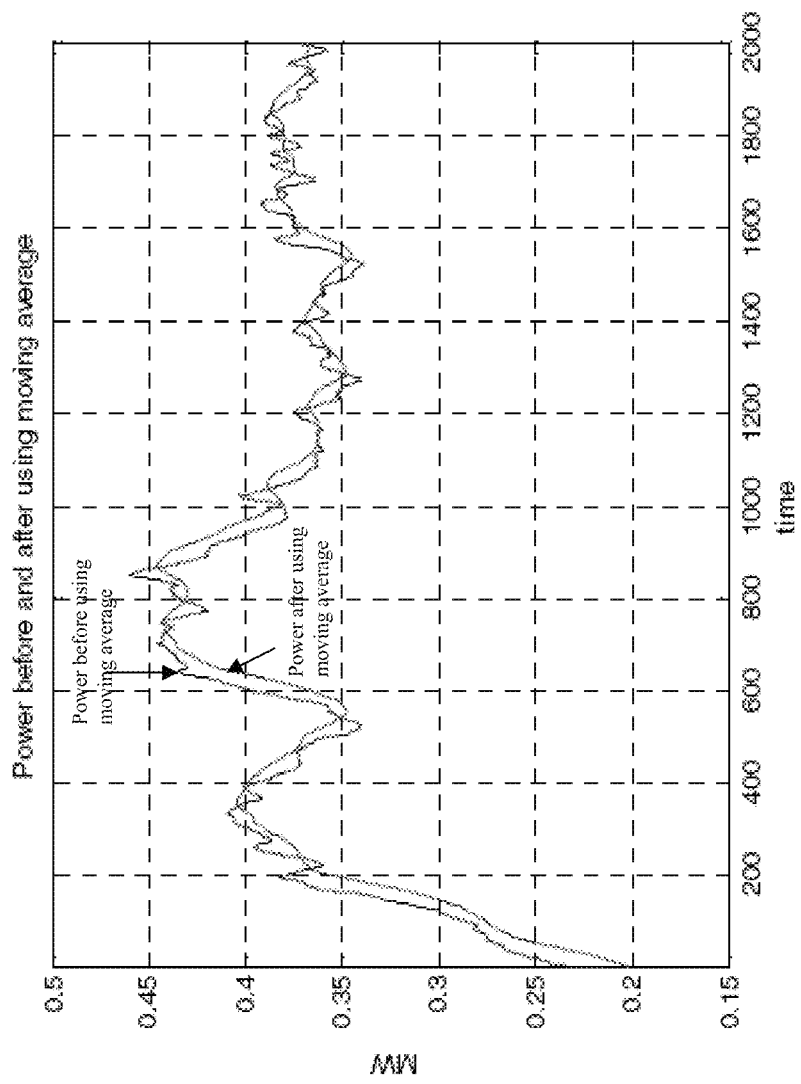
FIG. 46 is a graph plotting the stator power and power of converter before and after using moving average.

If $V_{DC} \geq 1450$ and $P_{Smooth} \leq P_{Real\text{-}time} \Rightarrow P_{Smooth} = P_{Real\text{-}time}$ If $V_{DC} \leq 850$ and $P_{Smooth} \geq P_{Real\text{-}time} \Rightarrow P_{Smooth} = P_{Real\text{-}time}$ VII. Simulation Results The case study illustrated of 1.5 MW wind farms connected to a transmission system exports the power to the grid. FIG. 42 shows the wind speed curve that is used for all simulations in this paper and the rotor speed of the DFIG. The rotor speed follows the wind speed curve. FIG. 43 shows the wind speed and real power before using the smoothing method. FIG. 44 shows the rotor speed and real power before using the smoothing method. The power curve follows the wind speed curve as rotor speed does. The Stator power and power of converter is shown in FIG. 45 and output power before and after using moving average in FIG. 46.

Figure 47:
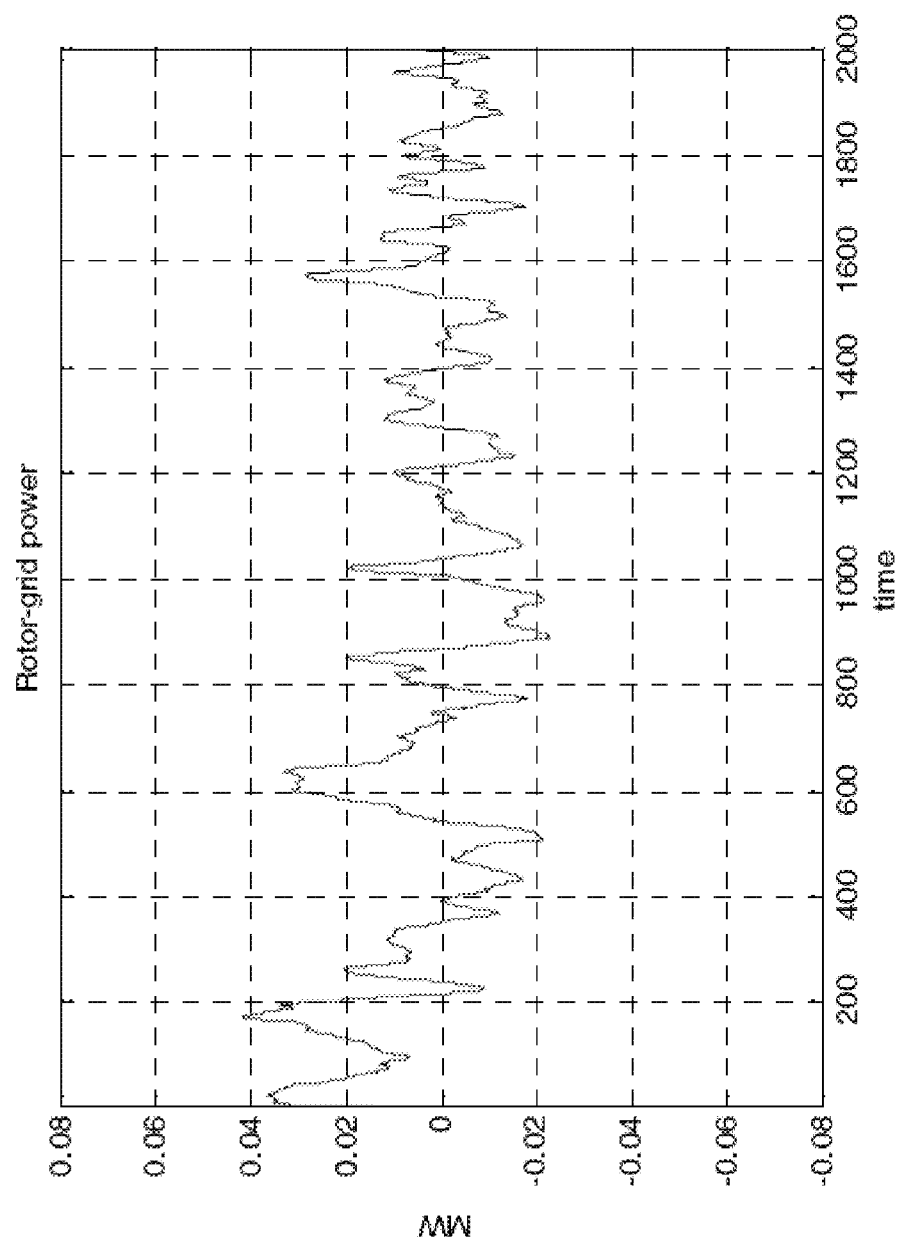
FIG. 47 is a graph plotting the charging and discharging power.
Figure 48:
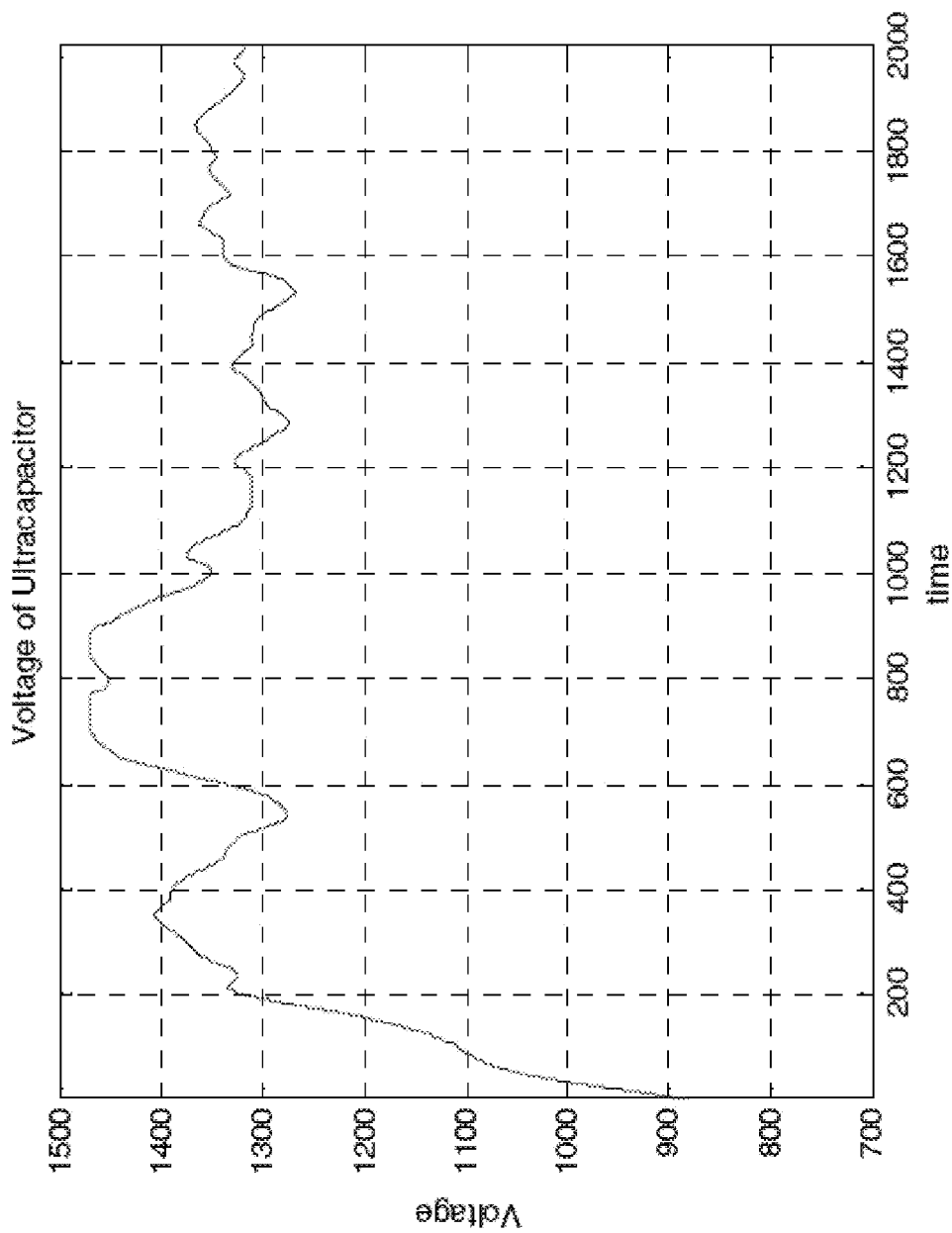
FIG. 48 is a graph plotting the ultracapacitor voltage.
Figure 49:
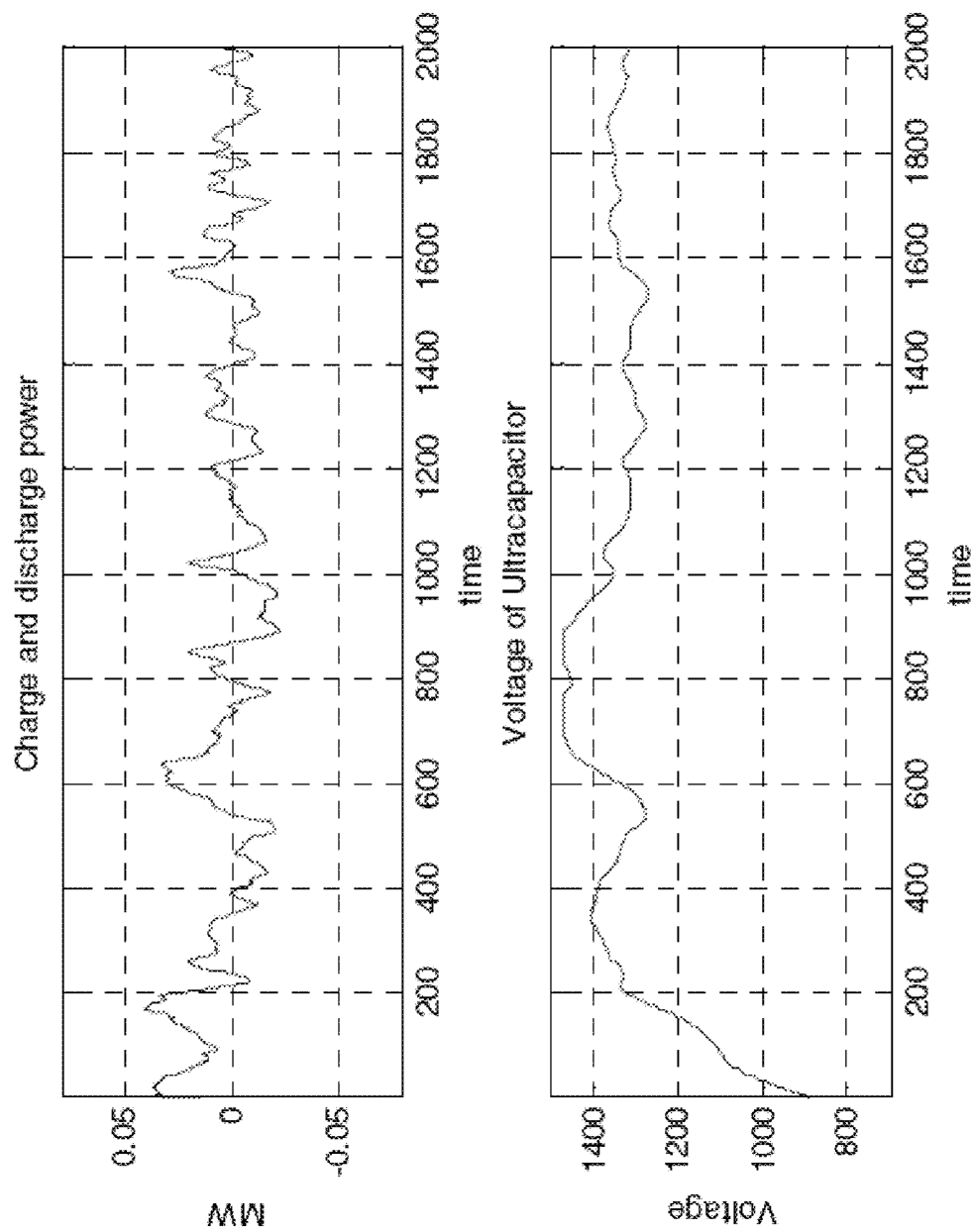
FIG. 49 shows graphs plotting the charge-discharge power with ultracapacitor voltage.

The rotor grid power is called charge and discharge power. This amount of power is determined how the series of Ultra Capacitors store and release energy and how the voltage affect in these events. FIG. 47 shows charge and discharge power, FIG. 48 shows the ultracapacitor voltage and FIG. 49 shows both the charge/discharge power and the ultracapacitor voltage in the same plot.

VIII. Conclusion

This Appendix presents smoothing method for output power of DFIG using Ultracapacitors. From the simulation result point of view, the control methods work well for the system from the power control to the speed control and DC voltage control. For the DC voltage control, due to the presence of a plurality of ultracapacitors, DC voltage is controlled in the range of 850V-1470V. In this simulation study, 386 cells of Li-Ion ultracapacitors are used with the total equivalent capacitance of 2.85 F. This amount of energy storage is enough to smooth the output power of DFIG as shown in FIGS. 47 and 48. For short-term storage, ultracapacitors work well. They are able to smooth the output power in 1.5 second. Other possibilities are to increase the amount of storage by using batteries and ultracapacitors in the same system, which will be a long-term storage system. With a large amount of wind power increasing every year, long-term storage can definitely make a big impact on wind power. It is very interesting to see how well the short-term and long-term storage system affect different types and size of the machine and how the technique works for each of them. It is also useful to control the output power before using a smoothing method. Power ramp is one of the options for this method. The next step is using power ramp control technique for short-term and long-term storage systems.

APPENDIX D

Modeling and Simulation of a Wind Turbine System with Ultracapacitors for Short-Term Power Smoothing Abstract This paper describes the modeling and simulation of a Permanent Magnet Synchronous Generator (PMSG) based Wind Energy Conversion System (WCES). The model includes all the components from wind to the grid. This model is used to study various control algorithms as well as integration of ultracapacitor energy storage aimed at reduction of output power variations. Ultracapacitors are placed on the DC bus of the double conversion system to avoid extra power conversion stage.

I. Introduction

Wind energy is an inexhaustible, renewable, source of energy. The energy of wind is converted to electrical energy by using WECS that consist of wind turbine and electric generator. There are several types of generators, but the mostly used types are induction and synchronous generators. Synchronous generators with permanent magnets on the rotor are increasingly used in direct driven wind turbines due to their higher efficiency compared to the other types of generators. Direct driven generators also do not require a gearbox, which also reduces cost of the system.

In order to maximize captured power, wind turbines should be operated at various rotational speeds, depending on actual wind velocity in such a way that keeps Tip-Speed ratio at the optimum value. A Maximum Power Point Tracking (MPPT) algorithm provides operation of a wind turbine at the optimum TSR. Since a WECS is connected to the grid, that maintains constant frequency, while rotational speed of the generator is variable, causing variable frequency on its terminals, power electronics interface is needed.

Figure 50:
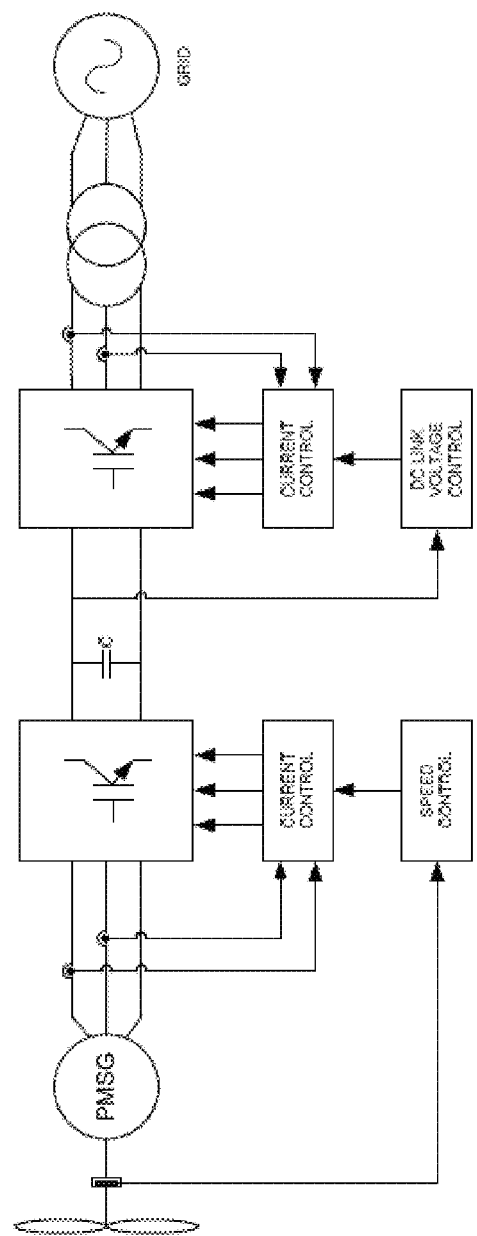
FIG. 50 schematically illustrates a PMSG-based WECS.

One commonly used topology of the PMSG based WECS is shown in FIG. 50. Generator side converter is an active rectifier that transforms AC voltages at the generator terminals into a DC voltage. Grid side converter is an inverter that transforms DC link voltage into AC voltages with constant frequency. Therefore, the generator and the grid are decoupled. Generator side converter enables speed control of the generator by controlling electromechanical torque of the generator.

Variations in wind speed cause variations in output power produced by a wind turbine. These variations can cause frequency deviations in the power systems with higher penetration of wind energy. Frequency deviations in the power grid can cause stability problems and, therefore, they should be minimized. Utilizing of energy storage integrated with WECS can help in reducing these dangerous fluctuations of power from wind turbines. To study dynamical behavior of a WECS, as well as to develop advanced control strategies that maximizes captured power and reduce power fluctuations, good simulation model is needed.

In this paper, a model based on National Renewable Energy Laboratory's (NREL) wind turbine simulator and Simulink model of the generator, PWM rectifier, DC link, three phase inverter, and the grid is described. The model is tested by simulation of WECS operation during 20 minutes, under variable wind speed. Then, the ultracapacitor energy storage is added in the DC link. Control strategy of the grid side converter is modified such that output power reference is calculated as an average value of incoming power of the generator over past 40 seconds. This simple control strategy reduces variations of the output power and, therefore, reduces frequency deviations in the power grid. This model can be used to study various properties of WECS as well as to develop and test novel control algorithms for WECS.

II. Modeling of a WECS

Fatigue, Aerodynamics, Structures and Turbulence (FAST) nonlinear wind turbine simulator is used as a model of mechanical subsystem of a WECS. This model has been developed by National Renewable Energy Laboratory (NREL). Electrical subsystem is modeled using Simulink, PMSG model in synchronous reference frame is given by the following equations (1)-(4).

$$v_d = R_s \cdot i_d + L_d \cdot \frac{di_d}{dt} - \omega_r \cdot L_q \cdot i_q \tag{1}$$

$$v_q = R_s \cdot i_q + L_q \cdot \frac{di_q}{dt} + \omega_r \cdot L_d \cdot i_d + \omega_r \cdot \Psi_{PM} \tag{2}$$

$$T_e = \frac{3}{2} \cdot p \cdot (\Psi_{PM} + (L_d - L_q) \cdot i_d) \cdot i_q \tag{3}$$

$$J \frac{d\omega}{dt} = p(T_e - T_T + B \cdot \omega) \tag{4}$$

Figure 51:
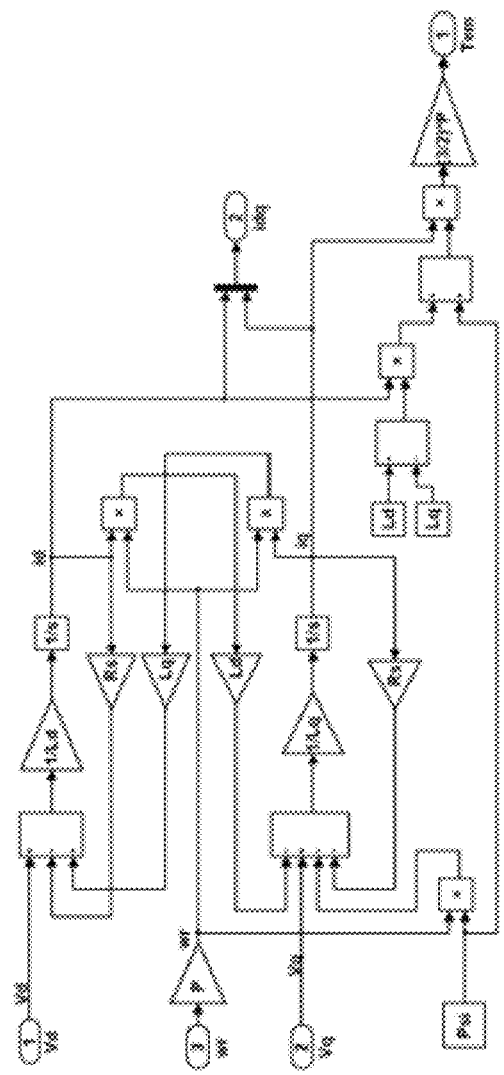
FIG. 51 schematically illustrates a PMSG model in Simulink.

Simulink model of a PMSG is shown in FIG. 51. The generator's three phase voltages are rectified using active PWM rectifier.

Vector control strategy is used to control $i_d$ and $i_q$ components of the generator current. This control strategy enables decoupled control of torque and flux of the generator. Generator electromechanical torque is directly proportional to the $i_q$ component of the current. Generator flux is produced by rotor permanent magnets. Therefore, magnetizing component of the stator current ($i_d$) is kept to zero. Under vector control, generator electromechanical torque is given by following equation (5):

$$T_e = \frac{3}{2} \cdot p \cdot \Psi_{PM} \cdot i_q \tag{5}$$

Where $\Psi_{PM}$ represents rotor flux produced by permanent magnets. Electromechanical torque of the generator acts as a load torque of the wind turbine. To ensure mechanical stability, it is appropriate to control generator torque according to the standard control law (6).

$$T_e = K \cdot \Omega^2 \tag{6}$$

Substituting (6) into (5), $i_q$ current is calculated as follows:

$$i_q = \frac{K\Omega^2}{\frac{3}{2} \cdot p \cdot \Psi_{PM}} \tag{7}$$

In order to maximize power captured form wind, a Fuzzy-Logic based Maximum Power Point Tracking (MPPT) algorithm is implemented. The MPPT controller is searching for constant K in (6) such that output power of the WECS is maximized.

Figure 52:
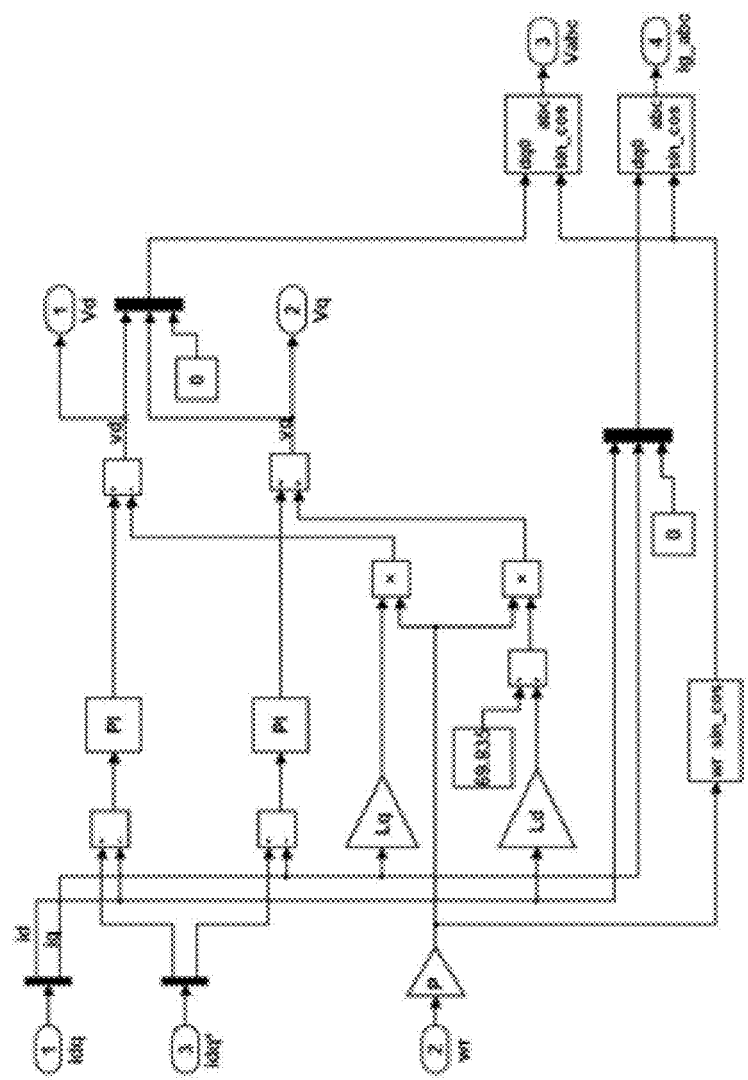
FIG. 52 schematically illustrates a generator current controller model in Simulink.

Vector control of the PMSG requires decoupled current control. Current controller is shown in FIG. 52. $V_{abc}$ signals are three phase modulating signals that modulate the carrier and generate PWM pulses for the three phase active rectifier. PI controllers work in the synchronous reference frame and control $i_d$ and $i_q$ currents independently. Reference value of the $i_q$ current is calculated using the equation (7). Coefficient K is determined by the MPPT controller. Grid side converter is a three phase inverter. This converter is synchronized to the grid and it uses vector control strategy that enables independent control of the active and reactive power injected to the grid.

Figure 53:
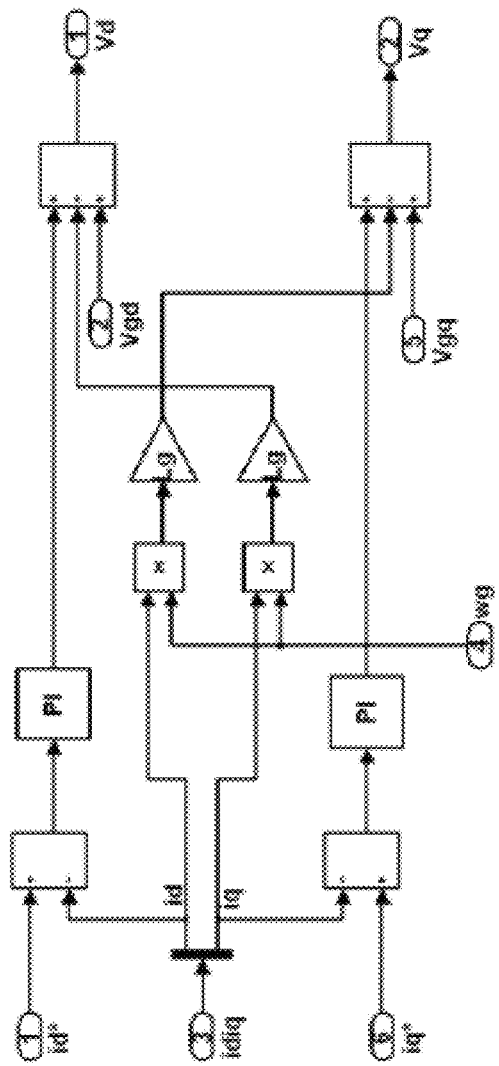
FIG. 53 schematically illustrates a grid current controller model in Simulink.
Figure 54:
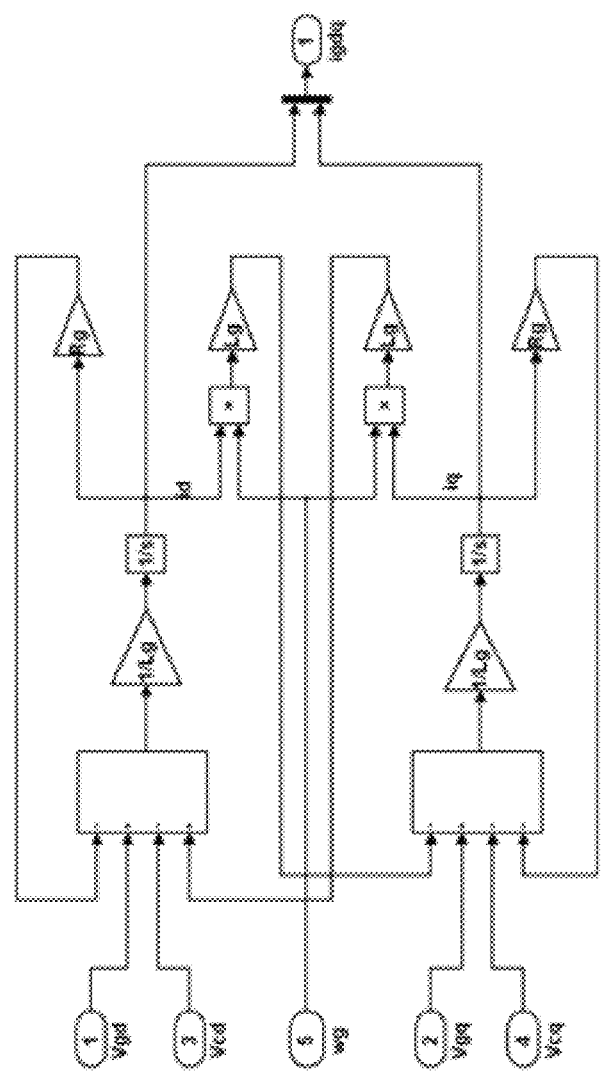
FIG. 54 schematically illustrates transformer and grid line inductances in the dq reference frame.

In order to operate system with power factor equal to 1, the $i_d$ component of the grid current is kept to zero. Therefore, by controlling the $i_q$ component of the grid current, power injected to the grid is controlled. Grid is modeled as an ideal voltage source with serial line inductance. This serial line inductance represents transformer and power line inductance together. Current controller of the grid side converter operates in dq reference frame and it is shown in FIG. 53. Outer control loop keeps DC link voltage at its reference value. Model of the transformer and grid line inductances is shown in FIG. 54.

DC link dynamics is described by the following equation:

$$\frac{dv_c}{dt} = \frac{1}{C} \cdot (i_1 - i_2) \tag{8}$$

Figure 55:
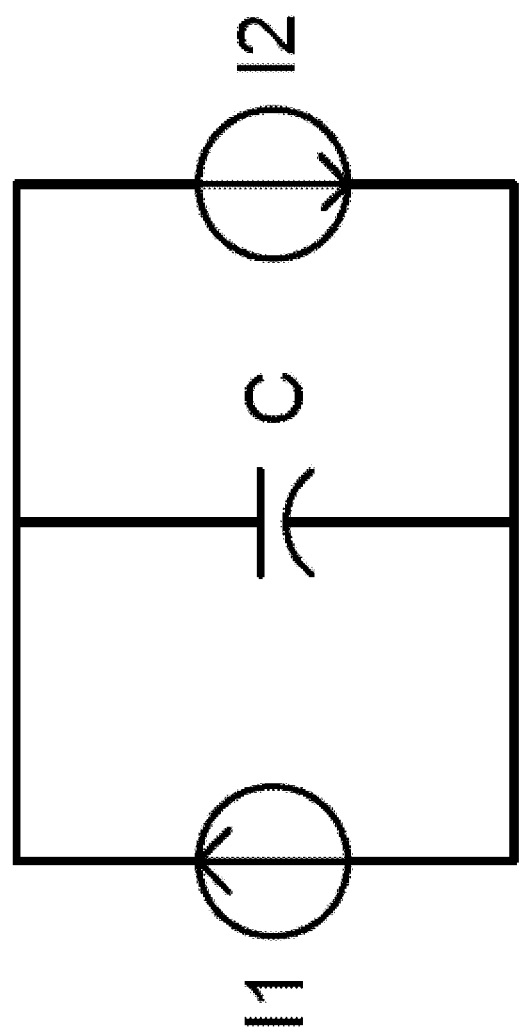
FIG. 55 schematically illustrates a DC link model.

DC link current $i_1$ is the output current of the generator side converter, while $i_2$ is the input current of the grid side converter. This system can be described as two current sources that charge and discharge the capacitor at the same time, as shown in FIG. 55.

Figure 56:
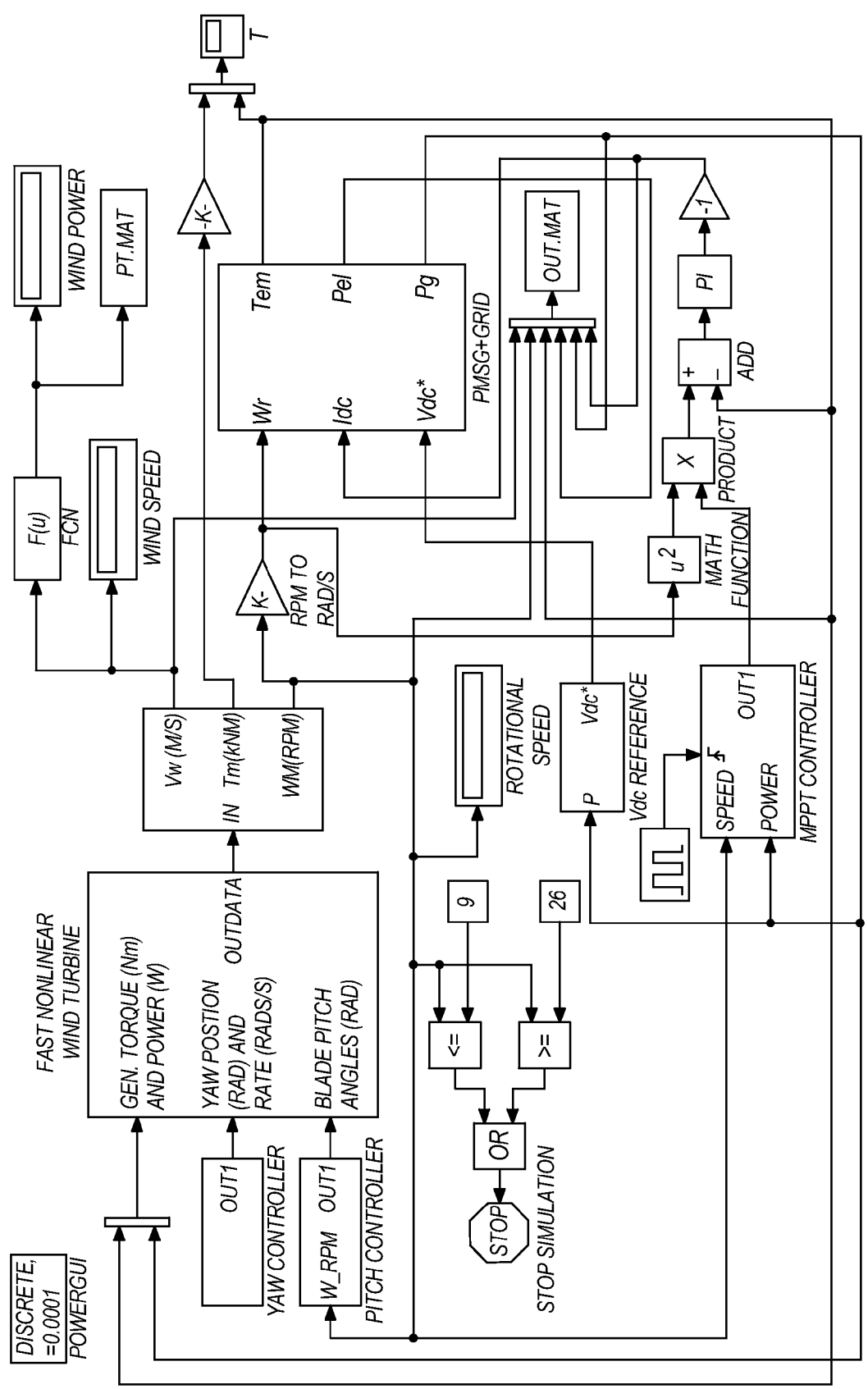
FIG. 56 schematically illustrates a complete simulation model of a WECS.
Figure 57:
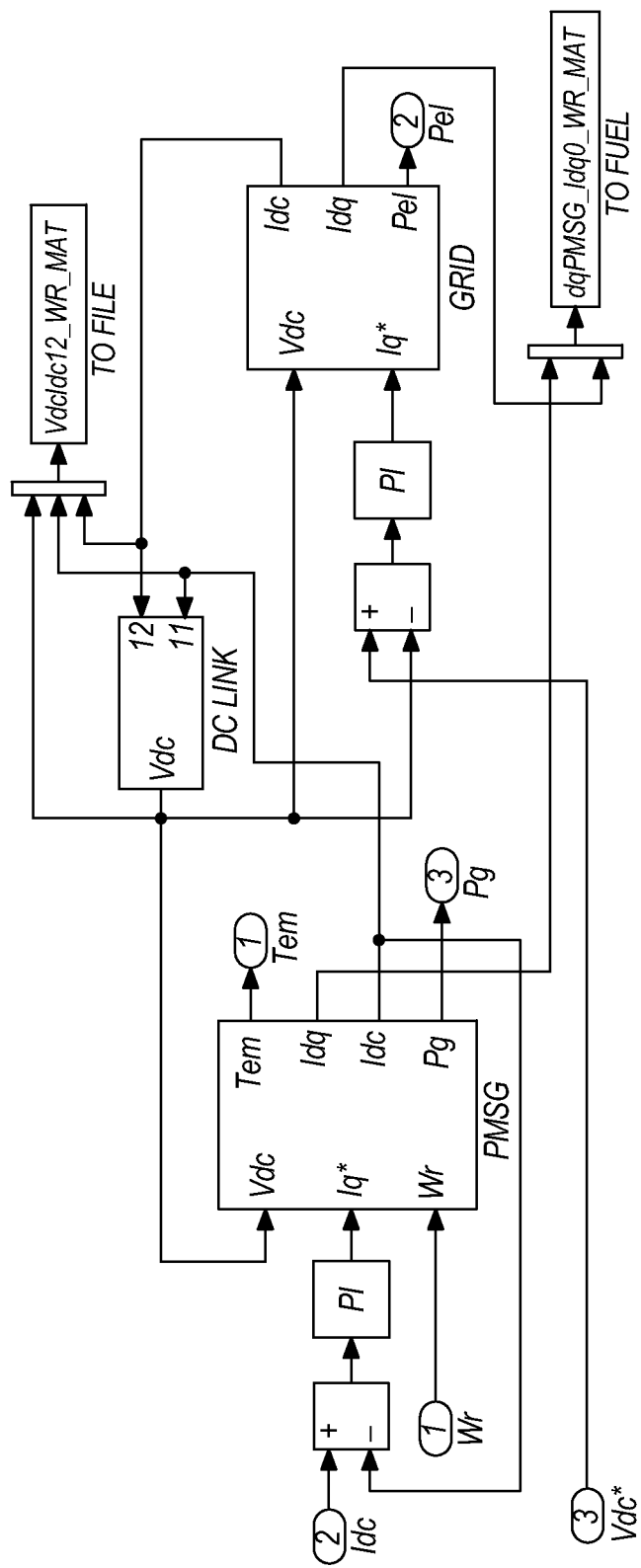
FIG. 57 schematically illustrates a model of the electrical subsystem.
Figure 58:
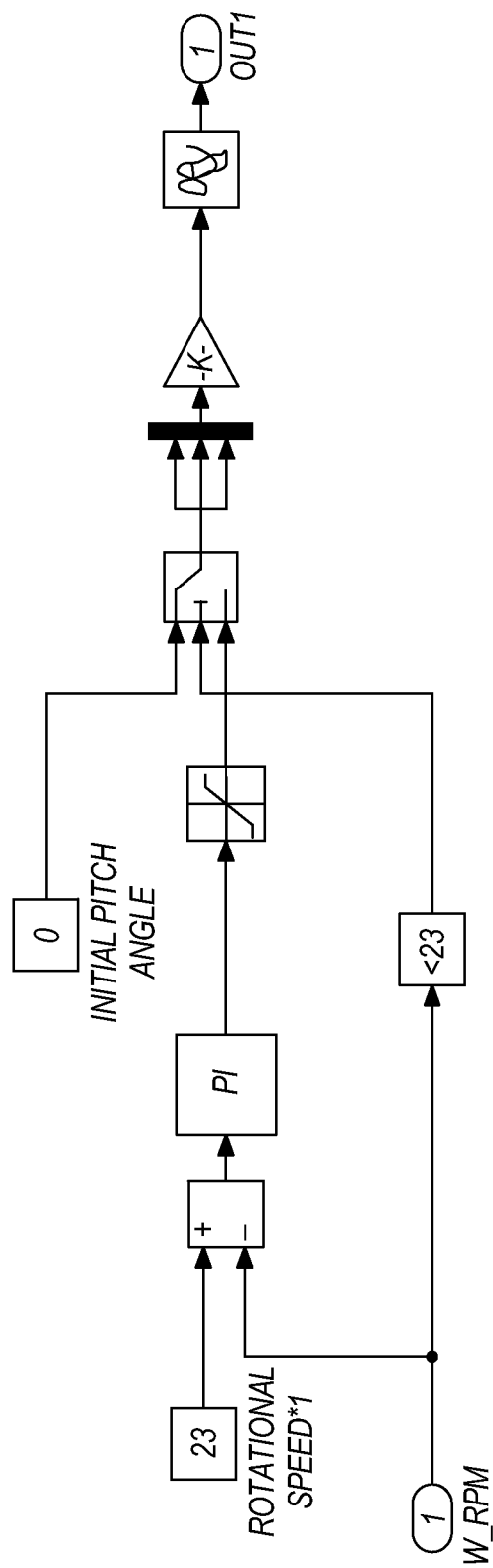
FIG. 58 schematically illustrates a blade pitch controller model.

Complete model of the electrical subsystem of the WECS is shown in FIG. 56. This model is used as a building block together with the electrical subsystem of wind turbine, as shown in FIG. 57, to form a complete model of the WECS. Maximum output power of the WECS is equal to the rated power of the generator. In order to prevent overloading of the generator, in case of high wind speeds, blade pitch control should be utilized. Pitch control also prevents a wind turbine from overspeeding. In the model of WECS shown in FIG. 57, pitch control keeps rotational speed below the rated value of the rotational speed of the generator. The pitch controller is shown in FIG. 58.

III. Energy Storage System on the DC Link

Figure 59:
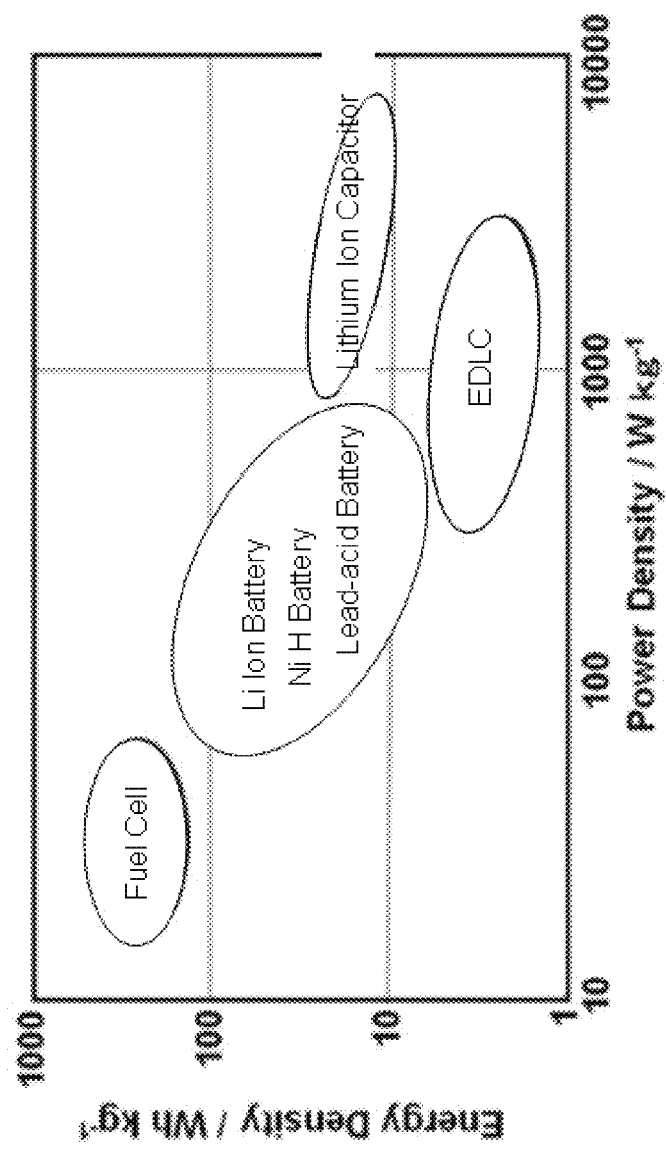
FIG. 59 schematically illustrates a comparison between the energy and power density of LIC vs. other storage devices.

In order to reduce output power variations, ultracapacitor energy storage in the DC link is utilized. Such energy storage gives device additional degree of freedom in controlling of the output power. Lithium Ion Capacitors (LIC) have been studied in this research for integration with WECS. LIC utilizes hybrid technology to provide an energy density which is four times greater than that of conventional electric double-layer capacitors (EDLC) (super capacitors or ultra capacitors). LICs combine a cathode constructed from activated carbon with high capacitance typically found in EDLCs, with an anode constructed from structure-controlled carbon doped with lithium, commonly found in Lithium Ion Batteries (LIB). Li-doping of the anode lowers its potential, resulting in a doubling of the overall cell's capacitance, without increasing the size or weight of the package. The lower potential allows LIC to operate at 3.8V, which doubles the cell's energy storage. The minimum cell voltage is 2.2V. It also offers the safety, power, and long cycle life typically associated with capacitors. LIC's increase in energy and power density results in shift in energy/power density relative to EDLCs, as shown in FIG. 59.

Compared to EDLCs, LICs have a significantly lower self-discharge rate of less than 5% after 3 months. The form factor which is flat and thin compared to EDLC's cylindrical form allows for more efficient use of space. Key comparisons are found on the following table (Table VII). Unlike LIBs, no thermal chain reaction occurs, since the positive electrode does not react with electrolyte.

Generator and the grid are now fully decoupled since variations in the generator power are not directly transferred to the output power of the grid side inverter. With ultracapacitor storage in the DC link, output power can be controlled independently of the incoming power form the generator. To control power, DC link voltage should be controlled. DC link voltage reference can be calculated using the following analysis:

$$v_c \cdot dv_c = \frac{1}{C} \cdot (p_1 - p_2)dt \qquad (9)$$

Equation (9) is derived by multiplying (8) by $v_c$. $v_c$ is then calculated as:

$$v_c^2 = \frac{2}{C} \cdot \int (p_1 - p_2)dt + C \qquad (10)$$

$$v_c = \sqrt{\frac{2}{C} \cdot \int (p_1 - p_2)dt + C} \qquad (11)$$

$$V = V_{DC\_initial}^2 \qquad (12)$$

$p_1$ is an incoming power form the generator and it is calculated as product of generator electromechanical torque (5) and rotational speed. $p_2$ is the desired output power. To illustrate concept of output power variation reduction, simple moving average calculation is used. Incoming power of the generator is averaged over last 40 seconds. This average power is then used as $p_2$ value in the equation (11). Equation (11) gives reference value of the DC link voltage.

IV. Simulation Results

Figure 60:
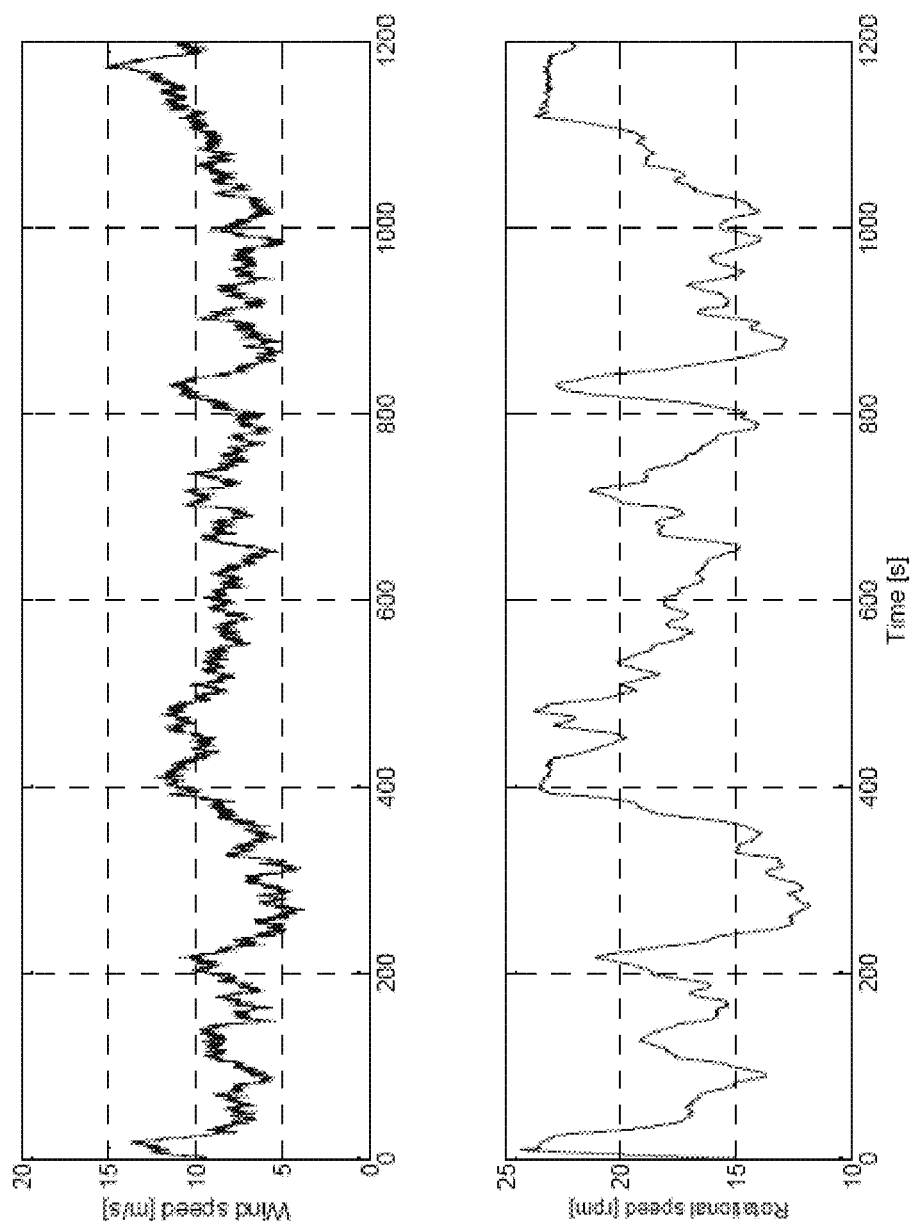
FIG. 60 shows graphs plotting the wind speed and the rotational speed of a wind turbine.
Figure 61:
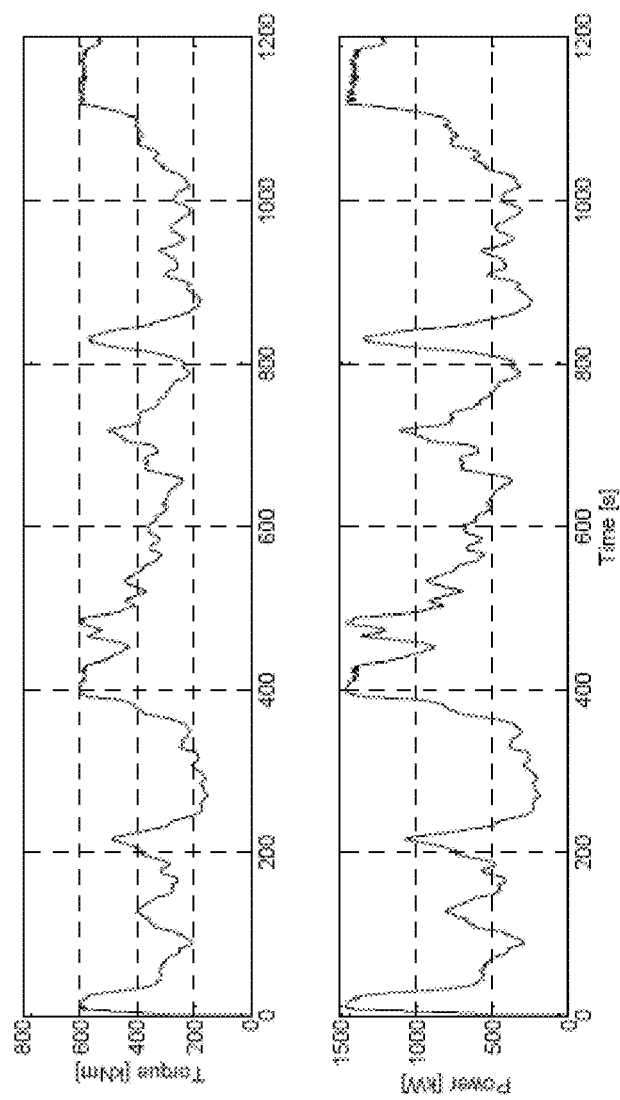
FIG. 61 shows graphs plotting the generator torque and the output power.
Figure 62:
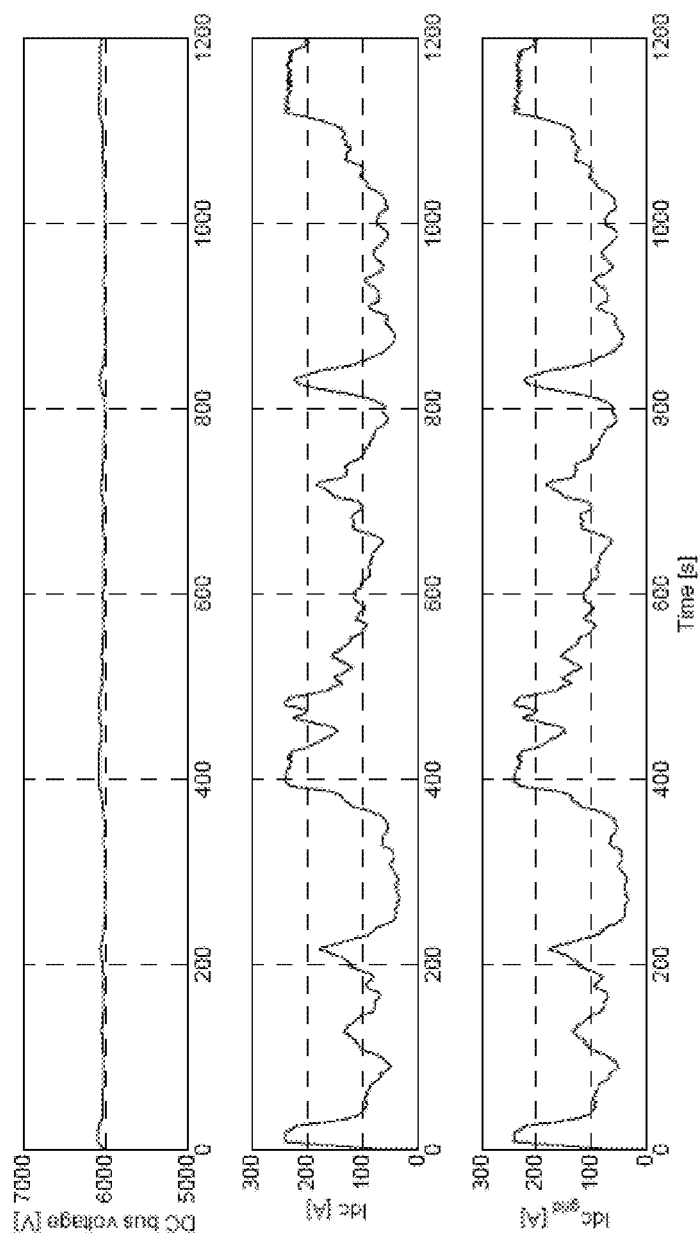
FIG. 62 shows graphs plotting the DC link voltage and the capacitor charging and discharging currents.

Complete WECS model is tested using randomly generated wind profile file as an input for FAST simulator. Wind profile file is generated using TurbSim software from NREL. In the first simulation, the MPPT controller was disabled and standard control law was used. The value of the constant K of the standard control law was equal to 100 kNm/(rad/s)². Simulation results are shown in FIGS. 60 through 61. In FIG. 60, wind speed and rotational speed of the turbine are shown. Pitch controller keeps rotational speed at 23 rpm when wind speed exceeds 10 m/s. Generator torque and output power injected to the grid are shown in FIG. 61. FIG. 62 shows DC link voltage as well as the currents in the DC link. $I_{dc}$ is the current that charges the capacitor in the DC link. This current comes from the generator side converter. $I_{DC\_grid}$ is a current that discharges the capacitor. This is the input current of the grid side converter. Grid side converter has a control loop that keeps DC link voltage constant, at 6000V in this case. Simulation results from FIG. 62 show that DC link voltage is kept constant, under variable incoming power from the wind.

Figure 63:
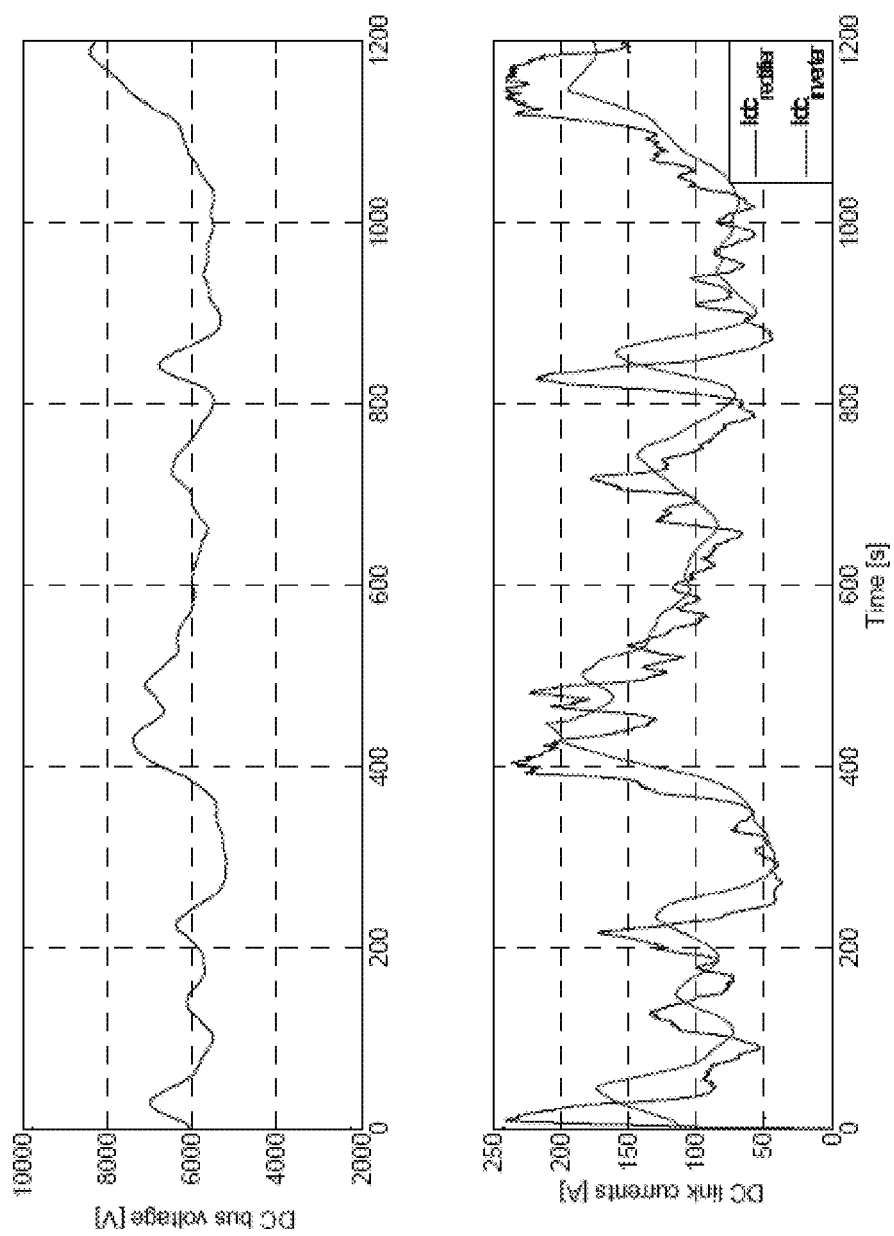
FIG. 63 shows graphs plotting the DC link voltage and currents with ultracapacitor in the DC link.
Figure 64:
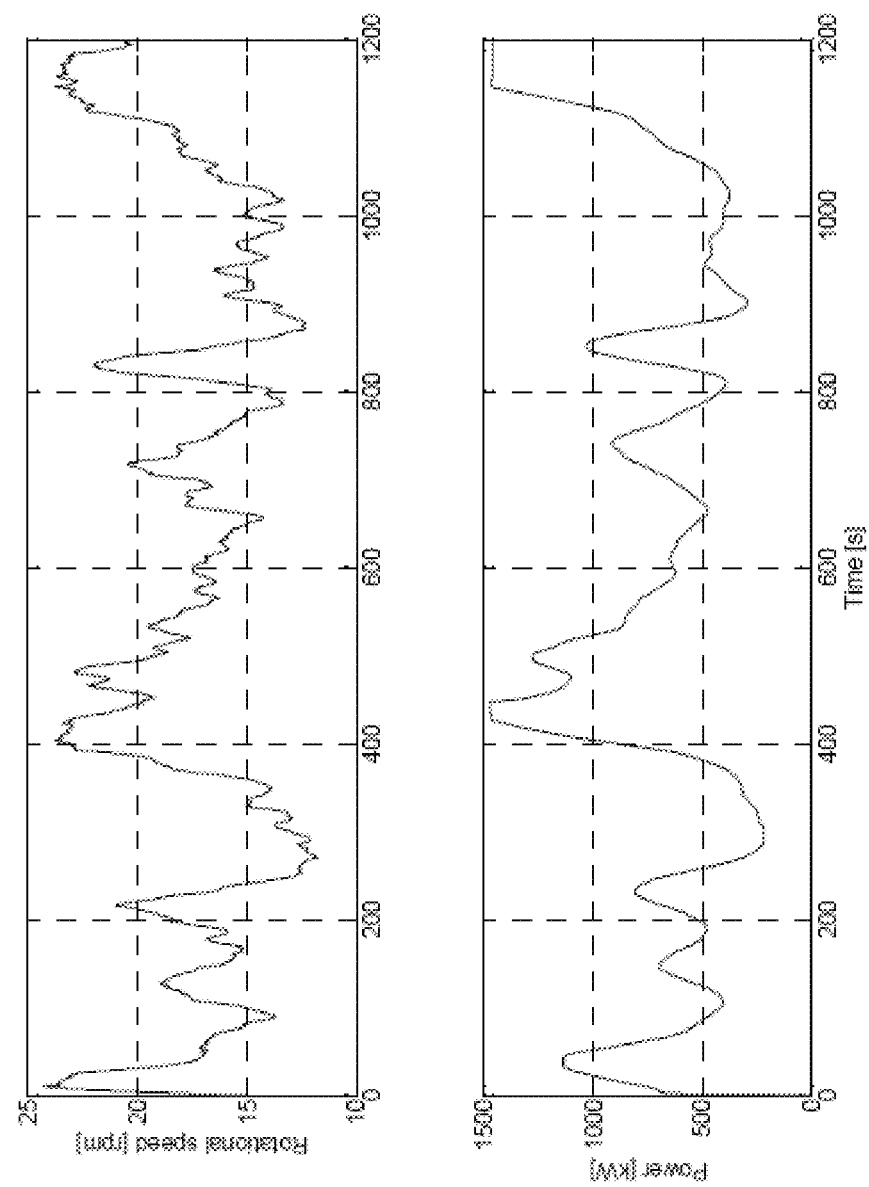
FIG. 64 shows graphs plotting the rotational speed and output power.
Figure 65:
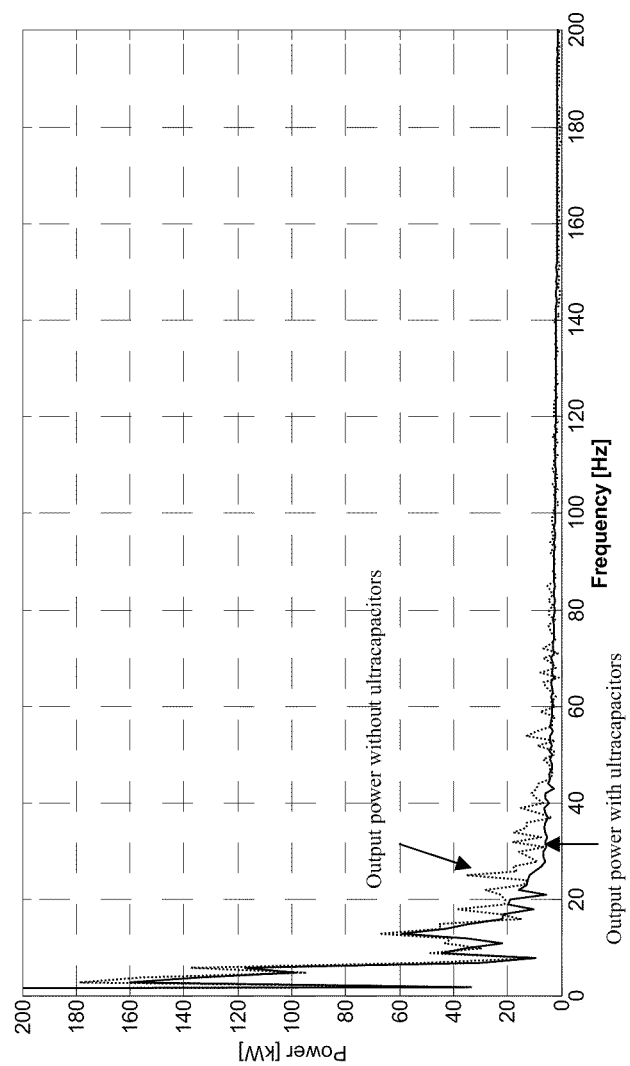
FIG. 65 is a graph plotting the frequency spectrum of the output power.

Additional simulation of the WECS was run. In this case, MPPT algorithm was enabled. In addition, the size of the capacitor in the DC link was increased to 2 F. Such large capacitor works as an energy storage and, therefore, enables some degree of freedom in controlling of the power injected to the grid. DC link voltage control loop accepts voltage reference from the moving average calculation of the power form the generator, using the equation (11). Simulation results are shown in FIGS. 63, 64 and 65. FIG. 63 shows DC link voltage and currents. In this case, DC link voltage is not constant all the time. When the energy is stored in the ultra-capacitor, its voltage increases. When the stored energy is released through grid side converter, the DC link voltage decreases. Rotational speed and power injected to the grid is shown in the FIG. 64. It can be seen that fluctuations in the output power are reduced, compared with the output power from FIG. 59. FIG. 65 shows spectrum of the output power. Frequency components in the range from 5 Hz to 60 Hz are reduced. Maximum reduction is achieved for the frequency components between 15 Hz and 40 Hz. Table VII shows the parameters of the PM generator used in this paper for the simulation and modeling.

TABLE VII

Parameters of the PM generator for the system.
PMSG parameters

| | |
|---|---|
| Stator phase resistance | 0.225Ω |
| d-axis inductance | 0.049 H |
| q-axis inductance | 0.046 H |
| Voltage constant (Vpp-ll/krpm) | 380000 V/krpm |
| Pole pairs | 30 |
| Moment of inertia | 69600 |

V. Conclusion

In this paper, a detailed model of a WECS is presented. This model includes all components, from wind to the grid, and it can be used for various studies. To demonstrate the capabilities of the model, MPPT control algorithm as well as ultracapacitor energy storage in the DC link are utilized. Simulation results show that ultracapacitors in the DC link can help in reduction of the output power variations and, therefore, enable easier integration of the WECS in the existing power grids.

What is claimed is:

1. A method of controlling power output from a wind energy power conversion system, the wind energy power conversion system comprising a generator coupled to a wind turbine rotor via a gearbox, the generator being coupled to an AC to DC power converter, the AC to DC power converter being coupled via a DC link to a DC to AC power converter, the DC link comprising at least one ultracapacitor connected in parallel directly to the DC link to absorb and release a charge in order to buffer and isolate variations in generator power output from the output of the DC/AC converter, the method comprising varying a voltage level of the DC link to control the power output of the DC to AC power converter, wherein varying a voltage level of the DC link to control the power output of the DC to AC power converter comprises at least one of (i) lowering a voltage level of the DC link to release a charge and increase the power output of the DC to AC power converter and (ii) raising a voltage level of the DC link to absorb a charge and decrease the power output of the DC to AC power converter;

outputting power from the DC to AC power converter at a different rate than a rate of power input to the AC to DC power converter; and increasing power output from the DC to AC power converter at a rate that is slower than a rate of increase of power input to the AC to DC power converter.

2. The method of claim 1, wherein power output from the DC to AC power converter is less than power input to the AC to DC power converter.

3. The method of claim 1, wherein adjusting a voltage level of the DC link comprises adjusting at least one of a current from the AC to DC power converter and a current into the DC to AC power converter.

4. The method of claim 1, wherein adjusting a voltage level of the DC link comprises changing a voltage on the at least one ultracapacitor.

5. The method of claim 1, wherein the at least one ultracapacitor absorbs at least a portion of the power that is produced by the generator during a period of low voltage.

6. The method of claim 1, wherein the at least one ultracapacitor compensates power during a frequency droop.

7. The method of claim 1, wherein the at least one ultracapacitor provides at least a portion of the power to supplement the generator power after a period of low voltage.

8. The method of claim 1, wherein the at least one ultracapacitor comprises a plurality of ultracapacitors.

9. The method of claim 8, wherein each of the plurality of ultracapacitors has a voltage range of between 2.2 V and 3.8 V.

10. The method of claim 8, wherein the voltage level of the DC link is varied in a range of 1050 V to 1750 V.

11. The method of claim 8, wherein the voltage level of the DC link is varied in a range of 850 V to 1470 V.

12. The method of claim 8, wherein the voltage level of the DC link is varied in a range of 800 V to 1400 V.

* * * * *